US006339219B1

(12) United States Patent
Ishizuya et al.

(10) Patent No.: US 6,339,219 B1
(45) Date of Patent: Jan. 15, 2002

(54) RADIATION IMAGING DEVICE AND RADIATION DETECTOR

(75) Inventors: Tohru Ishizuya; Motoo Koyama, both of Tokyo (JP)

(73) Assignee: Nikon Corporation, Tokyo (JP)

(*) Notice: Subject to any disclaimer, the term of this patent is extended or adjusted under 35 U.S.C. 154(b) by 0 days.

(21) Appl. No.: 09/335,782

(22) Filed: Jun. 18, 1999

(30) Foreign Application Priority Data

Jun. 20, 1998 (JP) .......................................... 10-189786
Jul. 8, 1998 (JP) .......................................... 10-208627
Feb. 18, 1999 (JP) .......................................... 11-039308

(51) Int. Cl.$^7$ ................................................ G02F 1/01
(52) U.S. Cl. .................................... 250/330; 250/338.1
(58) Field of Search ............................. 250/330, 338.1; 353/97; 359/230

(56) References Cited

U.S. PATENT DOCUMENTS

| 3,553,364 | A | * | 1/1971 | Lee ............................. 359/230 |
| 4,728,185 | A | * | 3/1988 | Thomas ....................... 353/122 |
| 5,300,915 | A | | 4/1994 | Higashi et al. ............. 338/22 R |
| 5,737,086 | A | * | 4/1998 | Gerber et al. ................ 356/432 |
| 5,839,808 | A | * | 11/1998 | Koyama et al. .............. 353/97 |
| 5,929,440 | A | * | 7/1999 | Fisher ....................... 250/338.1 |
| 6,080,988 | A | * | 6/2000 | Ishizuya et al. .......... 250/338.1 |

OTHER PUBLICATIONS

Michael A. Mignardi, Texas Instruments, Digital micromirror array for projection TV, Solid State Technology, Jul. 1994, pp. 63–68.
Larry J. Hornbeck, Texas Instruments, Deformable–Mirror Spatial Light Modulators, SPIE Critical Reviews Series, vol. 1150, pp. 86–102.
J.B. Sampsell, Texas Instruments, Late–News Paper: An Overview of the Digital Micromirror Device (DMD) and Its Application to Projection Displays, SID 93 Digest, pp. 1012–1015.

* cited by examiner

*Primary Examiner*—Seungsook Ham
*Assistant Examiner*—Shun Lee
(74) *Attorney, Agent, or Firm*—Morgan, Lewis & Bockius LLP

(57) ABSTRACT

An imaging device is provided for efficient and accurate conversion of invisible infrared radiation into a visible optical image. In an example, the image device employs an improved configuration of a substrate transmissive to infrared radiation, an infrared lens system, an optical readout radiation/displacement conversion unit for converting the infrared radiation into displacements, a readout optical system for directing readout light towards reflectors of the optical readout radiation/displacement conversion unit. The image device also provides for ease in assembly and calibration by adopting an improved arrangement of the parts.

18 Claims, 28 Drawing Sheets

RADIATION IMAGING DEVICE AND RADIATION DETECTOR

This application claims the benefit of Japanese Patent Applications No. 10-189786, filed in Japan on Jun. 20, 1998, No. 10-208627, filed in Japan in Jul. 8, 1998, and No. 11-39308, filed in Japan on Feb. 18, 1999, all of which are hereby incorporated by reference.

BACKGROUND OF THE INVENTION

1. Field of the Invention

This invention concerns imaging devices for detecting various kinds of radiation, including infrared rays, X-rays, ultraviolet rays, other invisible radiation, and visible radiation, and for producing an image based on this radiation.

This invention also concerns a thermal displacement device for use in thermal infrared detection devices and in other thermal radiation detection devices, and a radiation detection device using the thermal displacement device.

2. Discussion of the Related Art

An infrared ray detector is used to create images of infrared rays, which are invisible radiation. Various approaches have been taken to detect and image infrared rays. Broadly divided, at present, two types of detectors are used as infrared ray detectors: quantum type infrared detectors and thermal type infrared detectors.

However, even with today's advances in opto-mechatronics technology, there are aspects of infrared detection which are technically difficult, and so they have not come into widespread use. The reasons for this are explained separately below for quantum type infrared detectors and thermal type infrared detectors.

Quantum type infrared detectors are instruments which convert the photon energy (E=hv) of infrared rays into electron energy for detection. The infrared wavelengths, which are of greatest use in general, are from 3 to 12 $\mu$m; the photon energy of infrared rays in this wavelength range is from 0.1 to 0.4 eV approximately. However, these values are roughly equal to the thermal energy of electrons in objects at room temperature. Hence, in order to convert only the photon energy of incident infrared rays into electron energy, the effect of the thermal energy of the electrons must be eliminated. In other words, in a quantum type infrared detector, it is essential that the detector be cooled in order to remove thermal energy.

Ordinarily, the detector must be cooled to about −200° C. (77 K) in order to suppress this thermal energy to a low level; the cooling equipment used for this purpose is large in volume, generates mechanical vibrations, has a short service lifetime, and is expensive. Hence an infrared camera using a quantum type infrared detector cannot be made small and inexpensive, and so has not come into widespread use.

On the other hand, thermal type infrared detectors of the conventional art convert the energy of incident infrared rays into thermal energy, causing a change in the temperature of the detector, and the change in physical properties of the detector is read electrically. For example, in a resistance bolometer, when the temperature changes the resistance changes. For instance, U.S. Pat. No. 5,300,915 discloses an imaging device in which, by integrating bolometers on the surface, changes in resistance due to the rise in element temperature when infrared rays from the measured object are incident on photosensitive elements can be detected with high sensitivity, to produce an image of the temperature distribution of the measured object.

This thermal infrared detector of the conventional art does not require large cooling equipment as in quantum infrared detectors, but the principle of detection itself has a problem. The problem is that, in thermal infrared detectors of the conventional art, although temperature changes in the detector due solely to the incident infrared rays must be detected, a current must be passed in the detector in order to detect temperature changes. The current passed in order to detect temperature changes causes heat generation in the detector (normally called self-heating), so that it is difficult to detect temperature changes due only to incident infrared rays, and the detection accuracy is lowered.

Moreover, in the aforementioned thermal infrared detector of the conventional art, there is the added drawback of low sensitivity. Thermal infrared detectors of the conventional art use objects, the resistance of which may change, for example, by about 2% when the temperature changes 1° C. However, the rate of conversion from a temperature of the incident infrared rays radiated to the corresponding temperature of the observed object is at most about 1%. Hence even if the temperature of the observed object changes by 1° C., the change in resistance of the detector is only 0.02%.

Further, in the thermal infrared detectors of the conventional art, the electrical signal obtained is extremely weak, and so the electric signal readout circuit must have extremely low noise, and the scale of the circuit tends to be large.

Also, high detection sensitivity and high S/N (Signal/Noise) ratio are sought in infrared detectors. Further, these situations are similar with regard to other sensors or detectors processing radiation than infrared rays.

SUMMARY OF THE INVENTION

Accordingly, the present invention is directed to a radiation imaging device and a radiation detector that substantially obviate the problems due to limitations and disadvantages of the related art.

An object of the present invention is to provide an imaging device which detects radiation with high detection accuracy, high sensitivity, and with a high S/N ratio without requiring cooling equipment, and which is capable of producing images based on radiation with high accuracy and high sensitivity.

Another object of the present invention is to provide an optical system which can be easily assembled, and the characteristics of which can be modified as desired.

Another object of the present invention is to provide an imaging device which can be easily assembled, and the inherent characteristics of which can be modified as desired, while conforming to principles of the imaging device.

Still another object of the present invention is to provide a thermal displacement element in which a large displacement amount can be obtained even when a plurality of displacement parts is positioned on the substrate, and in which nearly ideal positioning of the displacement parts can be obtained, and a radiation detection device using the same.

A further object of the present invention is to provide a radiation detection device in which, even when a plurality of pairs of displacement parts and displacement readout members are positioned on a substrate, nearly ideal positioning of them is possible.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention provides an imaging device for converting radiation arriving in a prescribed area into an optical image, the imaging device comprising an optical readout radiation/displacement conversion unit, including a plurality of radiation absorption parts arranged at a plurality of locations within the prescribed area, the radiation absorption parts each converting the radiation into heat at each of the plurality of locations, a plurality of displacement parts disposed at positions corresponding to the plurality of locations, each of the displacement parts converting the heat converted by the corresponding radiation absorption part to a displacement, and a plurality of reflection parts respectively coupled to the plurality of displacement parts, the inclination of each reflection part varying in accordance with the displacement of the displacement part; a readout optical system having a readout light supply unit that supplies readout light; a first lens system that directs the readout light to the plurality of reflection parts of the optical readout radiation/displacement conversion unit; a ray flux limiting unit that selectively directs only desired fluxes of light rays among those fluxes of rays of readout light reflected by the plurality of reflection parts after passing through the first lens system; and a second lens system optically coupled to the first lens system to define positions conjugate with the plurality of reflection parts, the second lens system guiding the fluxes of light rays that have directed through the ray flux limiting unit to the conjugate positions, wherein the readout light supply unit supplies the readout light such that the readout light passes through a region on one side of the optical axis of the first lens system, and wherein the ray flux limiting unit is configured such that a portion that selectively directs only the desired fluxes of rays is positioned in a region on the other side of the optical axis of the first lens system.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Figure 1:
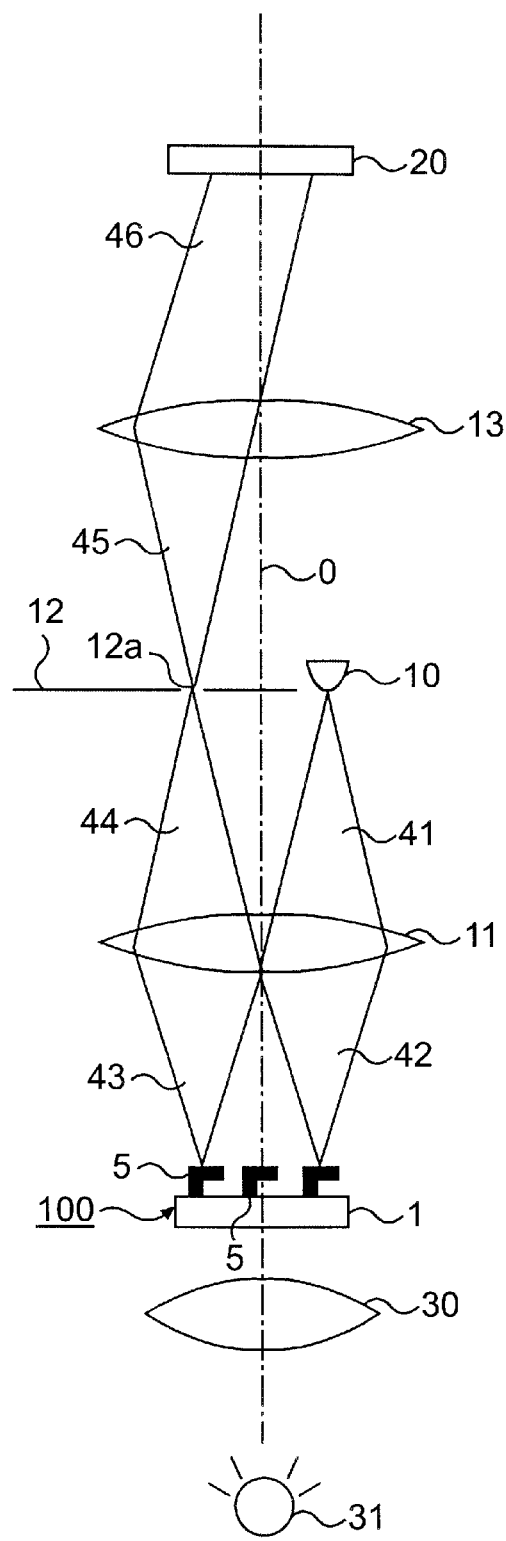
FIG. 1 schematically shows an imaging device according to a first preferred embodiment of the present invention.

Before describing the preferred embodiments of the present invention, various aspects of the present invention will be described first.

In a first aspect, the present invention provides an imaging device which converts radiation arriving within a prescribed area into an optical image, and which is provided with an optical readout device for radiation/displacement conversion and a readout optical system. The optical readout device for radiation/displacement conversion includes a plurality of radiation absorption parts, arranged at a plurality of locations within the prescribed area, which each convert the radiation received at the plurality of locations into heat; a plurality of displacement parts which each, at positions corresponding to the aforementioned plurality of locations, convert into displacements the heat converted by the plurality of radiation absorption parts; and a plurality of reflection parts the inclination of each of which changes according to the displacements of the plurality of displacement parts. The readout optical system is provided with a readout light supply unit, which supplies readout light; a first lens system for guiding the readout light to a plurality of reflection parts of the optical readout type radiation/displacement convertor; a ray flux limiting unit which selectively allows to pass only desired fluxes of light rays among those fluxes of rays of readout light reflected by the plurality of reflection parts after passing through the first lens system; and a second lens system which defines positions conjugate with the plurality of reflection parts in concert with the first lens system, and which moreover guides the fluxes of light rays that have passed through the ray flux limiting unit to the defined conjugate positions. The readout light supply unit supplies the readout light such that the readout light passes through the region on one side of the optical axis of the first lens system. The ray flux limiting unit is configured such that the sites which selectively pass only the desired fluxes of rays are positioned in the region on the other side of the optical axis of the first lens system. As described above, the ray flux limiting unit passes only desired fluxes of rays. The meaning of the expression, "pass," recited here, includes transmission and reflection.

In this first aspect of the present invention, the infrared rays, X-rays, ultraviolet rays, or other radiation incident within the prescribed area irradiates the plurality of radiation absorption parts, and the radiation is absorbed at a plurality of locations by the plurality of radiation absorption parts and converted into heat. Each of the heat quantities converted at the plurality of radiation absorption parts is converted into a displacement by a plurality of displacement parts at positions corresponding to the plurality of locations. The inclinations of the plurality of reflection parts each change according to the displacements of the plurality of displacement parts. In other words, the radiation incident on each radiation absorption part is converted into an inclination of each reflection part according to its amount (or strength). On the other hand, readout light employing visible light or some other light irradiates a plurality of reflection parts from the readout light supply unit, via the first lens system. Hence the radiation irradiating each radiation absorption part is converted into a direction (reflection direction) of readout light reflected by each reflection part. The ray fluxes of readout light reflected by the plurality of reflection parts pass through the first lens system, and only desired ray fluxes among those ray fluxes which have passed through the first lens system are selectively passed by the ray flux limiting unit. The ray fluxes which have passed through the ray flux limiting unit are guided by the second lens system to positions conjugate with the plurality of reflection parts, formed by the first lens system and second lens system. Hence an image of the plurality of reflection parts is formed at these conjugate positions by the readout light. Each of the ray fluxes forming the image of each of the reflection parts is limited by the ray flux limiting unit by an amount in response to the direction of reflection by each reflection part. Therefore, each amount of light of the image from each reflection part formed at the aforementioned conjugate positions differs according to the amount of the inclination of each reflection part, i.e., according to the amount of radiation incident on the corresponding radiation absorption part. In this way, the image of the radiation arriving within the prescribed area is converted into an optical image by means of the readout light, and this optical image is formed at the aforementioned conjugate positions.

In the first aspect above, radiation is thus converted into heat, this heat is converted into a displacement, and this displacement is detected by a readout optical system as a change in amount of light, thereby converting a radiation image into an optical image for image formation. Because displacement detection by the readout optical system can be performed with high sensitivity, radiation can be detected with high sensitivity, and an image of the radiation can be formed with high sensitivity. Further, in the first aspect, in contrast with the thermal type infrared detectors of the conventional art, radiation is not converted into a resistance (electrical signal) via heat; instead, radiation is converted into readout light via heat and displacement, so that there is no need to pass an electrical current in the optical readout type radiation/displacement convertor. As a result, the problem of self-heating does not occur. Hence, in the first aspect, heat due only to incident radiation is detected, so that the detection accuracy is improved, and the radiation image can be converted into an optical image with good accuracy. Of course, in the first aspect, as in the aforementioned thermal type infrared detectors of the conventional art, there is no need to have cooling equipments which are necessary in quantum type infrared detectors. Further, in the first aspect, radiation is not read out as an electrical signal. Thus, the readout circuit for processing weak electric signals, which is necessary in the aforementioned thermal type infrared detectors of the conventional art, is not needed.

Moreover, in the first aspect, an optical image is formed in response to each reflection part based on the readout light, so that if visible light is used as the readout light, the optical image, equivalent to the radiation image, can be observed with naked eyes. In the infrared capture devices of the conventional art, the radiation image needs to be converted to an electrical signal or image data, and then is displayed on a display device in order to observe the infrared image; whereas in the first aspect, if visible light is used as the readout light, the radiation image can be observed with naked eyes without conversion to electrical signals or image data.

In a second aspect, the present invention provides an imaging device having, in addition to the features of the imaging device of the first aspect, the features that the readout light supply unit has a readout light diaphragm positioned on said one side of the optical axis of the first lens system. This readout light diaphragm limits the fluxes of readout light rays.

By providing a readout light diaphragm, as in this second aspect, the contrast of the resultant optical image can be improved, which is desirable.

In a third aspect, the present invention provides an imaging device having, in addition to the features of the imaging device of the first or second aspect, the features that the ray flux limiting unit transmits light incident in a prescribed region, but does not transmit light incident in regions peripheral to the prescribed region and. Furthermore, the second lens system guides fluxes of rays that have been transmitted through the ray flux limiting unit towards the aforementioned conjugate positions.

In a fourth aspect, the present invention provides an imaging device including, in addition to the features of the imaging device of the first or second aspect, the features that the ray flux limiting unit reflects light incident in a prescribed region, but does not reflect light incident in regions peripheral to the prescribed region. Furthermore, the second lens system guides the fluxes of rays that have been reflected by the ray flux limiting unit to the aforementioned conjugate positions.

In a fifth aspect, the present invention provides an imaging device including, in addition to the features of the imaging device of the first or second aspect, the features that the ray flux limiting unit does not transmit light incident in a prescribed region and transmits light incident in regions peripheral to the prescribed region. Furthermore, the second lens system guides the ray fluxes that have been transmitted through the ray flux limiting unit to the aforementioned conjugate positions.

In a sixth aspect, the present invention provides an imaging device including, in addition to the features of the imaging device of the first or second aspect, the features that the ray flux limiting unit does not reflect light incident in a prescribed region and reflects light incident in regions peripheral to the prescribed region. Furthermore, the second lens system guides the ray fluxes that have been reflected by the ray flux limiting unit to the aforementioned conjugate positions.

The third through sixth aspects above exemplify the ray flux limiting unit. In the third and fourth aspects, ray fluxes that have been transmitted through or reflected only at a prescribed region surrounded by peripheral regions are guided to the aforementioned conjugate positions to form the optical image. Conversely, in the fifth and sixth aspects, ray fluxes that have been transmitted through or reflected only at peripheral regions are guided to the aforementioned conjugate positions to form the optical image.

Further, in the imaging device of any of the first through sixth aspects, a capture unit for capturing the optical image may optionally be provided. If equipped, such a capture unit can capture the optical image formed through the readout optical system. In this case, the image of the radiation can be captured, as in infrared capture devices of the conventional art.

In a seventh aspect, the present invention provides an optical system including a ray flux limiting unit which selectively passes only desired ray fluxes from among incident ray fluxes, and the ray flux limiting unit includes a spatial light modulation unit in which the site at which only the aforementioned desired ray fluxes are selectively passed is determined in accordance with an input signal. As explained above, the ray flux limiting unit selectively passes only desired ray fluxes. Here, the meaning of the expression, "pass," includes transmission and reflection (similarly for each of the aspects described below). In the seventh aspect, the aforementioned desired ray fluxes may, for example, be ray fluxes incident on a desired small area, or may be ray fluxes incident on the areas peripheral to a desired small area.

As the aforementioned spatial light modulation unit, for example, a configuration can be employed which uses a transmissive type or reflective type liquid crystal panel, or a DMD (Digital Micromirror Device, or Deformable Micromirror Device) having numerous micromirrors, arrayed in a checkerboard pattern, the inclination of each of which can separately be driven and controlled (as described for example in *Solid State Technology*, July 1994 issue, pages 63 to 68; SID, 1993 digest version, pages 1012 to 1015; or *SPIE Critical Reviews Series*, No. 1150, pages 86 to 102). These devices may also be used in a spatial light modulation unit of the eighth aspect described below.

In the imaging device of the seventh aspect, a ray flux limiting unit is configured using a spatial light modulation unit, so that simply by changing the signal input to the spatial light modulation unit, the position, size, shape, and other attributes of the site which selectively pass ray fluxes can be freely changed or set. Hence there is no need for rigorous exactness in positioning the spatial light modulation unit at the time of assembly, and assembly becomes easy. At the same time, not only the characteristics of the optical system, but also the characteristics of the device using the optical system, can be modified as suitable.

In an eighth aspect, the present invention provides an imaging device for conversion of radiation arriving within a prescribed area into an optical image, the imaging device including an optical readout type radiation/displacement conversion unit and a readout optical system. The optical readout type radiation/displacement conversion unit includes a plurality of radiation absorption parts, arranged at a plurality of locations positioned within the aforementioned prescribed area (area), each of which converts radiation received at the plurality of locations into heat; a plurality of displacement parts each of which converts the heat converted by each of the plurality of radiation absorption parts into displacements at positions corresponding to the aforementioned plurality of locations; and a plurality of reflection parts each of which changes in inclination in accordance with the displacement of the plurality of displacement parts. The aforementioned readout optical system has a readout light supply unit to supply readout light; a first lens system to guide the aforementioned readout light to the plurality of reflection parts of the aforementioned optical readout type radiation/displacement conversion unit; a ray flux limiting unit which selectively passes only desired ray fluxes among the ray fluxes of readout light reflected by the aforementioned plurality of reflection parts after passing through the first lens system; and a second lens system which forms positions conjugate with the aforementioned plurality of reflection parts in concert with the aforementioned first lens system, and moreover which guides ray fluxes which have passed through the aforementioned ray flux limiting unit to the conjugate positions. The aforementioned readout light supply unit supplies the aforementioned readout light such that the aforementioned readout light passes through the region on one side of the optical axis of the aforementioned first lens system. The aforementioned ray flux limiting unit includes a spatial light modulation unit in which the site at which only the aforementioned desired ray fluxes are selectively passed is determined in accordance with input signals in the region on the other side of the optical axis of the aforementioned first lens system.

In this eighth aspect, infrared rays, X-rays, ultraviolet rays, or other radiation arriving in a prescribed area irradiates a plurality of radiation absorption parts, and the radiation is absorbed and converted into heat at each of a plurality of locations by the plurality of radiation absorption parts. Each of the heat quantities converted at the plurality of radiation absorption parts is converted into a displacement at a position corresponding to the aforementioned plurality of locations by a plurality of displacement parts. The inclinations of a plurality of reflection parts changes in accordance with the displacement of a plurality of displacement parts. In other words, the radiation incident on each radiation absorption part is converted into an inclination of each reflection part, in accordance with the amount of radiation. On the other hand, readout light which is either visible light or some other light, from a readout light supply unit via a first lens system, irradiates the plurality of reflection parts. Hence the radiation irradiating each radiation absorption part is converted into a direction (the reflected direction) for readout light reflected by each reflection part. Ray fluxes of the readout light reflected by the plurality of reflection parts pass through the first lens system, and only the desired ray fluxes among the ray fluxes which have passed through the first lens system are then passed selectively through the ray flux limiting unit. Ray fluxes which have been passed through the ray flux limiting unit are guided by a second lens system to positions conjugate with the aforementioned plurality of reflection parts, which have been formed by the first lens system and second lens system. Hence an image employing readout light of the aforementioned plurality of reflection parts is formed at these conjugate positions. Individual ray fluxes forming images of each reflection part are limited by the ray flux limiting unit by an amount corresponding to the reflection direction of each reflection part, so that the quantities of light of the individual images of each reflection part formed at the aforementioned conjugate positions differ according to the inclinations of each reflection part; that is, according to the quantities of radiation incident on the corresponding radiation absorption parts. In this way, an image of the radiation arriving within the prescribed area is converted into an optical image employing the readout light, and this optical image is formed at the aforementioned conjugate positions.

In the aforementioned eighth aspect, the radiation image is converted into an optical image employing the readout light according to the principles above, so that in a specified state (for example, the state in which no radiation is incident), the directions of each reflection part of the optical readout type radiation/displacement conversion unit must be aligned with the site through which ray fluxes are passed in the ray flux limiting unit. If, as the ray flux limiting unit, a pinhole plate which is fixed in place at the time of assembly is used, then considerable labor may be required for the alignment at the time of assembly. On the other hand, in the aforementioned eighth aspect, the ray flux limiting unit is configured using a spatial light modulation unit, so that simply by changing the signal input to the spatial modulation unit, the position, size, shape and other attributes of the site through which ray fluxes are selectively passed can be changed and set freely. Hence in the aforementioned eighth aspect, there is no longer any need for rigorous exactness in alignment of the spatial light modulation unit during assembly, so that assembly is made easy.

Further, in the aforementioned eighth aspect, a radiation image is converted into an optical image employing readout light according to the principles described above, so that by changing one or more of the position, size, shape or other attributes of the site which selectively passes ray fluxes in the ray flux limiting unit, the relation between the quantity of radiation (that is, the inclination of each reflection part) and the quantity of light in the optical image can be changed, and the characteristics inherent to the imaging device can be modified. For example, the range of the quantity of radiation that can be observed can be shifted, and the rate of change of the amount of light in the optical image relative to the rate of change of the amount of radiation can be changed.

In the aforementioned eighth aspect, an optical image is formed according to the inclinations of each reflection part based on the readout light; therefore, if visible light is used as the readout light, the optical image equivalent to the radiation image can be observed with the unaided eye. Of course, a capture unit for capturing the aforementioned optical image may be provided. In this case, the image due to the radiation can be captured. This applies similarly to each of the aspects explained below as well.

In a ninth aspect, the present invention provides an imaging device including, in addition to the features of the aforementioned eighth aspect, the features that the aforementioned readout light supply unit has a readout light diaphragm positioned on the aforementioned one side, with the readout light diaphragm also serving as the aforementioned spatial light modulation unit.

When a readout light diaphragm is provided as in this ninth aspect, the contrast of the aforementioned optical image is improved, which is desirable. Of course, as the readout light diaphragm, a pinhole plate or the like may be used. However, in this case additional labor may be required for alignment of the pinhole plate or the like, and moreover the number of parts is increased. In this respect, when the readout light diaphragm also serves as the aforementioned spatial light modulation unit, as in the aforementioned ninth aspect, the labor of alignment is alleviated, and the number of parts can be reduced as well.

In a tenth aspect, the present invention provides an imaging device including, in addition to the features of the aforementioned eighth or ninth aspect, the features that a setting unit is provided for outputting setting signals according to user operation, and signals in accordance with the aforementioned setting signals are used as the aforementioned input signals.

If such a setting unit is provided as in this tenth aspect, it is more convenient for use by the manufacturer in performing alignment of the aforementioned site at the time of assembly, or for use by the user in changing and observing the characteristics inherent to the imaging device described above.

In an eleventh aspect, the present invention provides an imaging device including, in addition to the features of any of the aforementioned eighth through tenth aspects, a temperature sensor which detects the temperature of a prescribed portion of the aforementioned optical readout type radiation/displacement conversion unit, and a correction unit for correction of the aforementioned input signals, based on detection signals from the aforementioned temperature sensor, so as to adjust the position of the aforementioned site such that the effect accompanying fluctuations in temperature of the aforementioned optical readout type radiation/displacement conversion unit is reduced.

In an imaging device, such as those of the aforementioned eighth through tenth aspects, even when the amount of incident radiation does not change, if there are fluctuations in the temperature of the optical readout type radiation/displacement conversion unit, the inclination of the reflection part will change, and the direction of readout light reflected by the reflection part will change. Consequently, if the position of the aforementioned site in the ray flux limiting unit is not changed, the amount of light in the optical image will fluctuate. However, if, as in the aforementioned eleventh aspect, the position of the aforementioned site in the ray flux limiting unit is adjusted according to the temperature of the optical readout type radiation/displacement conversion unit, then fluctuations in the quantity of light in the optical image can be reduced even when there are fluctuations in the temperature of the optical readout type radiation/displacement conversion unit.

In order to avoid the effects of the ambient temperature, it is also effective to place the optical readout type radiation/displacement conversion unit in a container and use a Peltier element or some other temperature regulator to maintain the temperature of the optical readout type radiation/displacement conversion unit at a desired temperature. However, even in this case, slight fluctuations in the temperature of the optical readout type radiation/displacement conversion unit may not be avoided. In the aforementioned eleventh aspect, the effect of such temperature fluctuations can be also reduced.

In a twelfth aspect, the prevent invention provides an imaging device for conversion of radiation arriving within a prescribed area into an optical image, the imaging device including an optical readout type radiation/displacement conversion unit, a readout optical system, and a position adjustment mechanism. The optical readout type radiation/displacement conversion unit includes a plurality of radiation absorption parts, arranged at a plurality of locations positioned within the aforementioned prescribed area, each of which converts radiation received at the plurality of locations into heat; a plurality of displacement parts each of which converts the heat converted by each of the plurality of radiation absorption parts into displacements at positions corresponding to the aforementioned plurality of locations; and a plurality of reflection parts each of which changes in inclination in accordance with the displacement of the plurality of displacement parts. The aforementioned readout optical system has a readout light supply unit to supply readout light; a first lens system to guide the aforementioned readout light to the plurality of reflection parts of the aforementioned optical readout type radiation/displacement conversion unit; a ray flux limiting unit which selectively passes only desired ray fluxes among the ray fluxes of readout light reflected by the aforementioned plurality of reflection parts after passing through the first lens system; and a second lens system which forms positions conjugate with the aforementioned plurality of reflection parts in concert with the aforementioned first lens system, and moreover which guides ray fluxes which have passed through the aforementioned ray flux limiting unit to the conjugate positions. The aforementioned readout light supply unit supplies the aforementioned readout light such that the aforementioned readout light passes through the region on one side of the optical axis of the aforementioned first lens system. The aforementioned ray flux limiting unit is configured such that the site which selectively passes only the aforementioned desired ray fluxes is positioned in the region on the other side of the optical axis of the aforementioned first lens system. The aforementioned position adjustment mechanism mechanically adjusts the position of the aforementioned site.

In this twelfth aspect also, by action similar to that of the aforementioned eighth aspect, the image of radiation arriving in the prescribed area is converted into an optical image employing readout light, and this optical image is formed in the prescribed position. Hence in this twelfth aspect also, it is necessary to align the directions of each of the reflecting parts of the optical readout type radiation/displacement conversion unit and the site which passes ray fluxes in the ray flux limiting unit. In this twelfth aspect, in contrast with the aforementioned eighth aspect, the ray flux limiting unit may be a pinhole plate or the like, for example. However, because of the presence of the aforementioned position adjustment mechanism, the position of the site passing ray fluxes in the ray flux limiting unit can be freely set and changed. Hence by this twelfth aspect, there is no longer a need for rigorous exactness in alignment of the ray flux limiting unit at the time of assembly, and assembly is made easy.

Further, in the aforementioned twelfth aspect, the radiation image is converted into an optical image employing readout light according to principles similar to those of the aforementioned eighth aspect, so that by changing the position of the site which selectively passes ray fluxes in the ray flux limiting unit, the relation between the quantity of radiation (in other words, the inclination of each reflecting part) and the quantity of light in the optical image can be changed, and the characteristics inherent to the imaging device can be modified. For example, the range of the quantity of radiation that can be observed can be shifted.

In a thirteenth aspect, the present invention provides an imaging device including, in addition to the features of the aforementioned twelfth aspect, a setting unit for activating the aforementioned position adjustment mechanism in accordance with user operation.

If such a setting unit is provided as in this thirteenth aspect, it is convenient for use by the manufacturer in performing alignment of the aforementioned site at the time of assembly, or for use by the user in changing and observing the characteristics inherent to the imaging device described above.

In a fourteenth aspect, the present invention provides an imaging device including, in addition to the features of the aforementioned twelfth or thirteenth aspect, a temperature sensor which detects the temperature of a prescribed portion of the aforementioned optical readout type radiation/displacement conversion unit, and a control unit which activates the aforementioned position adjustment mechanism based on detection signals from the aforementioned temperature sensor, such that the effect accompanying fluctuations in temperature of the aforementioned optical readout type radiation/displacement conversion unit is reduced.

In this fourteenth aspect, similar to the aforementioned eleventh aspect, fluctuations in the quantity of light in the optical image can be reduced even when there are fluctuations in the temperature of the optical readout type radiation/displacement conversion unit.

In a fifteenth aspect, the present invention provides a thermal displacement element including a base and a displacement part which is supported by the base and which is displaced with respect to the aforementioned base in response to heat, the displacement part including a plurality of individual displacement parts. Also, each of the aforementioned plurality of individual displacement parts extends in linear fashion, and each has at least two overlapping layers of different materials with different coefficients of thermal expansion. The aforementioned plurality of individual displacement parts are positioned in parallel. Each of the ends of the aforementioned plurality of individual displacement parts is fixed to the aforementioned base or mechanically connected via a connecting part to one end of another individual displacement part, such that the aforementioned plurality of individual displacement parts as a whole forms a single mechanically connected body. One end of at least one individual displacement part of the aforementioned plurality of individual displacement parts is fixed with respect to the aforementioned base. Neither end of at least one individual displacement part of the aforementioned plurality of individual displacement parts is fixed with respect to the aforementioned base.

In this fifteenth aspect of the invention, the displacement part has a plurality of individual displacement parts mechanically connected via connecting parts. Therefore, approximately the same amount of displacement can be obtained as in the case where, for example, the displacement part has a single individual displacement part having a length equal to the total of the lengths of individual displacement parts (as in the case where length L of the thermal displacement element of FIGS. 31A–31C, which will be described below, is made equal to the total length). Despite the fact that such a large amount of displacement can be obtained, the displacement part does not consist of a single individual displacement part as in the aforementioned thermal displacement element; instead, the displacement part has a plurality of individual displacement parts connected via connecting parts, so that there is greater freedom of positioning of each individual displacement part. For this reason, even when a plurality of displacement parts is positioned on a base, the positioning can be made more nearly ideal, for example by increasing the distribution density of the plurality of displacement parts.

In this way, in the aforementioned fifteenth aspect, even when a plurality of displacement parts is positioned on a base, a large amount of displacement can be obtained, and moreover the positioning can be made more nearly ideal.

In a sixteenth aspect, the present invention provides a thermal displacement including, in addition to the features of the fifteen aspect above, the features that when, on that route among the routes mechanically continuous from a certain individual displacement part among the aforementioned plurality of individual displacement parts to the aforementioned base for which the number of individual displacement parts contained in the route is smallest, if the individual displacement part is the Nth individual displacement part counting from the side of the aforementioned base, then the individual displacement part is defined to be the Nth-stage individual displacement part, the Nth-stage individual displacement part is defined to be the previous-stage individual displacement part with respect to the N+1th-stage individual displacement part, and the N+1th-stage displacement part is defined to be the next-stage individual displacement part with respect to the Nth-stage individual displacement part; then (1) in each of the aforementioned connecting parts, the ends of the previous-stage individual displacement part and next-stage individual displacement part mutually connected via the same connecting part are ends on the same side of the aforementioned previous-stage and next-stage individual displacement parts; and, (2) the relation of magnitude of the expansion coefficients of the materials of the aforementioned two or more layers of each of the aforementioned stages of individual displacement parts is opposite to the relation of magnitude of the expansion coefficients of the aforementioned two or more layers of the next-stage individual displacement part. Further, the ends on the same side of the next-stage and previous-stage individual displacement parts means, if the previous-stage and next-stage individual displacement parts extend linearly in for example the left-right direction, either the right-side end of the previous-stage individual displacement part and the right-side end of the next-stage individual displacement part, or else the left-side end of the previous-stage individual displacement part and the left-side end of the next-stage individual displacement part.

In this sixteenth aspect, the previous-stage individual displacement part and next-stage individual displacement part, positioned in parallel, are mechanically connected via a connecting part at ends on the same side of the aforementioned previous-stage and next-stage individual displacement parts, so that the previous-stage displacement part and next-stage displacement part are mechanically connected so as to be folded-over at the connecting part. Hence the length of the displacement part (the length in the direction in which the individual displacement part is linearly extended) can be made considerably shorter than the total of the lengths of each individual displacement part from the first stage to the last stage. Therefore, even when positioning a plurality of displacement parts on a base, the positioning can be made more nearly ideal, for example by increasing the distribution density of the plurality of displacement parts. In the aforementioned sixteenth aspect, the relation of magnitude of the expansion coefficients of the materials of the aforementioned two or more layers of each of the aforementioned stages of individual displacement parts is opposite to the relation of magnitude of the expansion coefficients of the aforementioned two or more layers of the next-stage individual displacement part, so that the displacement amount which is the total of the individual displacement amounts occurring in each individual displacement part occurs in the last-stage individual displacement part. Because of this, approximately the same amount of displacement can be obtained as in the case when the displacement part has a single individual displacement part having length equal to the total of the lengths of each individual displacement part from the first stage to the last stage (when, in the aforementioned thermal displacement element of FIGS. 31A–31C, which will be described below, the length L is made equal to the total length).

This way, in the aforementioned sixteenth aspect, even when a plurality of displacement parts is positioned on the base, a large amount of displacement can be obtained, and moreover the positioning can be made nearly ideal.

In a seventeenth aspect, the present invention provides a thermal displacement element including, in addition to the features of the aforementioned fifteenth or sixteenth aspect, the features that when, on that route among the routes mechanically continuous from a certain individual displacement part among the aforementioned plurality of individual displacement parts to the aforementioned base for which the number of individual displacement parts contained in the route is smallest, if the individual displacement part is the Nth individual displacement part counting from the side of the aforementioned base, then the individual displacement part is defined to be the Nth-stage individual displacement part; (1) the number of first-stage individual displacement parts is two, and the number of last-stage individual displacement parts is one or two; and, (2) the structure from one of the aforementioned two first-stage individual displacement parts to one of the aforementioned two last-stage individual displacement parts or to the aforementioned single last-stage displacement part, and the structure from the other of the aforementioned two first-stage individual displacement parts to the other of the aforementioned two last-stage individual displacement parts or to the aforementioned single last-stage displacement part, are symmetrical.

In the aforementioned fifteenth and sixteenth aspects, one end of the first-stage individual displacement part is a fixed end with respect to the base, and one end of the last-stage individual displacement part is a free end; but if, as in the aforementioned seventeenth aspect, there are two first-stage individual displacement parts, and the structures from each of these to the last-stage individual displacement part(s) are symmetrical, then the displacement part is stably supported with respect to the base. Consequently in the aforementioned seventeenth aspect, a structure with high mechanical strength can be realized.

In a eighteenth aspect, the present invention provides a thermal displacement element including, in addition to the features of the aforementioned fifteenth or sixteenth aspect, the features that when, on that route among the routes mechanically continuous from a certain individual displacement part among the aforementioned plurality of individual displacement parts to the aforementioned base for which the number of individual displacement parts contained in the route is smallest, if the individual displacement part is the Nth individual displacement part counting from the side of the aforementioned base, then the individual displacement part is defined to be the Nth-stage individual displacement part; (1) the number of first-stage individual displacement parts is one, and the number of last-stage individual displacement parts is two; and, (2) the structure from the aforementioned first-stage individual displacement part to one of the aforementioned two last-stage individual displacement parts, and the structure from the aforementioned first-stage individual displacement part to the other of the aforementioned two last-stage individual displacement parts, are symmetrical.

In the thermal displacement elements of any of the aforementioned fifteenth through eighteenth aspects, the center of gravity of the aforementioned connected body may be close to the central position of support of the aforementioned connected body by the aforementioned base. In this case, the balance of the connected body, that is, of the displacement parts, is good, and a structure with high mechanical strength can be realized.

In a nineteenth aspect, the present invention provides a radiation detection device including a thermal displacement element of any of the aforementioned fifteenth through eighteenth aspects, and a displacement readout member which is fixed with respect to the aforementioned last-stage individual displacement unit and is used in order to obtain prescribed changes in response to displacements occurring in the individual displacement part(s) of the aforementioned last stage; the aforementioned plurality of individual displacement parts receives radiation and emits heat. The aforementioned radiation may be not only infrared rays, but also X-rays, ultraviolet rays and other invisible light, as well as various other kinds of radiation.

In this nineteenth aspect, the thermal displacement element of one of the aforementioned fifteenth through eighteenth aspects is used, so that even when a plurality of pixels are positioned, the radiation detection sensitivity can be raised, without lowering the spatial resolution or degrading the quality of the obtained image.

The thermal displacement element of the aforementioned fifteenth through eighteenth aspects need not always be used in a radiation detection device, but may, for example, be used as a simple temperature sensor or as a sensor for detection of temperature distribution images, depending on needs.

In the radiation detection device of the aforementioned nineteenth aspect, the aforementioned displacement readout member may be positioned either above or below the aforementioned displacement part with an intervening space. In this case, the displacement part and the displacement readout member overlap vertically, so that the area occupied overall can be reduced, and even when a plurality of pairs of displacement parts and displacement readout members are positioned on the base, the positioning can be made more nearly ideal.

In a twentieth aspect, the present invention provides a radiation detection device including a base, a displacement part, supported by the base, which is displaced with respect to the aforementioned base in response to heat generated when radiation is absorbed, and a displacement readout member, fixed with respect to the displacement part, which is used to obtain a prescribed change in response to displacements occurring in the aforementioned displacement part. Moreover the aforementioned displacement readout member is positioned either above or below the aforementioned displacement part with an intervening space.

In this twentieth aspect, the displacement readout member is positioned above or below the displacement part with an intervening space, so that the displacement part and the displacement readout member overlap vertically; hence the area occupied overall can be reduced, and even when a plurality of pairs of displacement parts and displacement readout members are positioned on the base, the positioning can be made more nearly ideal.

In the radiation detection device of the aforementioned twentieth aspect, at least one among the center of gravity of the part located near the plane containing the aforementioned displacement readout member, the center of support by the aforementioned displacement part which is the center of support of the aforementioned part located near the plane containing the aforementioned displacement readout member, and the center of gravity of the aforementioned displacement part, may be near the central support location of the aforementioned displacement part by the aforementioned base. In this case, the overall balance of the displacement part supported by the base and the displacement readout member is good, and a structure with high mechanical strength can be realized.

In the radiation detection devices of the aforementioned nineteenth and twentieth aspects, the aforementioned displacement readout member may be a reflecting plate which reflects incoming readout light, and may be an electrode. The former is an example of application of the aforementioned nineteenth and twentieth aspects to a so-called optical readout type radiation detection device, in which the amount of incident radiation is read out as changes in readout light. The latter is an example of application of the aforementioned nineteenth and twentieth aspects to an electrostatic capacitance type radiation detection device or the like, which reads out the amount of incident radiation as changes in electrostatic capacitance. Of course the aforementioned nineteenth and twentieth aspects are not limited to these types of radiation detection device.

In a radiation detection device of the aforementioned nineteenth and twentieth aspects, a plurality of elements may be provided wherein the aforementioned displacement part and aforementioned displacement readout member comprise one element, with the elements arranged in one dimension or in two dimensions. In this case, an image of the radiation can be formed. However, in the aforementioned nineteenth and twentieth aspects, only a single pair of a displacement part and displacement readout member may be present as well.

Reference will now be made in detail to the preferred embodiments of the present invention, examples of which are illustrated in the accompanying drawings.

Some of examples below specifically uses infrared light as radiation to be processed and visible light as readout light. However, in the present invention the radiation may be X-rays, ultraviolet rays, or various other types of radiation other than infrared rays. Moreover, light other than visible light may be used as the readout light.

First Preferred Embodiment

Figure 2A:
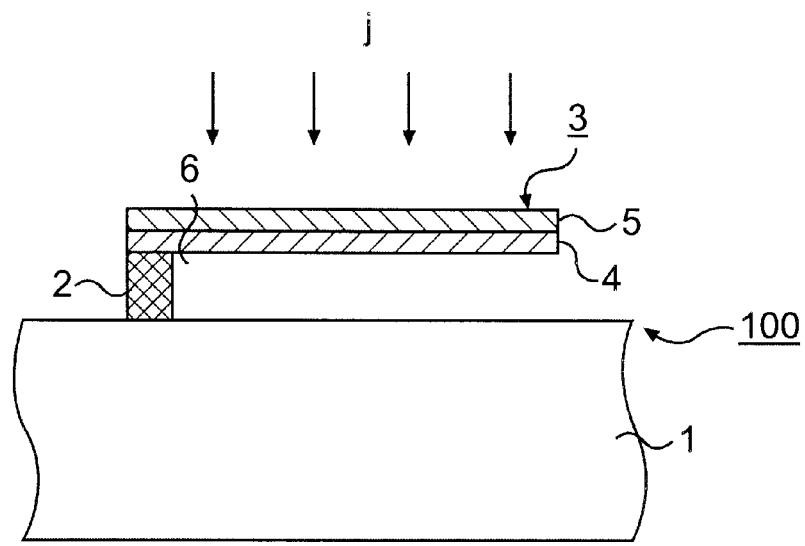
FIGS. 2A and 2B schematically show an optical readout type radiation/displacement conversion device used in the first preferred embodiment.
Figure 2B:
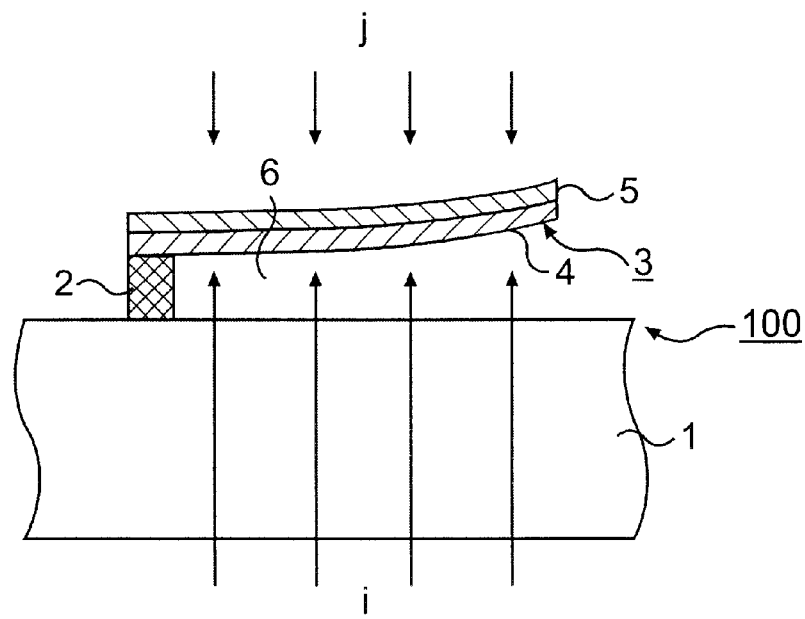

FIG. 1 is a schematic view of an imaging device of the first preferred embodiment of the present invention. FIGS. 2A and 2B schematically show an optical readout type radiation/displacement conversion device 100 used in this preferred embodiment. FIG. 2A schematically shows a cross-section of the state in which infrared rays i are not incident on a unit pixel (unit element), and FIG. 2B shows schematically a cross-section of the state in which infrared rays i are incident on a unit pixel.

The imaging device of this preferred embodiment is, as shown in FIG. 1, provided with an optical readout type radiation/displacement conversion device 100. This device 100 is provided with a silicon or other substrate 1 which transmits infrared rays i, and a supported part 3 which is supported in a suspended state over the substrate 1 with an interval 6 between via a leg part 2. The supported part 3 has two overlapping films 4, 5. The lower film 4 is an infrared absorption part, receiving infrared rays i and converting them into heat. One end of the films 4, 5 is supported via the leg part 2, in a cantilevered configuration. The films 4, 5 are made of different materials with different expansion coefficients, in a so-called thermal bimorph construction (or bimetal like construction). Hence in this preferred embodiment, the films 4, 5 comprise a displacement part which is displaced with respect to the substrate 1 in response to heat generated in the film 4 as an infrared ray absorption part. When the expansion coefficient of the lower film 4 is larger than the expansion coefficient of the upper film 5, the aforementioned heat causes it to be curved and inclined upwards, as shown in FIG. 2B. The upper film 5 comprises a reflection part which reflects the readout light (visible light or other light) j from above. For this reason, the film 5, as the reflection part, receives the readout light j and reflects the received readout light in a reflected direction corresponding to the displacement of the films 4, 5. In this preferred embodiment, in the state in which infrared rays i are not received, the film 5 is parallel with the plane of the substrate 1. Of course the films 4, 5 may be inclined in advance in the state in which infrared rays i are not received.

As is clear from the above explanation, in this preferred embodiment the film 4 serves as part of the displacement part and also as the infrared absorption part, and the film 5 serves as part of the displacement part and also as the readout light reflection part. Of course these can each be configured using different films also.

In this preferred embodiment, the films 4, 5 and leg part 2 comprise a unit pixel (unit element), and the pixels are arranged in two dimensions on the substrate 1.

The conversion device 100 can be fabricated using film formation and patterning, formation and removal of a sacrificial film, and other techniques of semiconductor manufacturing.

Again referring to FIG. 1, in addition to the aforementioned optical readout type radiation/displacement conversion device 100, the imaging device of this preferred embodiment includes a readout optical system, a two-dimensional charge coupled device (CCD) 20 as a capture unit, and an infrared ray imaging lens 30 which condenses infrared rays from the heat source 31 which is the object to be observed and focuses an infrared ray image of the source of heat 31 on a surface on which are distributed films 4 as the infrared absorption parts of the conversion device 100.

In this preferred embodiment, the aforementioned readout optical system includes a laser diode (LD) 10 as a readout light supply unit in order to supply readout light; a first lens system 11 to guide readout light from the LD 10 to the plurality of reflection parts 5 (films 5) of the conversion device 100; a ray flux limiting part 12 to selectively pass only desired ray fluxes among those ray fluxes of readout light reflected by the plurality of reflection parts 5 after passing through the first lens system 11; and a second lens system 13 which forms positions conjugate with the aforementioned plurality of reflection parts 5 in concert with the aforementioned first lens system 11, and moreover guides the fluxes of light rays which have passed through the aforementioned ray flux limiting part 12 to the conjugate positions. The photosensitive surface of a CCD 20 is placed at the aforementioned conjugate positions, and by means of the lens systems 11, 13, the plurality of reflection parts 5 and the plurality of photosensitive elements of the CCD 20 are in an optically conjugate relation.

The LD 10 is positioned on one side (in FIG. 1, the right side) of the optical axis O of the first lens system 11, and supplies readout light such that the readout light passes through the region of the said side. In this preferred embodiment, the LD 10 is positioned near the focal plane of the first lens system 11 on the side of the second lens system 13, and readout light passing through the first lens system 11 irradiates the plurality of reflection parts 5 as an approximately parallel beam of light. In this preferred embodiment, the conversion device 100 is positioned such that the plane of the substrate 1 (in this preferred embodiment, parallel to the surfaces of the reflection parts 5 when no infrared rays are incident) is orthogonal to the optical axis O. Other positioning arrangements can be implemented.

The ray flux limiting part 12 is configured such that the sites through which the aforementioned desired ray fluxes are selectively passed are positioned in the region on the other side (in FIG. 1, the left side) of the optical axis O of the first lens system 11.

Figure 3A:
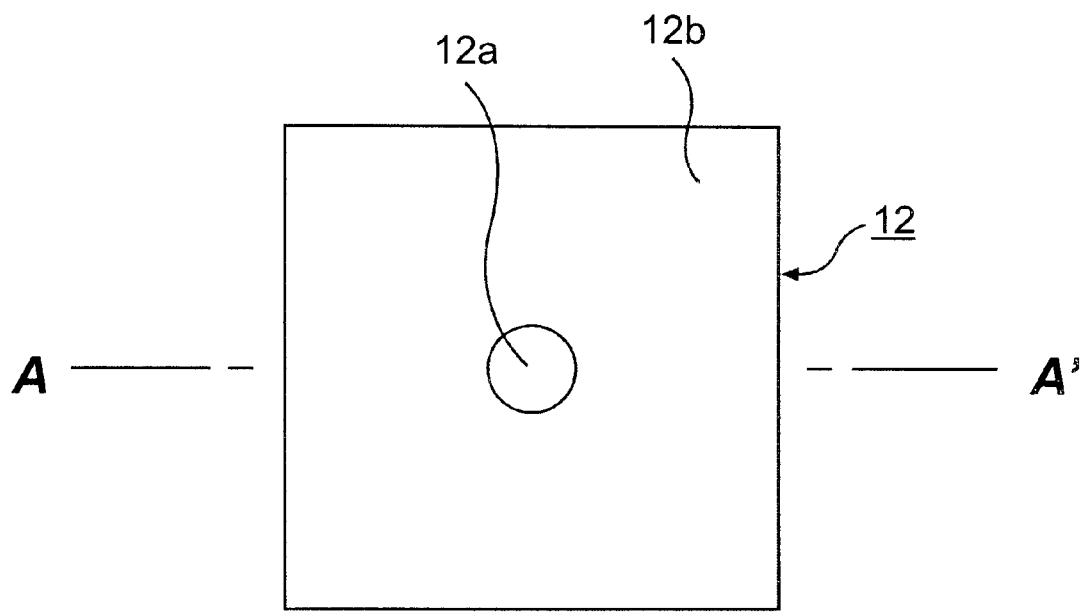
FIGS. 3A and 3B schematically show a ray flux limiting part used in the first preferred embodiment.
Figure 3B:
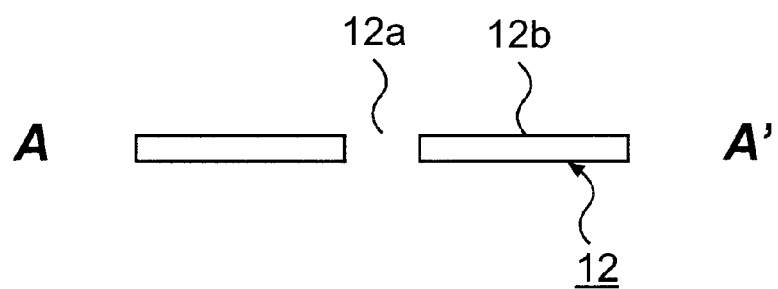

This ray flux limiting part 12 is shown in FIGS. 3A and 3B. FIG. 3A is a schematic plan view; FIG. 3B is a schematic cross-sectional view along the line A–A' in FIG. 3A. This ray flux limiting part 12 includes a shield plate 12b having an aperture 12a, configured as an aperture diaphragm. Hence this ray flux limiting part 12 has the characteristic of transmitting light incident in the region of the aperture 12a, and not transmitting light incident in peripheral regions. In this preferred embodiment, the ray flux limiting unit 12 is positioned such that, when no infrared rays are incident on infrared ray absorption parts corresponding to any reflection parts 5 and the planes of all reflection parts are parallel with the plane of the substrate 1, the position at which the ray fluxes reflected by all the reflection parts 5 (the bundle of individual ray fluxes reflected by each reflection part 5) are condensed by the first lens system 11 and the position of the aperture 12a essentially coincide. Further, the size of the aperture 12a is determined such that it essentially coincides with the size of the cross-section of this ray flux at the aforementioned condensing point. Of course, other positioning and sizes are also possible. For example, the position of the aperture 12a may be placed such that, when relatively intense infrared rays are incident and all the reflection parts 5 are inclined as much as possible, it essentially coincides with the position of the condensing point at which the ray fluxes reflected by all reflection parts 5 are condensed by the first lens system 11. In this case, dark and light areas in the optical image formed on the CCD 20 are reversed.

In this preferred embodiment, the region of the aperture 12a of the ray flux limiting part 12 is the site which selectively passes (in this preferred embodiment, transmits) only the aforementioned desired ray fluxes, and the second lens system 13 guides ray fluxes transmitted by the aperture 12a to the aforementioned conjugate positions.

In this preferred embodiment, ray fluxes 41 of readout light emitted from the LD 10 are incident on the first lens system 11, and become approximately parallel ray fluxes 42. These approximately parallel ray fluxes 42 are incident, at a certain angle with respect to the normal to the substrate 1, on all the reflection parts 5 of the conversion device 100.

On the other hand, by means of the imaging lens 30, infrared rays from the heat source 31 are condensed, and an infrared ray image of the heat source 31 is formed on the plane on which are distributed films 4 as infrared absorption parts of the conversion device 100. These incident infrared rays are absorbed by the films 4 as infrared absorption parts and converted into heat. The films 4, 5, as a displacement part forming a cantilever, are curved upward and inclined in accordance with the heat generated in the film 4. Consequently, each reflection part 5 is inclined with respect to the plane of the substrate 1 by an amount in accordance with the amount of infrared rays incident on the infrared absorption part 4 corresponding to said reflection part 5.

Suppose now that infrared rays are not incident on any of the infrared absorption parts 4, and that all the reflection parts 5 are parallel with the substrate 1. Ray fluxes 42 incident on the plurality of reflection parts 5 are reflected by the plurality of reflection parts 5 to become the ray fluxes 43, and these are again incident on the first lens system 11, this time from the side opposite the side of the LD 10, to become the condensed beam 44, and are condensed at the site of the aperture 12a of the ray flux limiting part 12 placed at the position of the condensed point of this condensed beam 44. As a result, the condensed beam 44 is transmitted through the aperture 12a, becomes the divergent beam 45, and is incident on the second lens system 13. After incidence on the second lens system 13, the divergent beam 45 becomes, for example, the approximately parallel beam 46 by means of this second lens system 13, and is then incident on the photosensitive surface of the CCD 20. Here the plurality of reflection parts 5 and the photosensitive surface of the CCD 20 are in a conjugate relation through the lens systems 11, 13, so that images of each reflection part 5 are formed on each of the corresponding sites on the photosensitive surface of the CCD 20, and as a whole, an optical image is formed as a distributed image of the plurality of reflection parts 5.

Suppose now that a certain quantity of infrared rays is incident on an infrared absorption part 4 corresponding to a certain reflection part 5, and that the reflection part 5 is inclined with respect to the plane of the substrate 1 by an amount in accordance with the quantity of infrared rays. Of the ray fluxes 42, the individual ray flux incident on said reflection part 5 is reflected by the reflection part 5 in a direction differing by the amount of its inclination, so that after passing through the first lens system 11, it is condensed in a position shifted from the aforementioned position of condensation (that is, the aperture 12a) by an amount in accordance with the inclination, and is obstructed by the ray flux limiting part 12 by an amount in accordance with the inclination. Hence of the overall optical image formed on the CCD 20, the amount of light in the image of said reflection part 5 is decreased by an amount in accordance with the amount of inclination of said reflection part 5.

Hence the optical image of the readout light formed on the photosensitive surface of the CCD 20 is a likeness of the infrared image incident on the conversion device 100. This optical image is captured by the CCD 20. It is desirable that the reflection parts 5 of each of the pixels of the conversion device 100 correspond to each of the pixels of the CCD 20. Moreover, instead of using a CCD 20, an eyepiece or other means may be used to observe the aforementioned optical image with the unaided eye.

In this way, in this preferred embodiment, infrared rays are converted into heat, this heat is converted into displacement, and this displacement is detected as a change in light quantity by a readout optical system, thereby converting an infrared image into an optical image. The displacement detection by the aforementioned readout optical system can be performed with high sensitivity, so that infrared rays can be detected with high sensitivity, and infrared images can be formed into images with high sensitivity. Further, in this preferred embodiment infrared rays are not converted into an electrical resistance (electrical signal) after conversion into heat; instead, infrared rays are converted into changes in readout light after conversion into heat and displacement, so that there is no need to pass an electric current in the conversion device 100, and there is no self-heating. Hence in this preferred embodiment, heat due only to incident infrared rays can be detected, so that detection accuracy is improved and infrared images can be converted into optical images with good accuracy. In this preferred embodiment, there is no need for cooling equipment, which is necessary in quantum type infrared detectors. Further, in this preferred embodiment infrared rays are not read out as electrical signals, so that there is no need for a readout circuit for weak electrical signals, necessary in the aforementioned thermal type infrared detectors of the conventional art.

Moreover, if in the arrangement shown FIG. 1 a conversion device having only a single pixel (element) is used as the conversion device 100, and in place of the two-dimensional CCD, a photodetector having a single photosensitive part is used, the radiation detection device can be configured as a so-called point sensor of infrared rays.

Second Preferred Embodiment

Figure 4A:
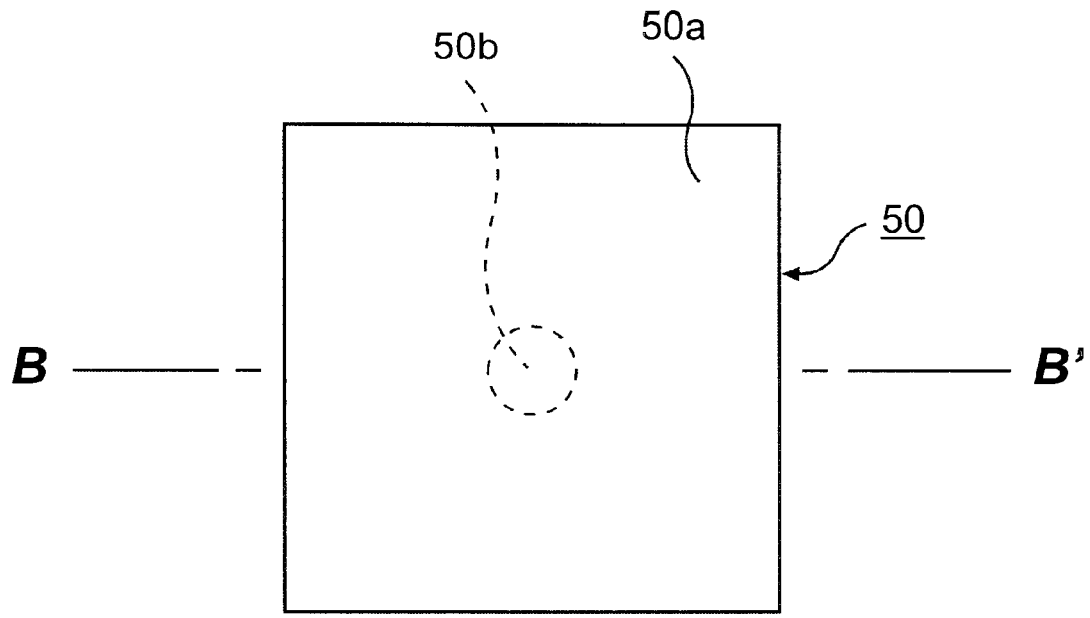
FIGS. 4A and 4B schematically show a ray flux limiting part used in a second preferred embodiment of the present invention.
Figure 4B:
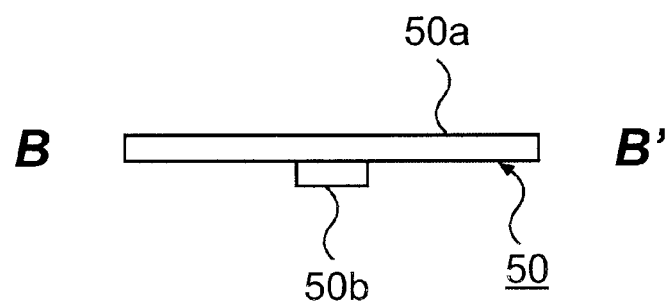

In an imaging device of a second preferred embodiment of the present invention, in place of the ray flux limiting part 12 of the aforementioned first preferred embodiment, the ray flux limiting part 50 shown in FIGS. 4A and 4B is used; otherwise the configuration is the same as in the aforementioned first preferred embodiment. FIG. 4A is a schematic plan view of the ray flux limiting part 50, and FIG. 4B is a schematic cross-sectional view taken along the line B–B' in FIG. 4A.

The ray flux limiting part 50 reverses the relation between transmission and obstruction of the readout light transmission region (the region of the aperture 12a) and the readout light obstruction region (the region peripheral to the aperture 12a) of the ray flux limiting part 12 in FIGS. 3A and 3B. Specifically, the ray flux limiting part 50 has a construction in which a shield film 50b is formed on a transparent plate 50a which transmits readout light. The region of the shield film 50b corresponds to the region of the aperture 12a of the ray flux limiting part 12 in FIGS. 3A and 3B. Hence this ray flux limiting part 50 has a characteristic which does not transmit light incident in the region of the shield film 50b, and transmits light incident in the peripheral region.

In this preferred embodiment, the region peripheral to the shield film 50b of the ray flux limiting part 50 is the site which selectively passes (in this preferred embodiment, transmits) only the aforementioned desired ray fluxes. The second lens system 13 guides those ray fluxes transmitted through the region peripheral to the shield film 50b to the aforementioned conjugate positions.

In this preferred embodiment, dark and light areas in the optical image formed on the photosensitive surface of the CCD 20 are reversed compared with the aforementioned first preferred embodiment, but in essence the operation is similar to that of the aforementioned first preferred embodiment, and similar advantages are obtained.

Moreover, in the above first and second preferred embodiments, a laser diode (LD) was employed as the readout light supply unit; but a light-emitting diode (LED) may be employed instead.

Third Preferred Embodiment

Figure 5:
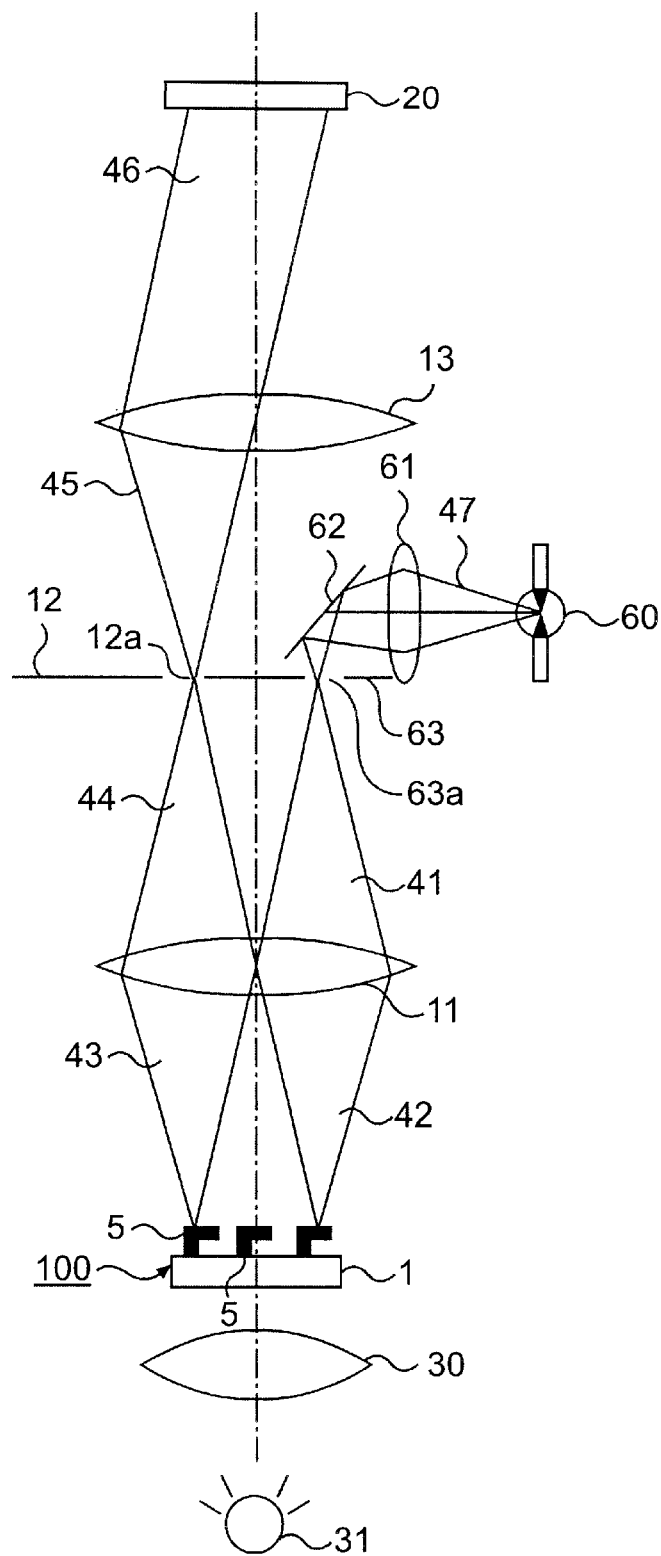
FIG. 5 schematically shows an imaging device according to a third preferred embodiment of the present invention.

FIG. 5 is a schematic view showing an imaging device according to a third preferred embodiment of the present invention. In FIG. 5, components which are the same as or correspond to components in FIG. 1 have the same symbols, and redundant explanations are omitted.

This preferred embodiment differs from the aforementioned first preferred embodiment in that the readout light supply unit includes, in place of an LD 10, a xenon lamp 60, condenser lens 61, reflecting mirror 62, and illumination diaphragm 63. The illumination diaphragm 63 is configured by extending the shield plate 12b constituting the ray flux limiting part 12, and providing in this extended portion an aperture 63a in the position corresponding to the position of readout light emission of the LD 10 in FIG. 1. Of course the illumination diaphragm 63 may also be configured independently of the ray flux limiting part 12.

Ray fluxes 47 emitted from the xenon lamp 60 are condensed by the condenser lens 61 and reflected by the reflecting mirror 62, before being condensed on the aperture 63a. The divergent beam 41 emitted from the aperture 63a is incident on the first lens system 11, and becomes approximately parallel. Subsequent operation is similar to that of the aforementioned first preferred embodiment.

Advantages similar to those of the aforementioned first preferred embodiment are obtained from this preferred embodiment as well. The illumination diaphragm 63 need not be provided, but is desirable in order to raise the contrast of the optical image on the CCD 20. Moreover, a readout light diaphragm may be provided in front of the LD 10 in the aforementioned first preferred embodiment as well.

Fourth Preferred Embodiment

Figure 6:
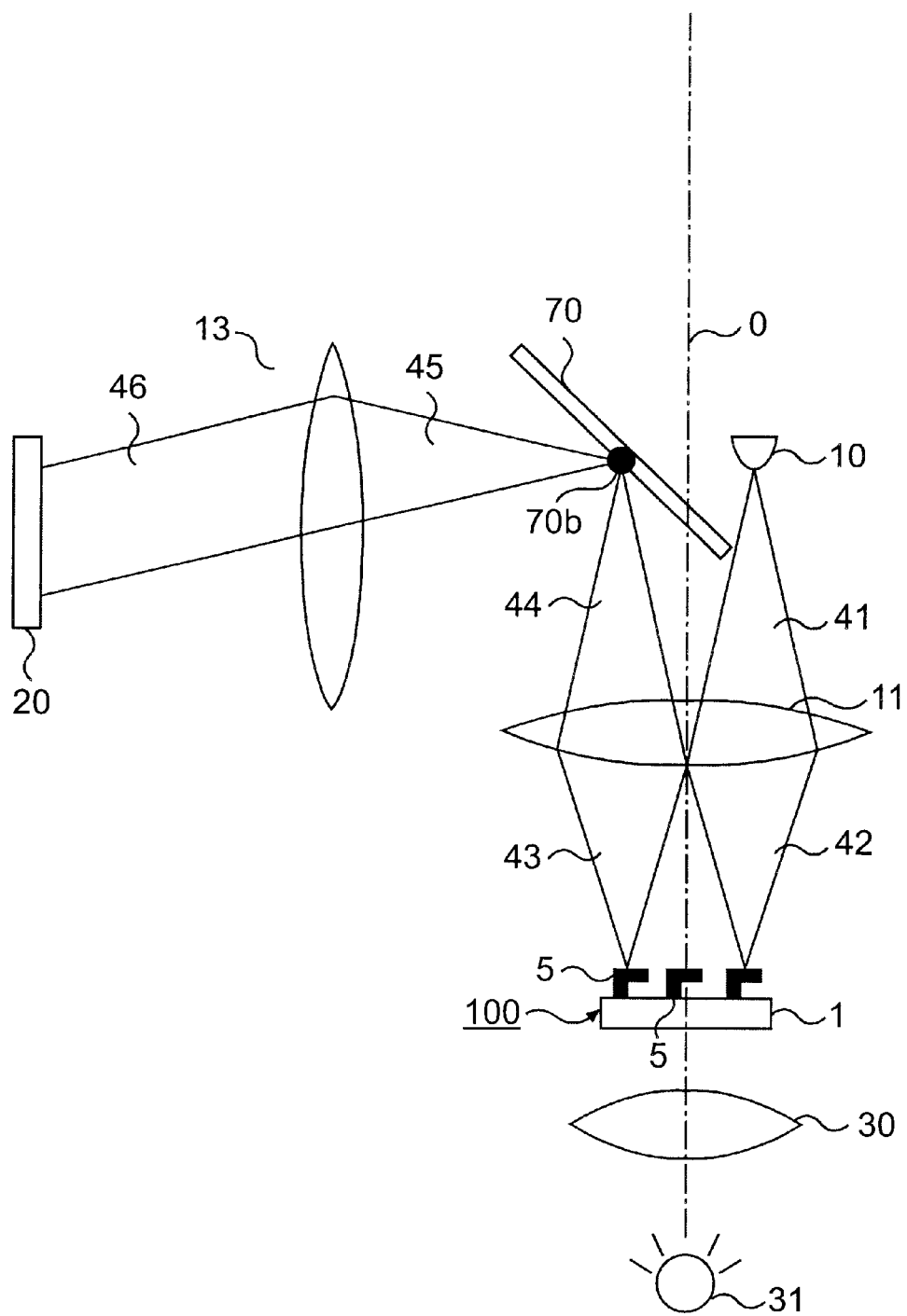
FIG. 6 schematically shows an imaging device according to a fourth preferred embodiment of the present invention.

FIG. 6 is a schematic view showing an imaging device according to a fourth preferred embodiment of the present invention. In FIG. 6, components which are the same as or correspond to components in FIG. 1 have the same symbols, and redundant explanations are omitted.

Figure 7A:
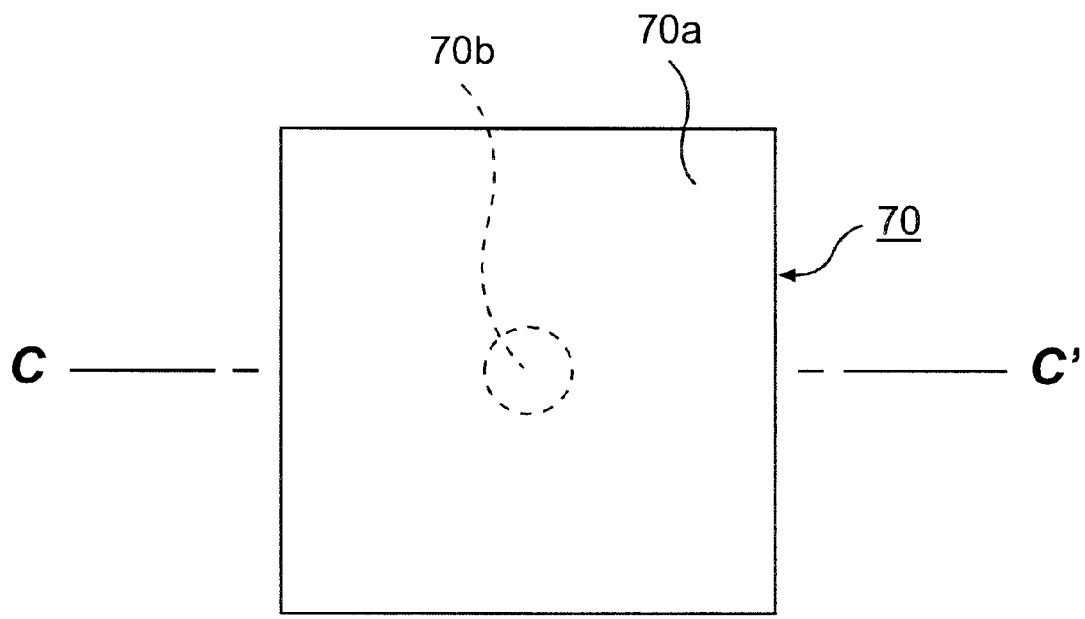
FIGS. 7A and 7B schematically show a ray flux limiting part used in the fourth preferred embodiment.
Figure 7B:
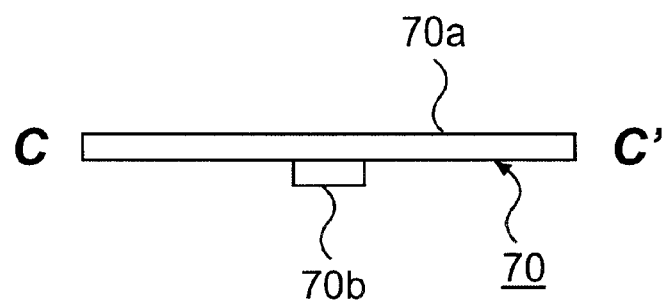

This preferred embodiment differs from the aforementioned first preferred embodiment in that, in place of the ray flux limiting part 12, the ray flux limiting part 70 shown in FIGS. 7A and 7B is used, and in accordance with this the positions of the second lens system 13 and the CCD 20 are altered. FIG. 7A is a schematic plan view of the ray flux limiting part 70, and FIG. 7B is a schematic cross-sectional view along the line C–C' in FIG. 7A.

The ray flux limiting part 70 is configured so as to utilize reflected light rather than transmitted light. Specifically, the ray flux limiting part 70 has a construction in which a reflecting film 70b is formed on a transparent plate 70a which transmits readout light. The region of the reflecting film 70b corresponds to the region of the aperture 12a of the ray flux limiting part 12. Hence this ray flux limiting part 70 has a characteristic which reflects light incident in the region of the reflecting film 70b, and does not reflect light incident in the peripheral region.

In this preferred embodiment, the region of the reflecting film 70b of the ray flux limiting part 70 is the site which selectively passes (in this preferred embodiment, reflects) only the aforementioned desired ray fluxes. The second lens system 13 guides those ray fluxes reflected by the reflecting film 70b to the aforementioned conjugate positions.

Advantages similar to those of the aforementioned first preferred embodiment are obtained from this preferred embodiment as well.

Fifth Preferred Embodiment

Figure 8A:
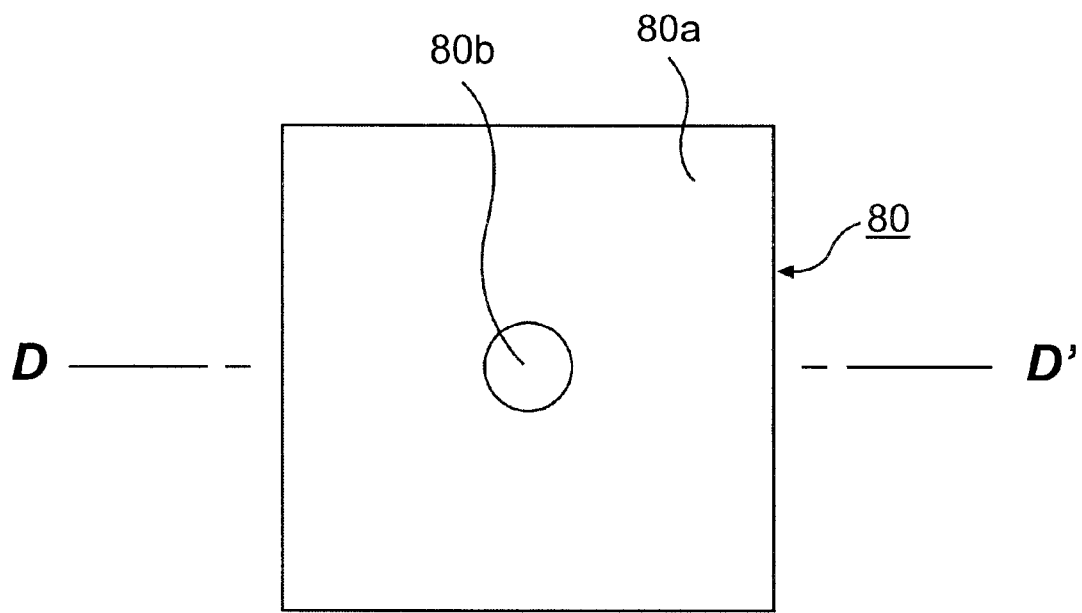
FIGS. 8A and 8B schematically show a ray flux limiting part used in an imaging device according to a fifth preferred embodiment of the present invention.
Figure 8B:
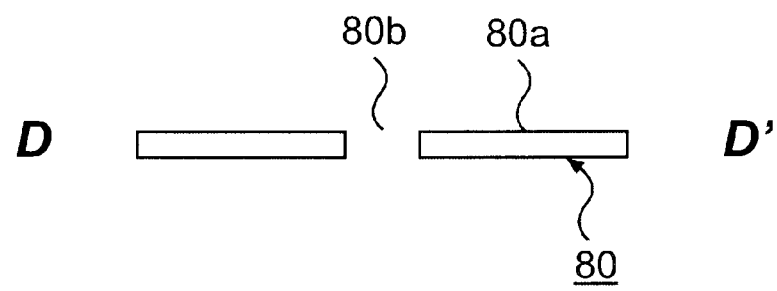

In the imaging device of a fifth preferred embodiment of the present invention, in place of the ray flux limiting part 70 of the imaging device of the aforementioned fourth preferred embodiment, the ray flux limiting part 80 shown in FIGS. 8A and 8B is used; otherwise the configuration is the same as in the aforementioned fourth preferred embodiment. FIG. 8A is a schematic plan view of the ray flux limiting part 80, and FIG. 8B is a schematic cross-sectional view along the line D–D' in FIG. 8A.

The ray flux limiting part 80 reverses the relation between reflection and transmission of the readout light reflection region (the region of the reflecting film 70b) and the region where readout light is not reflected (the region peripheral to the reflecting film 70b) of the ray flux limiting part 70 in FIGS. 7A and 7B. Specifically, the ray flux limiting part 80 has a construction in which an aperture 80b is formed in a reflecting plate 80a which reflects readout light. The region of the aperture 80b corresponds to the region of the reflecting film 70b of the ray flux limiting part 70 in FIGS. 7A and 7B. Hence this ray flux limiting part 80 has a characteristic which does not reflect light incident in the region of the aperture 80b, and reflects light incident in the peripheral region.

In this preferred embodiment, the region peripheral to the aperture 80b of the ray flux limiting part 80 is the site which selectively passes (in this preferred embodiment, reflects) only the aforementioned desired ray fluxes. The second lens system 13 guides those ray fluxes reflected by the region peripheral to the aperture 80b to the aforementioned conjugate positions.

In this preferred embodiment, dark and light areas in the optical image formed on the photosensitive surface of the CCD 20 are reversed compared with the aforementioned fourth preferred embodiment, but in essence the operation is similar to that of the aforementioned fourth preferred embodiment, and similar advantages are obtained.

Various preferred embodiments of the present invention have been explained; but the present invention is not limited to these preferred embodiments. For example, the configuration of the optical readout type radiation/displacement device is not limited to the configurations described above.

As explained above, by the present invention, an image due to radiation can be formed as a visible image with high accuracy and high sensitivity through detection of radiation with high accuracy, high sensitivity and high S/N ratio, without using cooling equipment.

Sixth Preferred Embodiment

Next, some of potential drawbacks that may be realized in optical systems having a pinhole plate or the like are discussed before further describing the preferred embodiments of the present invention. In general, the pinhole plate or the like in such an optical system is positioned and fixed in place at the time of assembly. Hence in order to obtain the desired characteristics for this optical system, the pinhole or the like of the pinhole plate must be positioned relative to other optical parts with high accuracy at the time of assembly. Thus, the assembly requires considerable labor.

Further, in the aforementioned optical system having a pinhole plate or the like, the position, size, shape and other attributes of the pinhole or the like (that is, the position, size and shape, etc., through which ray fluxes are to be passed) are fixed permanently, so that it is often not possible to change the position, size, shape or other attributes of the pinhole or the like. Thus, it is considerably difficult or almost impossible to modify as suited the characteristics of said optical system and to adjust the characteristics of the device using such an optical system.

Therefore, it is desirable to have an optical system which can be easily assembled, and the characteristics of which can be modified as suitable. Also, it is desirable to have an imaging device which can be easily assembled, and the inherent characteristics of which can be modified as desired, while conforming to principles of the imaging devices described above.

The following sixth to eighth preferred embodiments are particularly suitable for these purposes.

Figure 9:
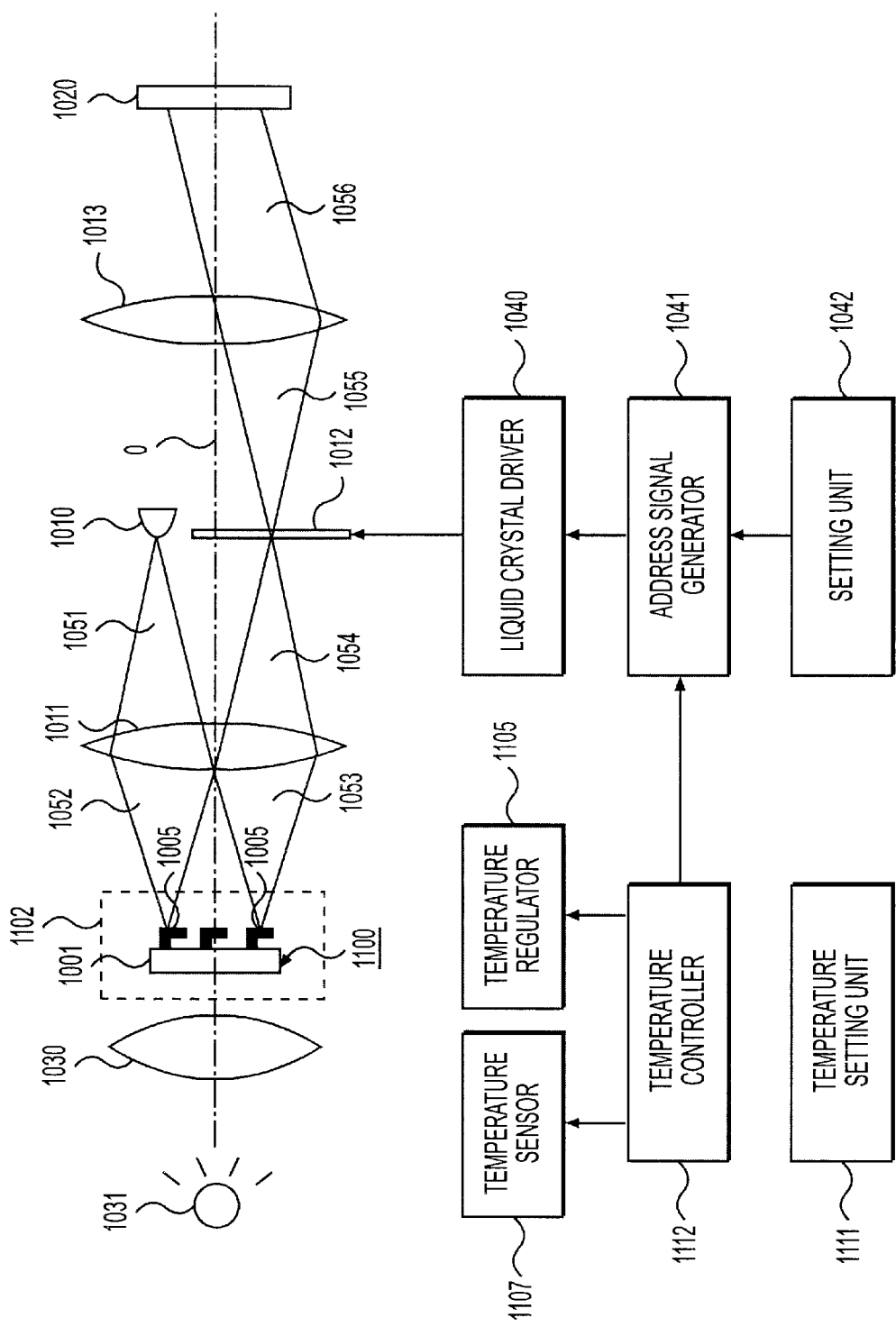
FIG. 9 schematically shows an imaging device according to a sixth preferred embodiment of the present invention.
Figure 10:
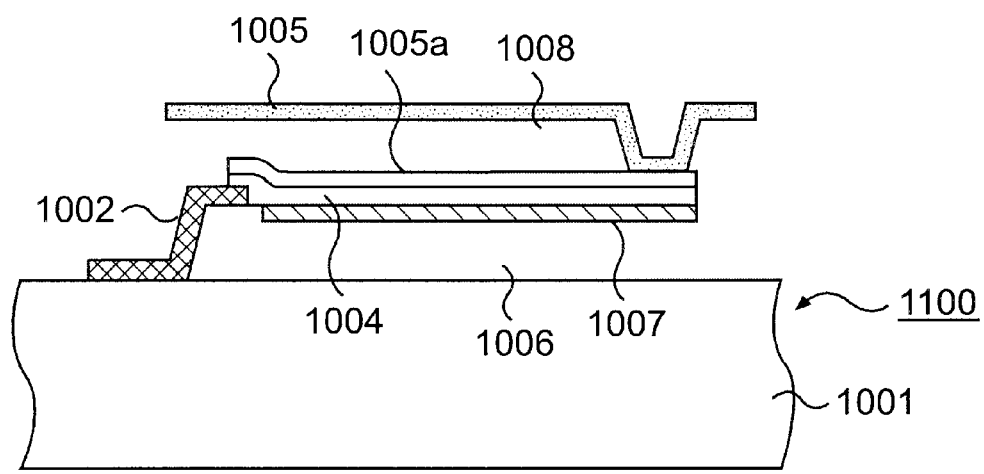
FIG. 10 schematically shows an example of an optical readout type radiation/displacement conversion device used in the sixth preferred embodiment.
Figure 11:
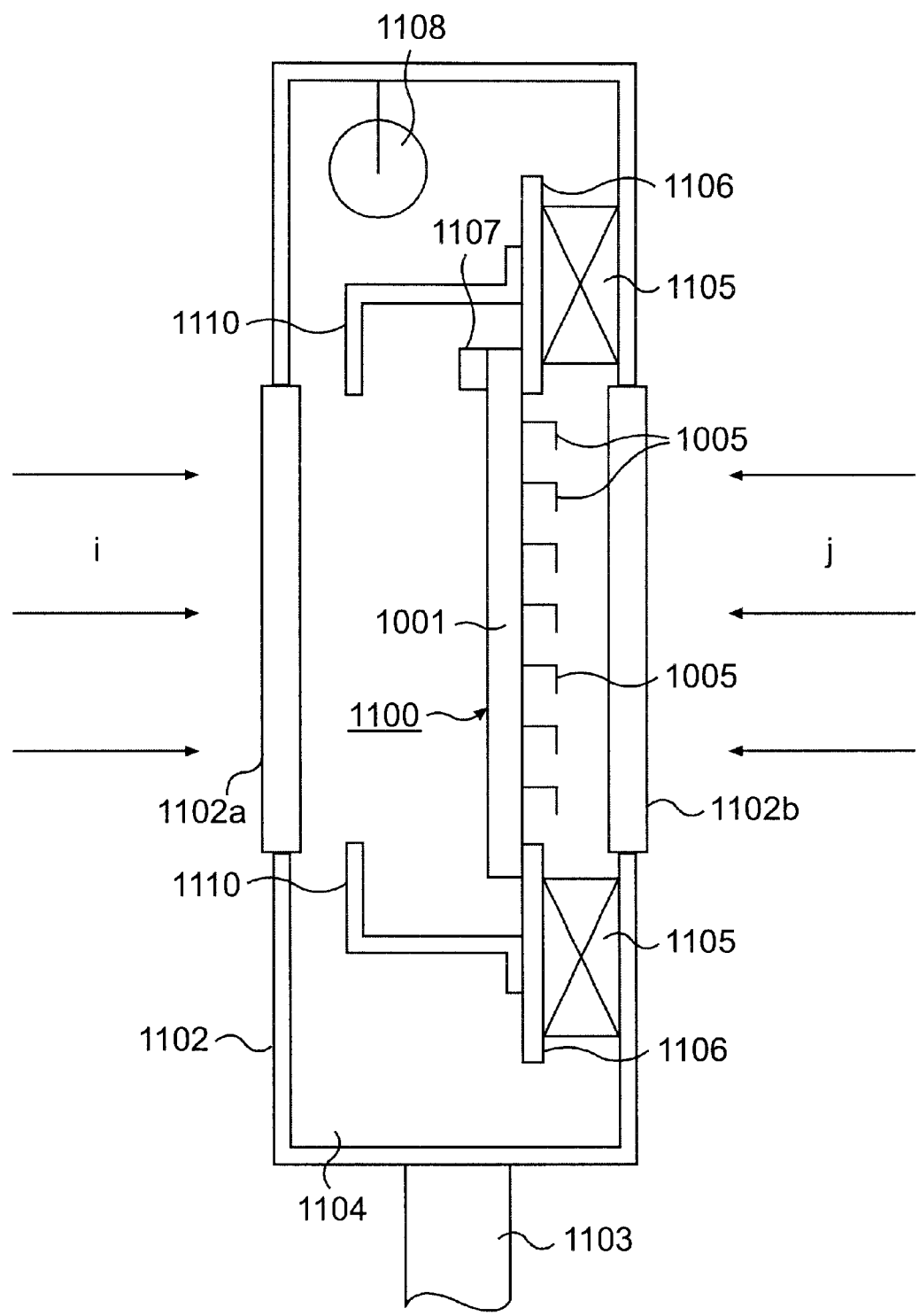
FIG. 11 is a cross-sectional view showing in enlargement a container housing the optical readout type radiation/displacement conversion device used in the sixth preferred embodiment.

FIG. 9 is a schematic view of the imaging device according to a sixth preferred embodiment of the present invention. As an example of the optical readout type radiation/displacement conversion device 1100 that can be used in this preferred embodiment, the device 100, described with reference to FIGS. 2A and 2B above, may be used. FIG. 10 is a schematic cross-sectional view showing another example of a single pixel of the optical readout type radiation/displacement conversion device 1100. FIG. 11 is a schematic cross-sectional view showing an enlargement of the state in which the optical readout type radiation/displacement conversion device 1100 is housed in a container.

The imaging device of this preferred embodiment is provided with an optical readout type radiation/displacement conversion device 1100, as shown in FIG. 9.

The direction of extension of the supported part from the leg part in each pixel is the same for all.

The configuration of unit pixels in the conversion device 1100 is not limited to the configuration shown in FIG. 2, but may, for example, be a configuration such as that shown in FIG. 10. In FIG. 10, components which are the same as or correspond to components in FIG. 2 carry the corresponding reference numerals increased by 1000, and their explanations are omitted. In FIG. 10, the film 1004 is not an infrared absorption part; below the film 1004 is formed a film 1007 as an infrared absorption part. In FIG. 10, the film 1005a is not a light reflection part; a reflecting plate 1005 is formed to cover essentially the entire unit pixel as a light reflection part, with a portion fixed by the tip of the film 1005a, and with the remaining portion positioned above the film 1005a with an intervening space 1008.

Further, the conversion device 1100 having unit pixels such as that shown in FIG. 10 can be fabricated using film formation and patterning, formation and removal of sacrificial layers, and other techniques of semiconductor manufacturing.

In the imaging device of this preferred embodiment, the conversion device 1100 is housed inside a sealed container 1102, as shown in FIG. 9 and FIG. 11. Said container 1102 has on the side of incidence of infrared rays i a window 1102a which transmits infrared rays i, and has on the side of incidence of readout light j a window 1102b which transmits readout light j. In FIG. 11, 1103 is an exhaust pipe to evacuate to vacuum the space 1104 within the container 1102 immediately after assembly of the container 1102. Said exhaust pipe 1103 is sealed after evacuation to vacuum of the space 1104, so that the vacuum in the space 1104 is preserved. Of course the space 1104 may be preserved at less than one atmosphere, or an inert gas or the like may be included in the space 1104. Within the container 1102 is provided a getter, silica gel, or other gas molecule adsorption agent 1108.

As shown in FIG. 11, within the container 1102 are housed a Peltier element or other temperature regulator 1105 to adjust the temperature of the substrate 1001 of the conversion device 1100, and a temperature sensor 1107 to detect the temperature of the substrate 1001. In FIG. 9, for convenience of notation, the temperature regulator 1105 and temperature sensor 1107 appear outside the container 1102. The temperature regulator 1105 is thermally coupled to the substrate 1001 via a heat exchanger plate 1106. A heat shield 1110 which alleviates the transfer of unnecessary heat energy to the conversion device 1100 is provided within the container 1102, and is thermally coupled to the temperature regulator 1105 via the heat exchanger plate 1106.

Referring to FIG. 9 again, the imaging device of this preferred embodiment is provided with a temperature setting unit 1111 which outputs a variable temperature setting signal indicating a temperature setting in accordance with user operations, and a temperature controller 1112 which controls the temperature regulator 1105 so as to effectively preserve the temperature of the substrate 1001 of the conversion device 1100 at a temperature corresponding to the aforementioned setting signal, based on the detection signal from the temperature sensor 1107 and the setting signal from the temperature setting unit 1111. The difference signal indicating the difference between the aforementioned setting temperature and the temperature of the substrate 1001 (this signal is obtained based on the detection signal from the temperature sensor 1107, and is equivalent to the amount of temperature fluctuation) is output by the temperature controller 1112 to an address signal generator 1041, described below.

Further, the imaging device of this preferred embodiment is provided with a readout optical system, a two-dimensional CCD 1020 as a capture unit, and an imaging lens 1030 for infrared rays which condenses the infrared rays from the heat source 1031 as the object for observation, and focuses the infrared ray image of the heat source 1031 on the surface on which the infrared absorption parts of the conversion device 1100 are distributed.

In this preferred embodiment, the aforementioned readout optical system includes a laser diode (LD) 1010 as the readout light supply unit which supplies readout light; a first lens system 1011 which guides readout light from the LD 1010 to the plurality of reflection parts 1005 (film 1005) of the conversion device 1100; a ray flux limiting part 1012 which selectively passes only desired ray fluxes among the ray fluxes of readout light reflected by the plurality of reflection parts 1005 after passing through the first lens system 1011; and a second lens system 1013 which forms positions conjugate with the aforementioned plurality of reflection parts 1005 in concert with the aforementioned first lens system 1011, and moreover guides the ray fluxes which have passed through the aforementioned ray flux limiting part 1012 to said conjugate positions. The photosensitive surface of a CCD 1020 is placed at the aforementioned conjugate positions, and by means of the lens systems 1011, 1013, the plurality of reflection parts 1005 and the plurality of photosensitive elements of the CCD 1020 are in an optically conjugate relation. Further, in this preferred embodiment the reflection parts 1005 of the conversion device 1100 are placed near the focal plane on the side of the imaging lens 1030 of the first lens system 1011, but the invention is not limited to this positioning.

The LD 1010 is positioned on one side of the optical axis O (the upper side in FIG. 9) of the first lens system 1011, and supplies readout light such that the readout light passes through the region of said one side. In this preferred embodiment, the LD 1010 is positioned near the focal plane of the first lens system 1011, on the side of the second lens system 1013; after passing through the first lens system 1011, the readout light, as an approximately parallel beam, irradiates the plurality of reflection parts 1005. In this preferred embodiment, the conversion device 1100 is positioned such that the plane of its substrate 1001 (in this preferred embodiment, parallel to the plane of the reflection parts 1005 when no infrared rays are incident) is orthogonal to the optical axis O. Of course, the invention is not limited to this positioning.

The ray flux limiting part 1012 includes a spatial light modulation part which determines, in accordance with an input signal, the site which selectively passes only the aforementioned desired ray fluxes, in the region on the other side of the optical axis O (the lower side in FIG. 9) of the first lens system 1011.

In this preferred embodiment, the ray flux limiting part 1012 is, specifically, composed of a transmissive type liquid crystal panel serving as such a spatial modulation part. In this preferred embodiment, this transmissive type liquid crystal panel 1012 is positioned in the plane orthogonal to the optical axis O, and containing the position of the condensation point at which the first lens system 1011 condenses the ray fluxes reflected by all the reflection parts 1005 (the bundle of individual ray fluxes reflected by each reflection part 1005) when the inclinations of all the reflection parts 1005 of the conversion device 1100 are the same.

The transmissive type liquid crystal panel 1012 has numerous fine pixels arranged in two dimensions; each of said pixels is driven by driving signals from the liquid crystal driver 1040 to assume a transmissive state or a blocking state. The liquid crystal driver 1040 receives address signals from an address signal generator 1041, and performs driving to put the address pixels indicated by said address signals into the transmissive state (or the blocking state), and to put the pixels at other locations into the blocking state (or the transmissive state). The address signal generator 1041 receives setting signals from the setting unit 1042, which outputs said setting signals according to user operation, as well as the aforementioned difference signals (equivalent to the quantity of temperature fluctuation of the substrate 1001) from the temperature controller 1112, and outputs to the liquid crystal driver 1040 address signals indicating addresses obtained by performing corrections according to the aforementioned difference signals from the temperature controller 1112 with respect to the addresses corresponding to the aforementioned setting signals. This correction is described in detail below.

Suppose now that no infrared rays are incident on any of the infrared absorption parts, and that all reflection parts 1005 are parallel to the substrate 1001. The ray fluxes 1052 incident on the plurality of reflection parts 1005 are reflected by the plurality of reflection parts 1005 to become the ray fluxes 1053, and are again incident on the first lens system 1011, this time from the side opposite the LD 1010, to become the condensed beam 1054; the condensation point of this condensed beam 1054 arrives on the transmissive type liquid crystal panel 1012. The condensation point of this condensed beam 1054 coincides with the condensation points of individual ray fluxes which have been reflected by individual reflection parts 1005 and have passed through the first lens system 1011, and is approximately circular and has a prescribed size (cross-sectional area). Here it is supposed that, by means of the driving signals from the liquid crystal driver 1040, each of the pixels at the site at which the aforementioned condensed beam arrives on the transmissive type liquid crystal panel 1012 is in the transmissive state, and each pixel outside said site is in the blocking state. In this case, the condensed beam 1054 is transmitted through the site in the transmissive state of the transmissive type liquid crystal panel 1012, becomes a divergent beam 1055, and is incident on the second lens system 1013. The divergent beam 1055 incident on the second lens system 1013 becomes, for example, the approximately parallel beam 1056 by means of the second lens system 1013, and is incident on the photosensitive surface of the CCD 1020. Here the plurality of reflection parts 1005 and the photosensitive surface of the CCD 1020 are in a conjugate relation by means of the lens systems 1011, 1013, so that an image of each reflection part 1005 is formed at each corresponding site on the photosensitive surface of the CCD 1020, and overall, an optical image is formed as a distributed image of the plurality of reflection parts 1005.

Suppose now that a certain quantity of infrared rays is incident on the infrared absorption part corresponding to a certain reflection part 1005, and that said reflection part 1005 is inclined with respect to the substrate 1001 by an amount in accordance with the quantity of infrared rays incident. Here too, similarly to the above explanation, suppose that each of the pixels in the site within the transmissive type liquid crystal panel 1012 at which the aforementioned condensed beam arrives is in the transmissive state, and that each pixel outside of said site is in the blocking state. Among the ray fluxes 1052, those individual ray fluxes which are incident on said inclined reflection part 1005 are reflected by said reflection part 1005 in a direction different by the amount of the inclination, so that after passing through the first lens system 1011, they are condensed at a position shifted from the aforementioned position of the condensation point by an amount in accordance with the amount of inclination, and are blocked by pixels in the blocking state of the transmissive type liquid crystal panel 1012 by an amount in accordance with the amount of inclination. Hence of the overall optical image formed on the CCD 1020, the amount of light in the image of said reflection part 1005 is reduced by an amount in accordance with the amount of inclination of said reflection part 1005.

However, if the wavelength of the aforementioned readout light is $\lambda$, the length of one side of a reflection part 1005 of the conversion device 1100, assuming a square shape, is d, and the focal length of the first lens system 1011 is f, then the radius φ of the condensation point on the transmissive type liquid crystal panel 1012 (this condensation point is equal to the condensation point of the aforementioned ray fluxes 1054 when all reflection parts 1005 are parallel) due to the individual ray fluxes reflected by each reflection part 1005 is expressed by the following Equation (1).

$$\phi \approx 2.44 \cdot f \cdot \lambda / d \quad (1)$$

Further, the amount of movement m of the condensation point on the transmissive type liquid crystal panel 1012 due to the individual ray fluxes reflected by each reflection part 1005 is expressed by Equation 2, where θ is the inclination angle of said reflection part 1005 with respect to the substrate 1001, and f is the focal length of the first lens system 1011.

$$m = f \cdot \tan 2\theta \quad (2)$$

The inclination angle depends only on the quantity of infrared rays incident on the infrared absorption part corresponding to said reflection part 1005, and so as is clear from Equation 2, the amount of movement m of the condensation point on the transmissive type liquid crystal panel 1012 due to individual ray fluxes reflected by each reflection part 1005 depends only on said quantity of incident infrared rays.

Figure 12A:
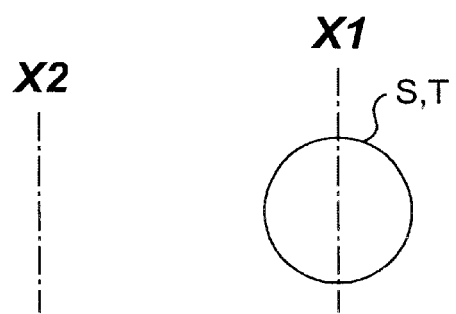
FIG. 12 schematically illustrates an example of appearance of a transmissive type liquid crystal panel in operation according to the present invention.
Figure 12B:
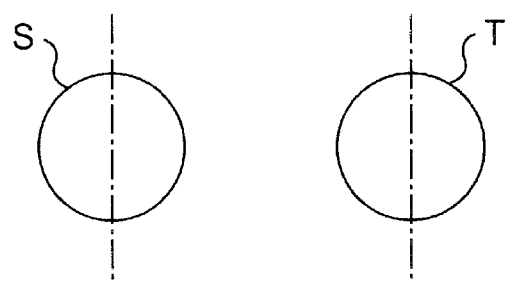

FIG. 12 shows one example of the appearance, on the transmissive type liquid crystal panel 1012, of the site T of the transmissive type liquid crystal panel 1012 which is put into the transmissive state (in this preferred embodiment, this site is the site which selectively passes only the aforementioned desired ray fluxes), and the condensation point S on the transmissive type liquid crystal panel 1012 due to individual ray fluxes reflected by the reflection part 1005. Suppose that the condensation point S moves in the left direction in FIG. 12 as the quantity of incident infrared rays increases, and that as the quantity of incident infrared rays decreases, it moves in the right direction in FIG. 12 (similarly for FIGS. 14 through 17, described below). Positions in the left and right directions in the figure are indicated by X1, X2 (similarly for X1 through X6 in FIGS. 14 through 17, described below). Moreover, in the example shown in FIG. 12, the shape of the site T is the same approximately circular shape as the condensation point S, and the sizes of the two are supposed to be equal (similarly for FIGS. 14 through 16, described below). Further suppose that sites other than the site T in the transmissive type liquid crystal panel 1012 are in the blocking state (similarly for FIGS. 14 through 17, described below).

FIGS. 14 through 17 each show other examples of the appearance of the site T and condensation point S on the transmissive type liquid crystal panel 1012.

Figure 13:
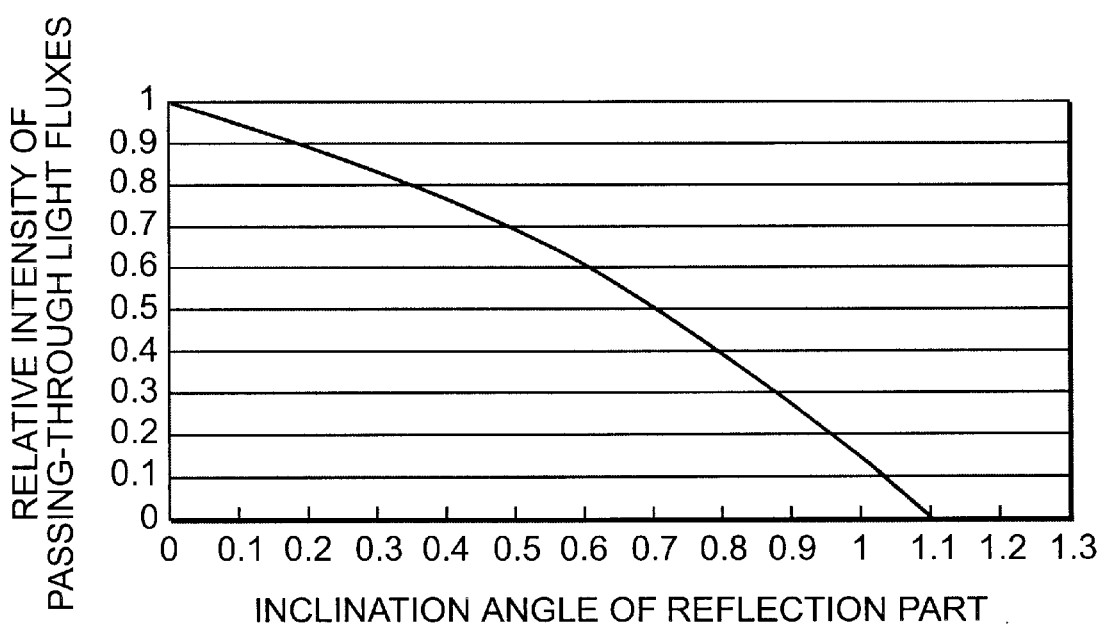
FIG. 13 is an example of the characteristic curve showing the amount of the light ray fluxes passing through the transmissive type liquid crystal panel as a function of the inclination angle of a reflecting part.
Figure 14A:
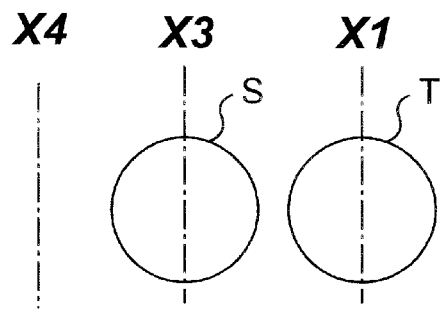
FIG. 14 schematically illustrates another example of appearance of a transmissive type liquid crystal panel in operation according to the present invention.
Figure 14B:
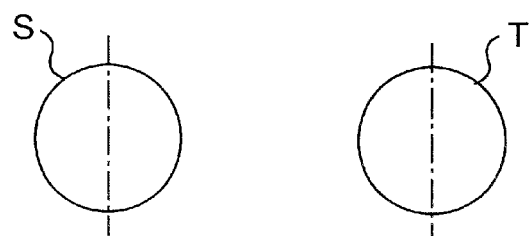
Figure 14C:
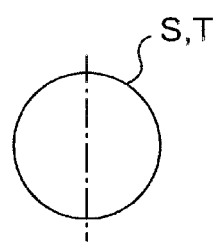
Figure 14D:
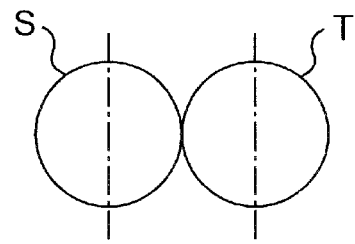

Suppose now that the site T of the transmissive type liquid crystal panel 1012 is formed at position X1 by driving signals from the liquid crystal driver 1040, as shown in (a) and (b) in FIG. 12. Suppose further that, from the state shown in (a) in FIG. 12 in which the condensation point S is at the position X1 and exactly overlaps with the site T, the reflection part 1005 inclines and the state changes to that shown in (b) in FIG. 12 in which the condensation point S has moved leftward in the figure such that the condensation point S reaches the position X2 and just touches the site T. FIG. 13 is a characteristic diagram showing one example of the quantity of light of the individual ray fluxes reflected by the reflection part 1005 and passing through the site T at this time. In FIG. 13, the vertical axis indicates the relative intensity of this quantity of light (the intensity normalized so that the maximum intensity is unity), and the horizontal axis indicates the angle of inclination of the reflection part 1005 with respect to the substrate 1001. In the example of FIG. 13, when the inclination angle of the reflection part 1005 changes from 0° to 1.1°, the relative intensity of the quantity of light passed changes from unity to zero.

In this preferred embodiment, as explained above, the infrared image incident on the conversion device 1100 is converted into an optical image employing readout light on the photosensitive surface of the CCD 1020, according to the characteristic shown in FIG. 13.

Hence there is a need to align the directions of the reflection parts 1005 of the conversion device 1100 (that is, the position of the condensation point S) and the site T while in a prescribed state (for example, the state in which no infrared rays are incident). For example, supposing that the site T on the transmissive type liquid crystal panel 1012 is formed at the position X1 as shown in (a) and (b) in FIG. 14, and that in the state in which no infrared rays are incident on the conversion device 1100 the condensation point S is at the position X3 as shown in (a) in FIG. 14, then even if infrared rays are incident on the conversion device 1100 and the condensation point S moves to position X4, the individual ray fluxes reflected by the reflection part 1005 cannot pass at all through the site T, there is no change at all in the quantity of light passed, and the infrared image cannot be converted into an optical image. Such a situation can occur, for example, in the state in which no infrared rays are incident on the conversion device 1100, when all reflection parts 1005 are inclined at the same angle with respect to the substrate 1001 (in actuality, it is difficult to manufacture the conversion device 1100 such that at room temperature the reflection parts 1005 are not inclined with respect to the substrate 1001), when the substrate 1001 of the conversion device 1100 is mounted in such a state that it is not orthogonal to the optical axis O, and in other circumstances. In this case, the user may operate the setting unit 1042 to change the position of the site T to position X3, as shown in(c) and (d) in FIG. 14. In this way, a state similar to that of (a) and (b) in FIG. 12 is realized, and infrared images can be appropriately converted into optical images. Moreover, the positions in the vertical direction in FIG. 14 of the condensation point S and site T must also be aligned.

In this preferred embodiment, a transmissive type liquid crystal panel 1012 is used as a spatial light modulation part serving as a ray flux limiting part, so that as explained above, simply by user operation of the setting unit 1042 to change the signals (driving signals) input to the transmissive type liquid crystal panel 1012, the position of the site T can be freely modified. Hence in this preferred embodiment, there is no longer a need for rigorous exactness in alignment of the conversion device 1100 and transmissive type liquid crystal panel 1012 at the time of assembly, and assembly becomes easy.

However, when, as shown in FIG. 12, even though the site T is aligned appropriately with the position X1 with respect to the range of the condensation point S from the position X1 to the position X2 (as is clear from the above explanation, this range corresponds to the range of the quantity of incident infrared rays from zero to the prescribed quantity), the temperature of the heat source 1031 is overall considerably high, and the quantity of infrared rays incident on the conversion device 1100 are within a range corresponding to the range of the condensation point S from position X3 to position X4 exceeding the former range, then the situation is again similar to that of (a) and (b) in FIG. 14. For this reason, when the temperature of the heat source 1031 is overall considerably high, the heat source 1031 cannot be observed.

In such a case, by user operation of the setting unit 1042, the position of the site T may be moved to the position X3, as shown in(c) and (d) in FIG. 14. As a result, the quantity of infrared rays in the range corresponding to the range of the condensation point S from position X3 to position X4 can be converted into the quantity of readout light passing through site T, and the heat source 1031 can be observed even when its temperature is overall considerably high. In this way, by changing the position of the site T, the range of infrared ray quantities which can be observed can be shifted; as a result, although the range of infrared ray quantities which can be observed at once is not broadened, the overall range of infrared ray quantities which can be observed can be broadened. In this preferred embodiment, a transmissive type liquid crystal panel 1012 is used as a spatial light modulation part serving as a ray flux limiting part, so that simply by changing the signals (driving signals) input to the transmissive type liquid crystal panel 1012 through user operation of the setting unit 1042, the position of the site T can be freely modified, and the range of infrared ray quantities which can be observed can be shifted.

Figure 15A:
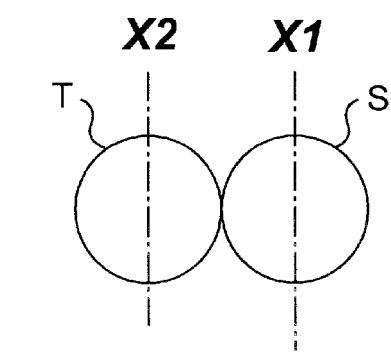
FIG. 15 schematically illustrates another example of appearance of a transmissive type liquid crystal panel in operation according to the present invention.
Figure 15B:
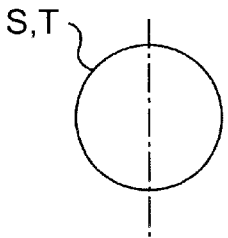

Further, whereas in FIG. 12, the position of the site T is the position X1, if the position of the site T is changed to position X2 as shown in FIG. 15, the dark and light areas of the optical image employing readout light on the photosensitive surface of the CCD 1020 can be reversed. Hence in this preferred embodiment, simply by changing the signals (driving signals) input to the transmissive type liquid crystal panel 1012 through user operation of the setting unit 1042, the dark and light areas of the optical image on the photosensitive surface of the CCD 1020 can be reversed.

Figure 16A:
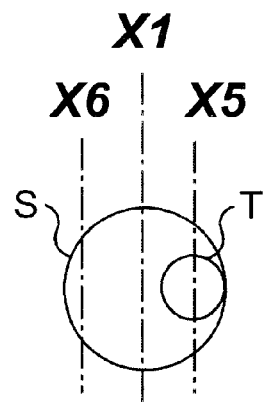
FIG. 16 schematically illustrates another example of appearance of a transmissive type liquid crystal panel in operation according to the present invention.
Figure 16B:
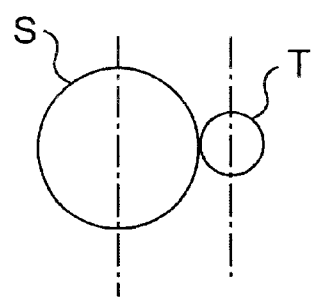

Further, whereas in FIG. 12, the size of the site T was the same as the size of the condensation point S, if the size of the site T is reduced as shown in FIG. 16, the range of the condensation point S over which the quantity of readout light passing through the site T can change becomes the range from position X1 to position X6 of FIG. 16, narrow compared with the case of FIG. 12. X5 of FIG. 16 indicates the position of the site T. As a result, the range of infrared ray quantities which can be observed at once is narrowed, and conversely, the change in the quantity of light passed through the site T for a given change in infrared ray quantity is increased, so that the observation resolution is raised. The distance from position X1 to position X6 is equal to the diameter of the site T. In this way, if the size of the site T is changed, the range of infrared ray quantities which can be observed at once and the observation resolution can be changed. Hence in this preferred embodiment, simply by changing the signals (driving signals) input to the transmissive type liquid crystal panel 1012 through user operation of the setting unit 1042, the range of observable infrared ray quantities and the observation resolution can be changed.

Figure 17A:
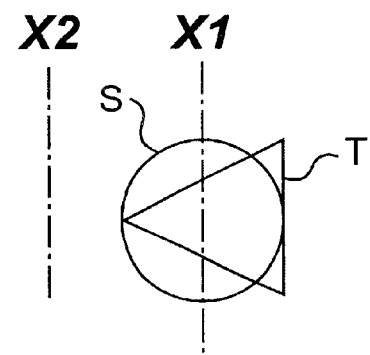
FIG. 17 schematically illustrates still another example of appearance of a transmissive type liquid crystal panel in operation according to the present invention.
Figure 17B:
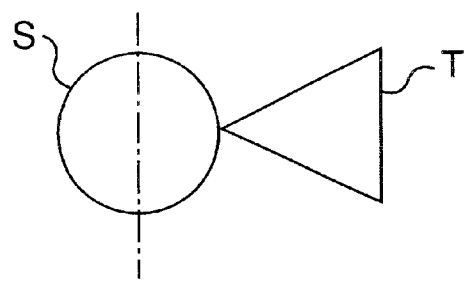

Whereas in FIG. 12, the shape of the site T is the same circular shape as the shape of the condensation point S, if the shape of the site T is made to be triangular, as shown in FIG. 17, the rate of change of the amount of light passing through the site T with respect to the rate of change of the amount of incident infrared rays (that is, the rate of motion of the condensation point S) changes compared with the case of FIG. 12. If, in this way, the shape of the site T is changed, the characteristic curve such as that shown in FIG. 13 can be changed; for example, a linear characteristic curve, or a downward-convex characteristic curve, can be obtained. Hence in this preferred embodiment, simply by changing the signals (driving signals) input to the transmissive type liquid crystal panel 1012 through user operation of the setting unit 1042, the rate of change of the amount of light passing through the site T with respect to the rate of change of the amount of incident infrared rays (that is, the rate of motion of the condensation point S) can be changed.

In the foregoing explanation, the site T in the transmissive type liquid crystal panel was taken to be in the transparent state, and the region peripheral to this were taken to be in the blocking state; conversely, the site T may be in the blocking state, and the region peripheral to this may be in the transparent state. In this case, said peripheral region becomes the site which selectively passes only the aforementioned desired ray fluxes. In this case the dark and light areas of the optical image on the photosensitive surface of the CCD 1020 are reversed. Hence in this preferred embodiment, simply by changing the signals (driving signals) input to the transmissive type liquid crystal panel 1012 through user operation of the setting unit 1042 to reverse the site in the transparent state and the site in the blocking state, the dark and light areas of the optical image on the photosensitive surface of the CCD 1020 can be reversed.

It was explained that in this preferred embodiment, the position, size and shape of the site T can be set using the setting unit 1042. However, in the present invention the setting unit 1042 may be configured so that at least one of these may be set, or so that each may be set independently, or so that two or more of these may be set in response to each other; and no limitations whatsoever are imposed on the configuration of the setting unit 1042. Further, in cases where automated observation is performed rather than so-called manual observation, the setting unit 1042 may be removed, and setting signals equivalent to setting signals from a setting unit 1042 may be applied from outside to the address generator 1041 in response to the observation conditions.

In the imaging device of this preferred embodiment, the temperature of the substrate 1001 of the conversion device 1100 is effectively preserved at a temperature set by the temperature setting unit 1111 by means of housing the conversion device 1100 inside a sealed container 1102, having the temperature sensor 1107 detect the temperature of the substrate 1001 of the conversion device 1100, and having the temperature controller 1112 control the temperature regulator 1105 based on the detection signal from the temperature sensor 1107. Hence even if the ambient temperature outside the container 1102 changes, the temperature of the substrate 1001 of the conversion device 1100 is preserved at the set temperature, so that displacements occurring in each element (pixel) of the conversion device 1100 are not easily affected by the ambient temperature, but are dependent nearly entirely on the intensity of the incident infrared rays i.

However, even if control is exercised to stabilize the temperature of the substrate 1001 in this way, there are still slight fluctuations in the temperature of the substrate 1001. Due to these temperature fluctuations, the condensation point S on the transmissive type liquid crystal panel 1012 fluctuates. Thus in this preferred embodiment, as explained above, the address signal generator 1041 receives the said setting signals from the setting unit 1042 and the aforementioned difference signals (equivalent to the amount of fluctuation in the temperature of the substrate 1001) from the temperature controller 1112, and outputs to the liquid crystal driver 1040 address signals indicating addresses obtained by performing corrections in according to the aforementioned difference signals from the temperature controller 1112, with respect to the addresses corresponding to the aforementioned setting signals. This correction is performed by causing the position of the site T of the transmissive type liquid crystal panel 1012 to fluctuate, with respect to the setting position due to the setting unit 1042, in accord with fluctuations in the condensation point S due to the aforementioned temperature fluctuations, such that the positional relation between the site T and the condensation point S is relatively unchanged with the aforementioned temperature fluctuations.

Hence in this preferred embodiment, the effects accompanying fluctuations in the temperature of the conversion device 1100 are reduced, and a more stable image can be obtained.

As is clear from the above explanation, in this preferred embodiment the address signal generator 1041 and the liquid crystal driver 1040 function overall as a correction unit. This correction unit corrects the signals (driving signals from the liquid crystal driver 1040) input to the transmissive type liquid crystal panel 1012 such that the position of the aforementioned site T is adjusted so as to reduce the effect of fluctuations of the temperature of the conversion device 1100, based on detection signals from the temperature sensor 1107.

As has been explained, in this preferred embodiment control is exercised to stabilize the temperature of the substrate 1001, and in addition corrections are performed such that the positional relation of the site T and condensation point S is relatively unchanged by temperature fluctuations in the substrate 1001. However, in the present invention the aforementioned corrections may be performed without exercising control to stabilize the temperature of the substrate 1001. For example, the temperature regulator 1105 may be removed, so that the temperature controller 1112 has only a function for supplying the aforementioned difference signals to the address signal generator. In this case, the temperature of the substrate 1001 will undergo comparatively large fluctuations due to fluctuations in the ambient temperature, so that the range over which the position of the aforementioned site T can be adjusted must be broadened; however, a stabilized image similar to that of this preferred embodiment can be obtained. Further, in the present invention, control may be exercised to stabilize the temperature of the substrate 1001 without performing the aforementioned corrections. In this case as well, a somewhat stabilized image can be obtained, though not to the extent of this preferred embodiment. Thus the aforementioned corrections and control to stabilize the temperature of the substrate 1001 are effective, but both need not be performed in the present invention.

In place of the transmissive type liquid crystal panel 1012, a reflective type liquid crystal panel, DMD, or other spatial light modulator may be employed. In this case, the preferred embodiment may be modified as appropriate according to the use.

As is clear from the above explanation, the aforementioned readout optical system is one preferred embodiment of the optical system of the present invention having a ray flux limiting unit which selectively passes only desired ray fluxes among the incident ray fluxes. However, the optical system of the present invention is not limited to such an imaging device readout optical system, and can be employed in various optical systems.

Seventh Preferred Embodiment

Figure 18:
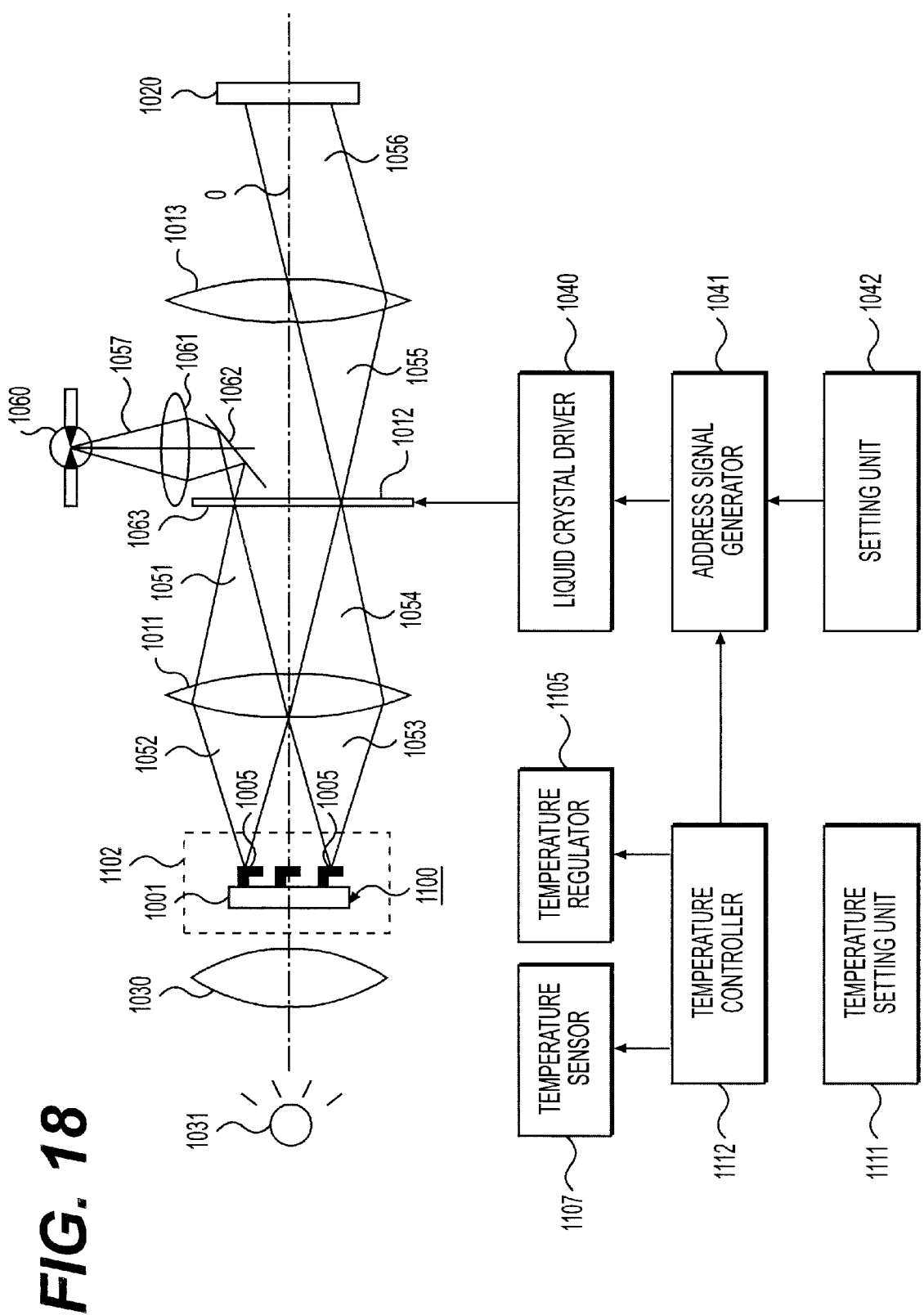
FIG. 18 schematically shows an imaging device according to a seventh preferred embodiment of the present invention.

FIG. 18 is a schematic view showing the imaging device according to a seventh preferred embodiment of the present invention. In FIG. 18, components which are the same as or correspond to components in FIG. 9 have the same symbols, and redundant explanations are omitted.

The differences of this preferred embodiment from the aforementioned sixth preferred embodiment are the constitution of the readout light supply unit by a xenon lamp 1060, condenser lens 1061, reflecting mirror 1062, and illumination diaphragm 1063 instead of the LD 1010, and the fact that the illumination diaphragm 1063 also serves as the transmissive type liquid crystal panel 1012. The aforementioned illumination diaphragm 1063 is configured by extending the transmissive type liquid crystal panel 1012, and in the extended portion, putting into the transmissive state, by means of driving signals from the liquid crystal driver, the position corresponding to the readout light emission position of the LD 1010 in FIG. 9. Of course, the illumination diaphragm 1063 may also be configured independently of the ray flux limiting part 1012.

The ray fluxes 1057 emitted by the xenon lamp 1060 are condensed by the condenser lens 1061 and reflected by the reflecting mirror 1062, following which they are condensed at the site, in the transmissive state, at the position corresponding to the readout light emission position of the LD 1010 in FIG. 9. The divergent beam 1051 emitted from this site is incident on the first lens system 1011, and becomes approximately parallel. Subsequent operation is similar to that of the aforementioned sixth preferred embodiment.

In this preferred embodiment, advantages similar to those of the aforementioned sixth preferred embodiment are obtained. The illumination diaphragm described above need not be provided, but it is desirable that an illumination diaphragm be provided in order to raise the contrast of the optical image on the CCD 1020. Such an illumination diaphragm may be provided as a pinhole plate or the like, separate from the transmissive type liquid crystal panel 1012. However, in this case labor is required to align the pinhole plate or the like, and moreover the number of parts is increased. In this respect, if the transmissive type liquid crystal panel 1012 also serves as the readout diaphragm, the labor of alignment is reduced, and the number of parts can be decreased.

Eighth Preferred Embodiment

Figure 19:
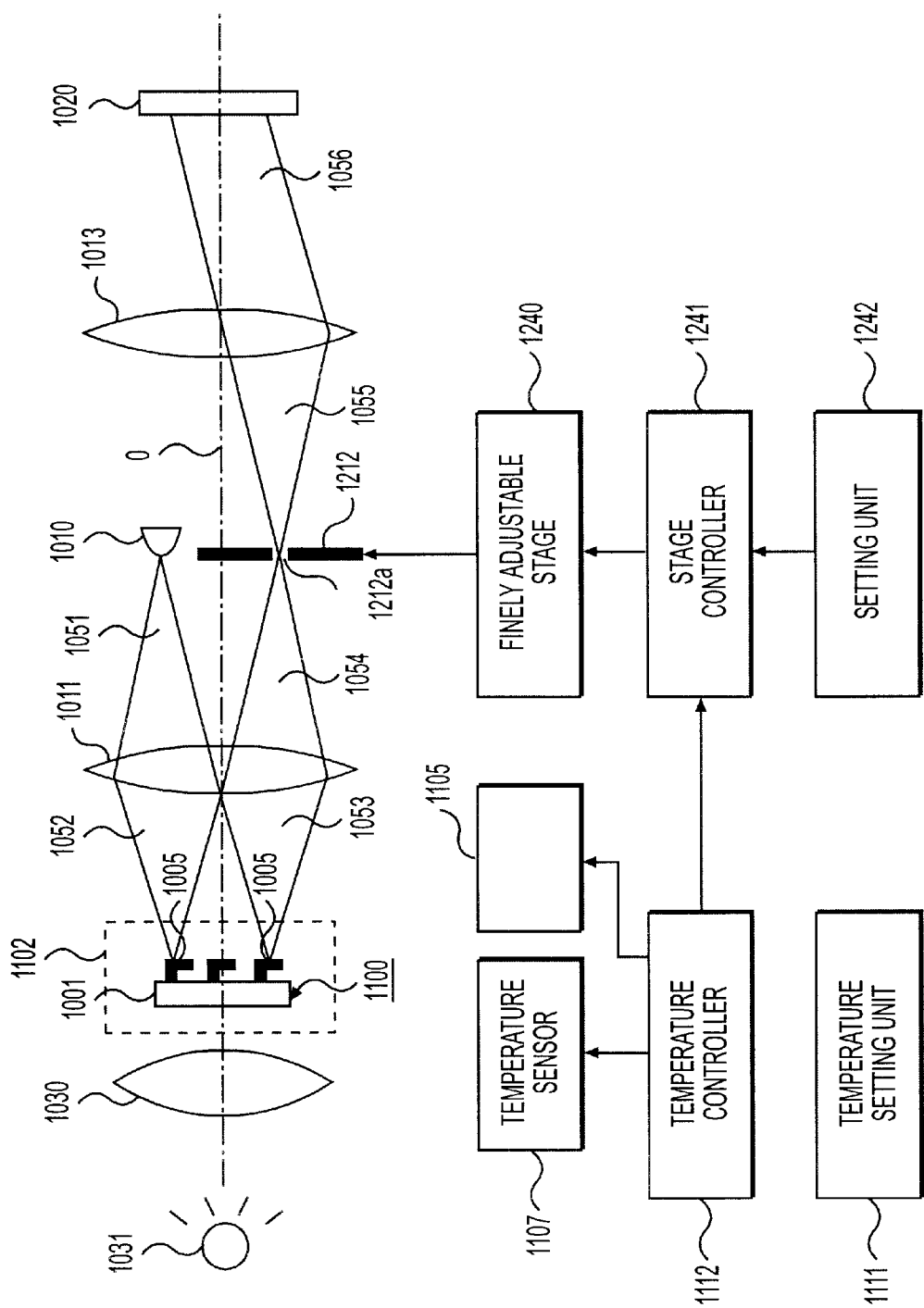
FIG. 19 schematically shows an imaging device according to an eighth preferred embodiment of the present invention.

FIG. 19 is a schematic view showing the imaging device according to an eighth preferred embodiment of the present invention. In FIG. 19, components which are the same as or correspond to components in FIG. 9 have the same symbols, and redundant explanations are omitted.

The differences of this preferred embodiment from the aforementioned sixth preferred embodiment are the fact that an aperture diaphragm (equivalent to a pinhole plate) 1212 is used in place of the transmissive type liquid crystal panel 1012 as the ray flux limiting part, and the fact that in place of the liquid crystal driver 1040, address signal generator 1041 and setting unit 1042, a finely adjustable stage 1240, stage controller 1241 and setting unit 1242 are used.

The aperture diaphragm 1212 includes a shield plate having an aperture 1212*a*, equivalent to the aforementioned site T of the transmissive type liquid crystal panel 1012.

The finely adjustable stage 1240 comprises a position adjustment mechanism which mechanically adjusts the position of the aperture diaphragm 1212 (and moreover, the position of the aperture 1212*a*). In this preferred embodiment, the finely adjustable stage 1240 is configured so as to enable movement in two dimensions, within the plane orthogonal to the optical axis O. The finely adjustable stage 1240 incorporates a motor or other actuator, and is made to operate by driving control signals from the stage controller 1241. The stage controller 1241 receives setting signals from the setting unit 1242, which outputs said setting signals in accordance with user operation, as well as the aforementioned difference signals (equivalent to the amount of fluctuation of the temperature of the substrate 1001) from the temperature controller 1112, and operates the finely adjustable stage such that the position of the aperture 1212a moves to the position obtained by performing corrections, in accordance with the aforementioned difference signal from the temperature controller 1112, to the position corresponding to the aforementioned setting signal. These corrections involve temperature fluctuations, similar to the corrections of the aforementioned sixth preferred embodiment.

In this preferred embodiment, the size and shape of the aperture 1212a corresponding to the aforementioned site T cannot be changed, so that the advantages accruing from changing the size and shape cannot be obtained. However, the position of the aperture 1212a equivalent to the aforementioned site T can be changed mechanically, and so the advantages of the imaging device accruing from changing the position can be obtained similarly to the sixth preferred embodiment.

In cases where corrections for temperature fluctuations are not performed, a finely adjustable stage 1240 not incorporating an actuator is used, and is configured so as to be mechanically linked with the setting unit 1242.

In place of the aforementioned aperture diaphragm 1212, a transparent plate on which is formed a shield film in the position equivalent to the aperture 1212a, a transparent plate on which is formed a reflective film in the position equivalent to the aperture 1212a, or a reflective plate having an aperture in the position equivalent to the aperture 1212a, may be used. When using a transparent plate on which is formed a reflective film or a reflective plate having an aperture, these may be positioned inclined with respect to the optical axis O, and the positioning of the lens system 1013 and CCD 1020 modified such that reflected light is directed toward the lens system 1013 and CCD 1020.

As explained above, in the present invention an optical system is provided which can be easily assembled, and the characteristics of which can be changed as appropriate.

Further, in the present invention an imaging device is provided which can be easily assembled, and the inherent characteristics of which can be changed as appropriate.

Ninth Preferred Embodiment

Next, some of potential drawbacks that may be realized in infrared ray detection devices are discussed before further describing the preferred embodiments of the present invention.

Figure 31A:
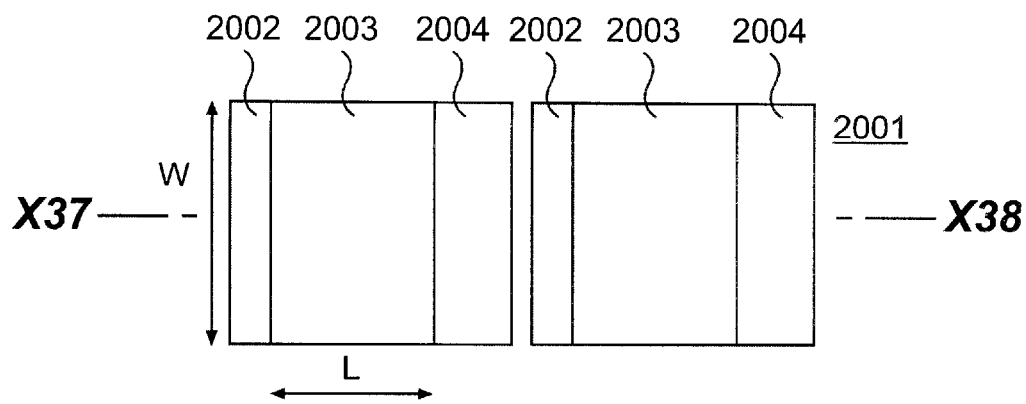
FIGS. 31A–31C schematically show one example of an infrared ray detection device.
Figure 31B:
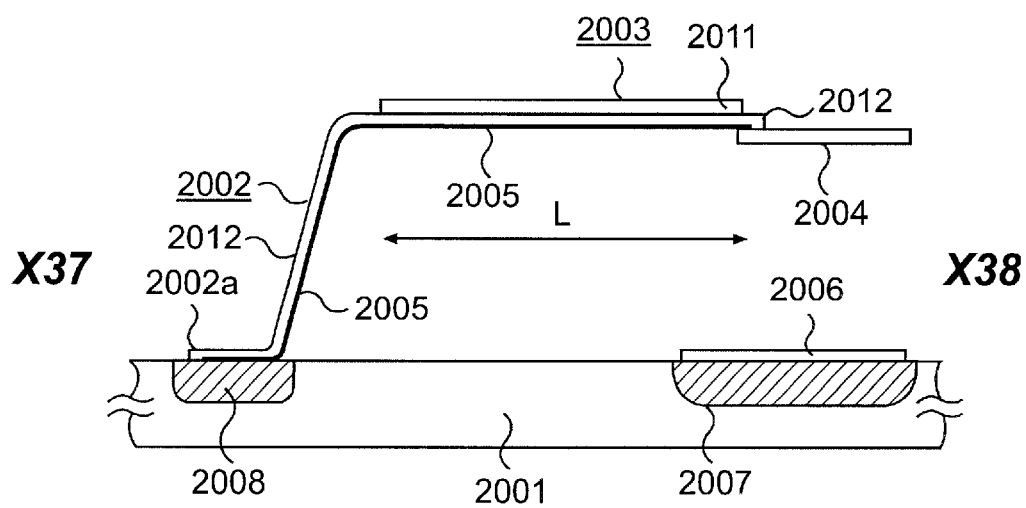
Figure 31C:
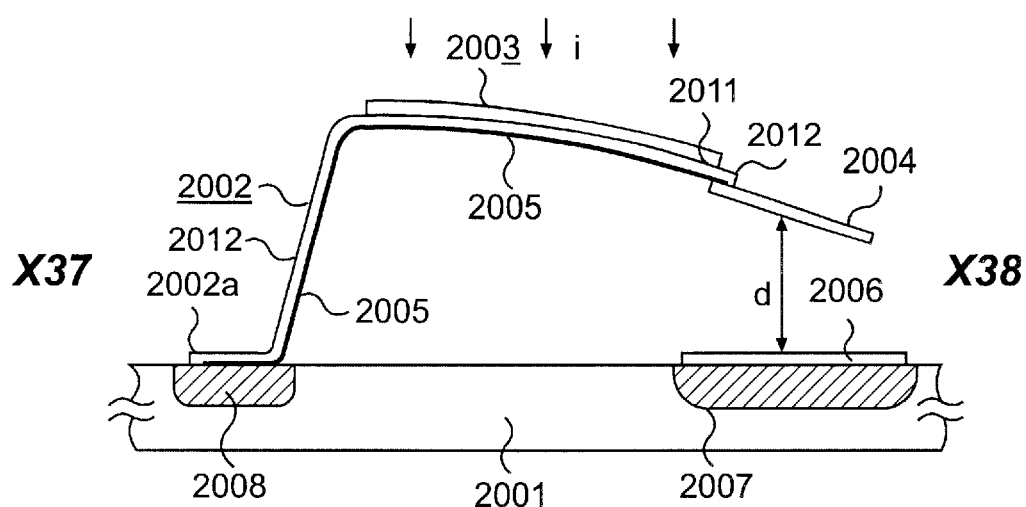

FIGS. 31A–31C schematically show an example of the infrared ray detection device. In FIGS. 31A–31C, displacement part 2003 is connected to substrate 2001 through leg part 2002 at end 2002a. In this infrared detection device, naturally the greater the amount of displacement of the displacement part 2003, the higher is the detection sensitivity. The amount of displacement of the displacement part 2003 depends on the expansion coefficient, film thickness, Young's modulus, and other physical constants of the two types of film 2011, 2012 constituting the displacement part 2003, as well as on the length L of the displacement part 2003; the longer the length L, the greater is the amount of displacement, whereas there is no dependence on the width W of the displacement part 2003. Hence when the films 2011, 2012 constituting the displacement part 2003 in the aforementioned infrared detection device are determined, by increasing the length L of the displacement part 2003, the detection sensitivity can be raised.

However, in the aforementioned infrared detection device, if the length L of the displacement part 2003 is increased so as to increase the amount of displacement of the displacement part 2003, when a plurality of pixels are positioned on a substrate 2001 as shown in FIG. 31A, the number of pixels in the length direction (the horizontal direction in FIGS. 31A–31C) is reduced, spatial resolution in the length direction is decreased, and the quality of the image obtained is degraded. In other words, in the case of the thermal displacement elements used in the aforementioned infrared detection devices, when a plurality of displacement parts 2003 are positioned on a substrate 2001, it is not possible to make the positioning nearly ideal while maintaining a large displacement amount.

Further, in the aforementioned infrared detection part, because the electrode 2004, as the displacement readout member, is provided at the end of the displacement part 2003, positioned so as to be approximately within the same plane as the displacement part 2003, when a plurality of pixels are positioned on the substrate 2001 as shown in FIGS. 31A–31C, the length in the horizontal direction in FIGS. 31A–31C of the totality of pixels increases by the length of the electrode 2004, so that the spatial resolution in that direction declines and the quality of the image obtained is degraded. That is, even when a plurality of pairs of displacement parts 2003 and electrodes (displacement readout members) are positioned on a substrate, it is not possible to make the positioning nearly ideal.

The situation explained above is not limited to thermal displacement elements and capacity-type thermal infrared detection devices using them, but is similar for the cases of other thermal displacement elements and radiation detection devices using them.

Therefore, it is desirable to have a thermal displacement element in which a large displacement amount can be obtained even when a plurality of displacement parts is positioned on the substrate, and in which more ideal positioning can be obtained, and have a radiation detection device using the same. Also, it is desirable to have a radiation detection device in which, even when a plurality of pairs of displacement parts and displacement readout members are positioned on a substrate, nearly ideal positioning of them is possible.

The following ninth to fourteenth preferred embodiments are particularly suitable for those purposes.

Figure 20A:
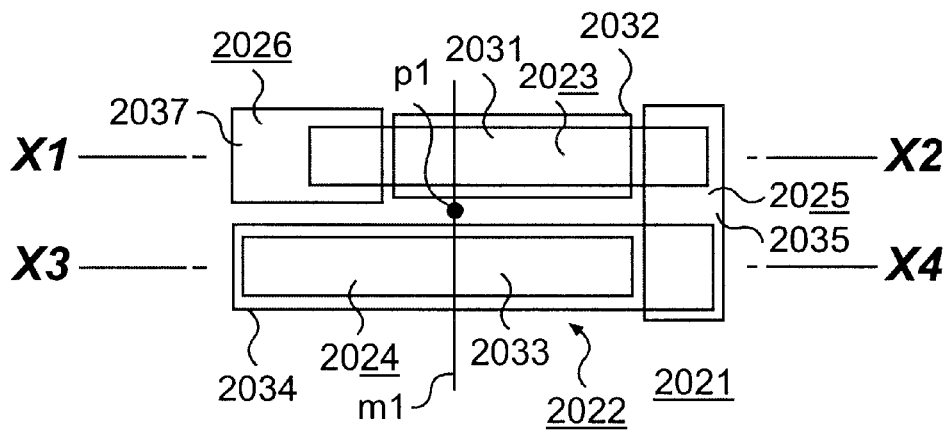
FIGS. 20A–20C schematically show a radiation detection device according to a ninth preferred embodiment of the present invention.
Figure 20B:
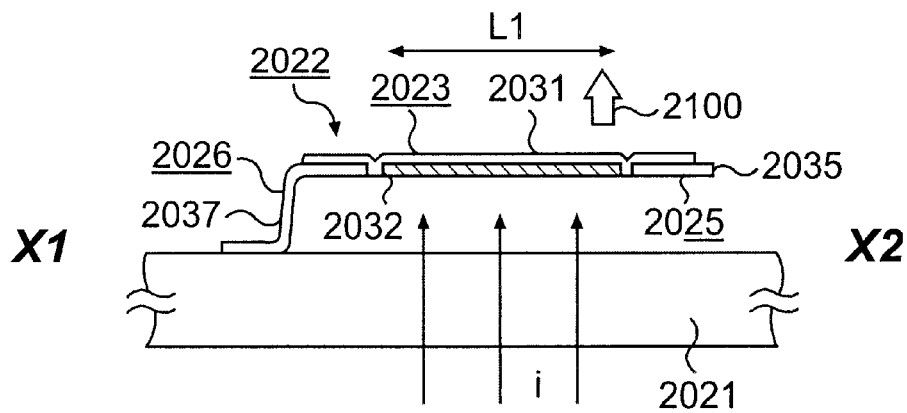
Figure 20C:
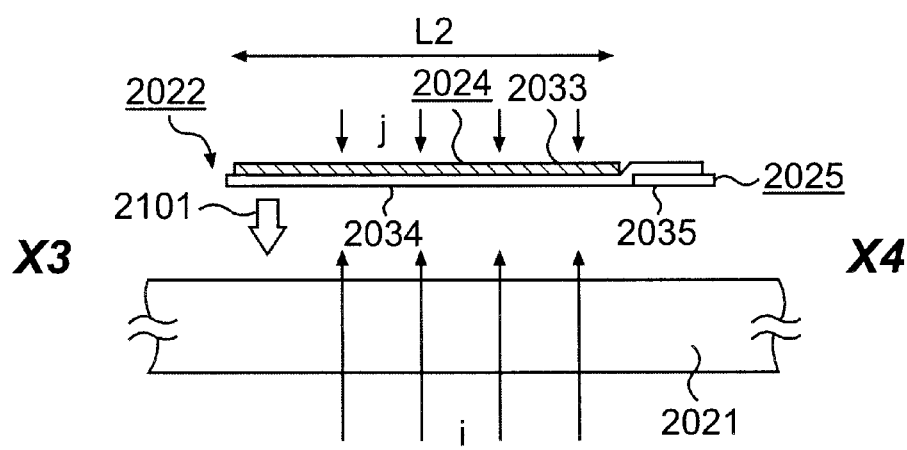

FIGS. 20A–20C schematically show an optical readout type radiation detection device according to a ninth preferred embodiment of the present invention. FIG. 20A is a schematic plan view showing a unit pixel (unit element), FIG. 20B is a schematic cross-sectional view along line X1–X2 in FIG. 20A, and FIG. 20C is a schematic cross-sectional view along line X3–X4 in FIG. 20A. In the following explanation, "right" and "left" refer to the right and left in FIGS. 20A–20C.

This radiation detection device is provided with a Si substrate 2021 as the base, and a displacement part 2022 supported by the substrate 2021 and which is displaced with respect to the substrate 2021 by heat. The displacement part 2022 is constructed of two individual displacement parts 2023, 2024, and a connecting part 2025 which mechanically connects the right ends of these. The displacement part 2022 is suspended over the substrate 2021 with an intervening space by fixing the left end of the individual displacement part 2023 to the substrate 2021 via a leg part 2026. However, instead of using such a leg part 2026, a hole may be formed in the substrate 2021, with the displacement part 2022 formed so as to protrude over said hole, and the left end of a leg part 2026 fixed in the edge portion of said hole in the substrate 2021 (this point is similar in preferred embodiments described below).

Each individual displacement part 2023, 2024 extends linearly in the left-right direction, and they are positioned in parallel. The individual displacement part 2023 is constructed of an $SiO_2$ film 2031 of thickness 3000 Angstroms, and below this, an Al film 2032 of thickness 3000 Angstroms. The individual displacement part 2024 is constructed of an Al film 2033 of thickness 3000 Angstroms, and below this, an $SiO_2$ film 2034 of thickness 3000 Angstroms. The expansion coefficient of Al is greater than the expansion coefficient of $SiO_2$, and the relation of magnitude of the expansion coefficients of the two films 2031, 2032 of the individual displacement part 2023 (the relation of the size of the expansion coefficient of the upper film 2031 to that of the lower film 2032), and the relation of magnitude of the expansion coefficients of the two films 2033, 2034 of the individual displacement part 2024 (the relation of the size of the expansion coefficient of the upper film 2033 to that of the lower film 2034), are opposite.

The connecting part 2025 is constructed of a SiON film 2035 of thickness 5000 Angstroms, formed from the position on the extension of the right end of the individual displacement part 2023 to the position on the extension of the right end of the individual displacement part 2024; the part of the $SiO_2$ film 2031 constituting the individual displacement part 2023 which extends in the right direction and overlaps with the SiON film 2035; and the part of the $SiO_2$ film 2034 constituting the individual displacement part 2024 which extends in the right direction and overlaps with the SiON film 2035.

The leg part 2026 is constructed of an SiON film 2037 of thickness 5000 Angstroms, and the part of the $SiO_2$ film 2031 constituting the individual displacement part 2023 which extends in the left direction and overlaps with the SiON film 2037.

As is clear from the above explanation, the ends of the individual displacement parts 2023, 2024 are fixed with respect to the substrate 2021 or are mechanically connected to one end of the other individual displacement part via a connecting part 2025, so that the two individual displacement parts 2023, 2024 form a single connected body which is mechanically connected. The left end of the individual displacement part 2023 is fixed with respect to the substrate 2021, and neither of the two ends of the individual displacement part 2024 is fixed with respect to the substrate 2021.

Here, when, on that route among the routes mechanically continuous from a certain individual displacement part among a plurality of individual displacement parts to the substrate 2021 for which the number of individual displacement parts contained in the route is smallest, if said individual displacement part is the Nth individual displacement part counting from the side of the aforementioned substrate 2021, then said individual displacement part is defined to be the Nth-stage individual displacement part; the Nth-stage individual displacement part is defined to be the previous-stage individual displacement part with respect to the N+1th-stage individual displacement part; and the N+1th-stage displacement part is defined to be the next-stage individual displacement part with respect to the Nth-stage individual displacement part. Further, the individual displacement part for which N takes the maximum value is defined to be the last-stage individual displacement part. These definitions shall apply similarly to each of the preferred embodiments described below.

According to these definitions, in the present preferred embodiment the only mechanically connected route from the individual displacement part 2023 to the substrate 2021 is: individual displacement part 2023→leg part 2026→substrate 2021. The individual displacement part 2023 is the first individual displacement part in this route, counting from the side of the substrate 2021. Hence the individual displacement part 2023 is a first-stage individual displacement part. Similarly, therefore, the individual displacement part 2024 is a second-stage individual displacement part. Consequently the individual displacement part 2023 is the previous-stage individual displacement part with respect to the individual displacement part 2024, and the individual displacement part 2024 is the next-stage individual displacement part with respect to the individual displacement part 2023. Because there do not exist third- or later-stage individual displacement parts, the individual displacement part 2024 is the last-stage individual displacement part.

As is clear from the above explanation, the end of the previous-stage individual displacement part 2023 and the end of the next-stage individual displacement part 2024, connected to each other via the same connecting part 2025, are the right-hand ends of the individual displacement parts 2023, 2024 and are the ends on the same side of the previous-stage and next-stage individual displacement parts 2023, 2024. Because of this, the individual displacement parts 2023, 2024 assume a folded-over form at the connecting part 2025.

The aforementioned individual displacement parts 2023, 2024 also serve as infrared ray absorption parts which absorb infrared rays i. It is not necessary that the films 2031, 2032 also serve as infrared ray absorption parts; for example, graphite or some other infrared ray-absorbing film may be formed on the bottom surface of the film 2032. Similarly, an infrared ray absorbing film may be formed on the bottom surface of the film 2034. Also, the Al film 2033 above the individual displacement part 2024 may also serve as a reflecting plate to reflect the received readout light j as the displacement readout member, used in order to obtain the prescribed change in response to the displacement occurring in the displacement part 2022. The readout light j is irradiated from above, but the readout light j is masked so as to irradiate only the Al film 2033 of the individual displacement part 2024 by means of a mask, not shown, provided above the displacement part 2022.

Also, though not shown in the drawings, with the displacement part 2022 and leg part 2026 as a unit element (pixel), these pixels are arranged in one dimension or in two dimensions on the substrate 2021.

As is clear from the above explanation, the substrate 2021, displacement part 2022 and leg part 2026 comprise a thermal displacement element which generates displacement in response to heat; and one displacement part 2022 each of this thermal displacement element is used in each unit pixel.

The radiation detection device of this preferred embodiment can be manufactured by a manufacturing method similar to that for radiation detection devices of the tenth preferred embodiment described below, using such semiconductor manufacturing techniques as film formation and patterning, and formation and removal of a sacrificial layer.

In the radiation detector device of this preferred embodiment, when infrared rays i are incident from below, the individual displacement parts 2023, 2024 absorb the infrared rays i and generate heat. By means of this heat, the individual displacement part 2023 is bent such that the right end of the individual displacement part 2023 is displaced upwards relative to the left end as shown by the arrow 2100 in FIG. 20B, and the individual displacement part 2024 is bent such that the left end of the individual displacement part 2024 is displaced downwards relative to the right end as shown by the arrow 2101 in FIG. 20C. At this time, the amount of angular change (angular displacement amount) with respect to the initial state of the left end of the individual displacement part 2024 is just equal to the amount of angular change obtained when a displacement part 2022 is comprised of a single individual displacement part having length equal to the sum of the length L1 of the individual displacement part 2023 (FIG. 20B) and the length L2 of the individual displacement part 2024 (FIG. 20C) (when, in the detection device shown in the above-mentioned FIGS. 31A–31C, the length L is made equal to the length L1+L2).

In this way a large amount of displacement can be obtained, and the detection sensitivity can be raised; despite this, the previous-stage displacement part 2023 and next-stage displacement part 2024 are mechanically connected so as to be folded over at the connecting part 2025, so that the length in the left-right direction of the displacement part 2022 is considerably shorter than the length L1+L2. Hence even when a plurality of displacement parts 2022 is positioned on the substrate 2021, the distribution density in the left-right direction of the plurality of displacement parts 2022 can be raised, the spatial resolution in the left-right direction is increased, and the quality of the image obtained is not degraded. Further, the length of the displacement part 2022 in the left-right direction is short, so that the position of the center of gravity of the displacement part 2022 is close to the point P1 on the straight line m1 in FIG. 20A; this position is close to the leg part 2026 compared with a displacement part 2022 having a single individual displacement part as in the aforementioned detection devices, so that balance is good and the element is stable. For this reason, the stress applied to the leg part 2026 is decreased, and a structure with high mechanical strength is realized.

Further, it is desirable that the single-layer film 2035 constituting the connecting part 2025 be made of a low-stress film (a film with low internal stress). This is because, by this means, the form of the displacement part 2022 will not easily tend to be deformed as if twisted, regardless of the displacement of the displacement part 2022. When the connecting part 2025 is constructed of a composite film of two or more layers, the stress for the overall composite film should be low. This point is similar in each of the preferred embodiments described below.

Moreover, in this preferred embodiment, the width of all films constituting the individual displacement parts 2023, 2024 (the length in the top-bottom direction in FIG. 20A) is somewhat broader for lower films, and the upper surfaces along both edges of the lower films (the edges extending in the left-right direction in FIG. 20A) are exposed without being completely covered by the upper films. In other words, the width of the lower film 2032 constituting the individual displacement part 2023 is somewhat broader than the width of the upper film 2031, and the upper surface along both edges of the lower film 2032 is exposed without being covered by the upper film 2031. A similar situation holds for the individual displacement part 2024. Hence in this preferred embodiment, when for example the upper film is photoetched during manufacturing, there is no occurrence of adhesion of the upper films 2031, 2033 to the side walls of the lower films 2032, 2034. If the upper films 2031, 2033 were to adhere to the side walls of the lower films 2032, 2034 (the side walls in the places extending left-right in FIG. 20A), then the part adhering to the side walls would act as reinforcing material, the mechanical strength would be unnecessarily increased, and displacement of the individual displacement parts, 2023, 2024 would be suppressed. This point is similar in each of the preferred embodiments described below.

Figure 21:
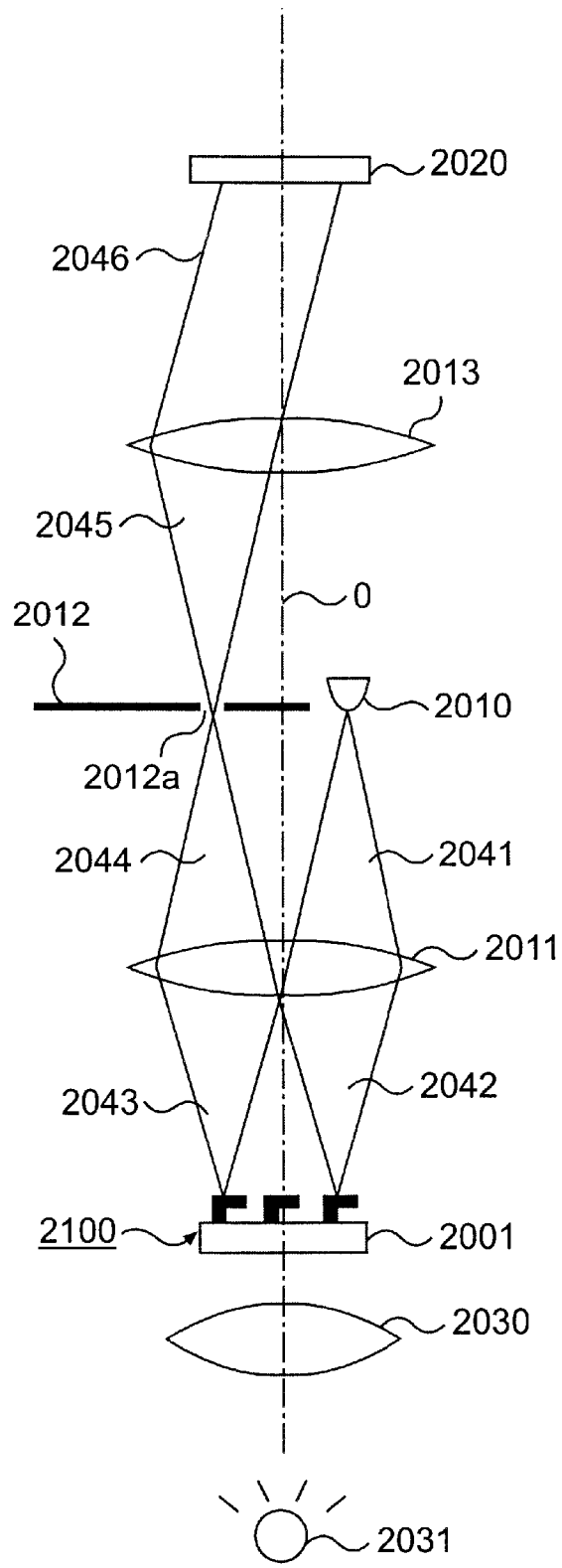
FIG. 21 schematically shows an example of an imaging device according to the present invention.

Here, one example of an imaging device using a radiation detection device of this preferred embodiment is explained, with reference to FIG. 21. FIG. 21 is a schematic diagram of the construction of this imaging device. The imaging device of FIG. 21 is essentially the same as the imaging device of FIG. 1, except that like elements are indicated by the same reference numerals increased by 2000, and accordingly, the description of the elements are duplicated here unless otherwise stated.

This is an example of an imaging device; however, if in FIG. 21 a radiation detection device having a single pixel (element) is used as the radiation detection device 2100, and if in place of the two-dimensional CCD 2020, a photodetector having a single photosensitive area is used, then a detection device can be constructed as a so-called point sensor for infrared rays. The same applies in each of the preferred embodiments described below.

Further, radiation detectors of the tenth, eleventh, thirteenth, and fourteenth preferred embodiments described below can be used as the radiation detection device 2100 in the imaging device shown in FIG. 21.

Tenth Preferred Embodiment

Figure 22A:
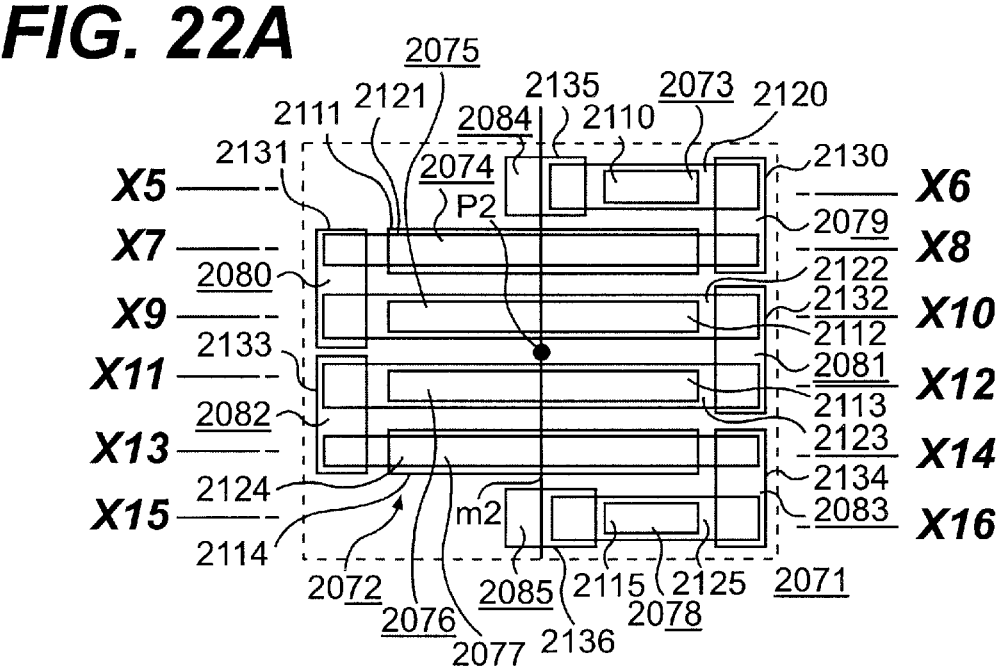
FIGS. 22A–22D schematically show a radiation detection device according to a tenth preferred embodiment of the present invention.
Figure 22B:
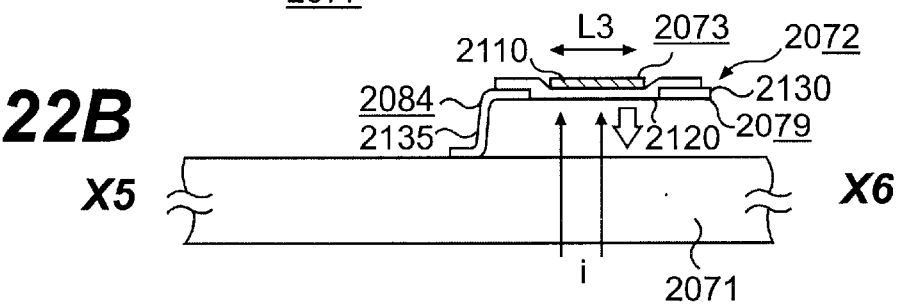
Figure 22C:
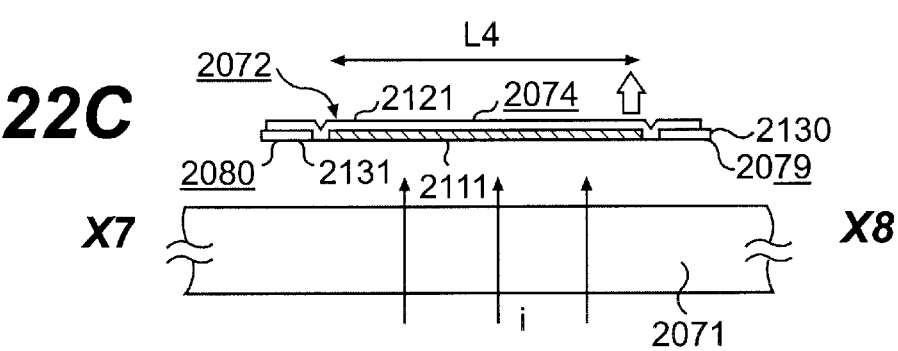
Figure 22D:
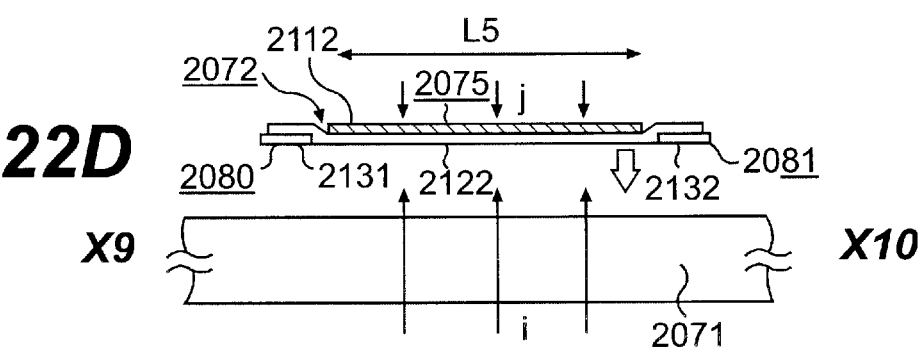

FIGS. 22A–22D are schematic diagrams of an optical readout type radiation detection device according to a tenth preferred embodiment of the present invention. FIG. 22A is a schematic plan view of a unit pixel (unit element); FIG. 22B is a schematic cross-sectional view along the line X5–X6 in FIG. 22A; FIG. 22C is a schematic cross-sectional view along the line X7–X8 in FIG. 22A; and FIG. 22D is a schematic cross-sectional view along the line X9–X10 in FIG. 22A. Though not shown in the figure, a schematic cross-sectional view along the line X11–X12 in FIG. 22A is similar to FIG. 22D, a schematic cross-sectional view along the line X13–X14 in FIG. 22A is similar to FIG. 22C, and a schematic cross-sectional view along the line X15–X16 in FIG. 22A is similar to FIG. 22B. In the following explanation, "right" and "left" refer to the right and left in FIGS. 22A–22D.

This radiation detection device is provided with an Si substrate 2071 as the base, and a displacement part 2072 supported by the substrate 2071 and which is displaced with respect to the substrate 2071 in response to heat. The displacement part 2072 has six individual displacement parts 2073 to 2078, and five connecting parts 2079 to 2083 which mechanically connect prescribed ends of these. The displacement part 2072 is suspended from the substrate 2071 with an intervening space by fixing the left end of the individual displacement part 2073 via the leg part 2084, and by fixing the left end of the individual displacement part 2078 via the leg part 2085, each with respect to the substrate 2071. The right end of the individual displacement part 2073 and the right end of the individual displacement part 2074 are mechanically connected by the connecting part 2079; the left end of the individual displacement part 2074 and the left end of the individual displacement part 2075 are mechanically connected by the connecting part 2080; the right end of the individual displacement part 2075 and the right end of the individual displacement part 2076 are mechanically connected by the connecting part 2081; the left end of the individual displacement part 2076 and the left end of the individual displacement part 2077 are mechanically connected by the connecting part 2082; and the right end of the individual displacement part 2077 and the right end of the individual displacement part 2078 are mechanically connected by the connecting part 2083.

Each of the individual displacement parts 2073 to 2078 extends linearly in the left-right direction, and are positioned in parallel. Each of the individual displacement parts 2073, 2075, 2076, 2078 is constructed of an Al film, and below it an $SiO_2$ film. On the other hand, each of the individual displacement parts 2074, 2077 is constructed of an $SiO_2$ film, and below it an Al film. In FIGS. 22A–22D, reference numerals 2110 to 2115 represent the Al films constituting the individual displacement parts 2073 to 2078, and 2120 to 2125 represent the $SiO_2$ films constituting the individual displacement parts 2073 to 2078. The expansion coefficient of Al is larger than the expansion coefficient of $SiO_2$, and the relation of magnitude of the expansion coefficients of the two films in each of the individual displacement parts 2073, 2075, 2076, 2078 is the reverse of the relation of magnitude of the expansion coefficients of the two films in each of the individual displacement parts 2074, 2077.

The connecting part 2079 is constructed of the SiON film 2130 formed from the position on the extension of the right end of the individual displacement part 2073 to the position on the extension of the right end of the individual displacement part 2074; the part of the $SiO_2$ film 2120 constituting the individual displacement part 2073 which extends in the right direction and overlaps with the SiON film 2130; and the part of the $SiO_2$ film 2121 constituting the individual displacement part 2074 which extends in the right direction and overlaps with the SiON film 2130. The connecting parts 2080 to 2083 are similarly constituted. In FIGS. 22A–22D, 2131 to 2134 represent the SiON films constituting the respective connecting parts 2080 to 2083, and correspond to the aforementioned SiON film 2130.

The leg part 2084 is constructed of the SiON film 2135, and the part of the $SiO_2$ film 2120 constituting the individual displacement part 2073 which extends in the left direction and overlaps with the SiON film 2135. Similarly, the leg part 2085 is constructed of the SiON film 2136, and the part of the $SiO_2$ film 2125 constituting the individual displacement part 2078 which extends in the left direction and overlaps with the SiON film 2136.

As is clear from the above, in this preferred embodiment the ends of the individual displacement parts 2073 to 2078 are either fixed with respect to the substrate 2071 or are mechanically connected to one end of another individual displacement part via connecting parts 2079 to 2083, such that the six individual displacement parts 2073 to 2078 form a single mechanically connected body overall. The left ends of the individual displacement parts 2073, 2078 are fixed with respect to the substrate 2071, and one of the two ends of the individual displacement parts 2074 to 2077 is not fixed with respect to the substrate 2071.

According to the definitions above, there are two routes which are mechanically continuous from the individual displacement part 2074 to the substrate 2071: the first route is individual displacement part 2074→connecting part 2079→individual displacement part 2073 →leg part 2084→substrate 2071; the second route is individual displacement part 2074→connecting part 2080→individual displacement part 2075→connecting part 2081→individual displacement part 2076→connecting part 2082→individual displacement part 2077→connecting part 2083→individual displacement part 2078→leg part 2085→substrate 2071. Of these two routes, the route containing the fewest number of individual displacement parts is the aforementioned first route. The individual displacement part 2074 is the second individual displacement part in this first route, counting from the side of the substrate 2071. Hence the individual displacement part 2074 is a second-stage individual displacement part. Similarly, the individual displacement part 2073 is a first-stage individual displacement part, the individual displacement part 2075 is a third-stage individual displacement part, the individual displacement part 2076 is a third-stage individual displacement part, the individual displacement part 2077 is a second-stage individual displacement part, and the individual displacement part 2078 is a first-stage individual displacement part; the individual displacement parts 2075, 2076 are last-stage individual displacement parts.

As is clear from the above explanation, in this preferred embodiment, for each of the individual displacement parts 2079 to 2083, the end of the previous-stage individual displacement part and the end of the next-stage individual displacement part connected via the same connecting part are on the same sides of said previous-stage and next-stage individual displacement parts. For example, the end of the first-stage (previous stage) individual displacement part 2073 and the end of the second-stage (next-stage) individual displacement part 2074, which are connected via the same connecting part 2079, are both right-side ends, which is the same side for each of said individual displacement parts 2073, 2074. By this means, the individual displacement parts 2073, 2074 assume a folded-over form at the connecting part 2079.

In this preferred embodiment, there are two first-stage individual displacement parts, 2073 and 2078, and there are two last-stage individual displacement parts, 2075, 2076. The structure from one of the first-stage individual displacement parts, 2073, to one of the last-stage individual displacement parts, 2075, and the structure from the other first-stage individual displacement part, 2078, to the other last-stage individual displacement part, 2076, are symmetrical.

The individual displacement parts 2073 to 2078 also serve as infrared absorption parts, absorbing infrared rays i. The Al films 2112, 2113 on top of the individual displacement parts 2075, 2076 also serve as a reflecting plate to reflect the received readout light j as the displacement readout member, used in order to obtain the prescribed change in response to the displacement occurring in the displacement part 2072. The readout light j is irradiated from above, but the readout light j is masked so as to irradiate only the Al films 2112, 2113 of the individual displacement parts 2075, 2076 by means of a mask, not shown, provided above the displacement part 2072.

Also, though not shown in the drawings, with the displacement part 2072 and leg parts 2084, 2085 as a unit element (pixel), these pixels are arranged in one dimension or in two dimensions on the substrate 2071.

As is clear from the above explanation, the substrate 2071, the displacement part 2072 and the leg parts 2084, 2085 comprise a thermal displacement element which produces displacement in response to heat.

Next, one example of a method of manufacture of a radiation detection device of this preferred embodiment is explained with reference to FIGS. 23A, 23B, 24A, and 24B.

FIGS. 23A, 23B, 24A, and 24B are schematic plan views which show schematically the production process. These figures show processes for only the region of one pixel.

Figure 23A:
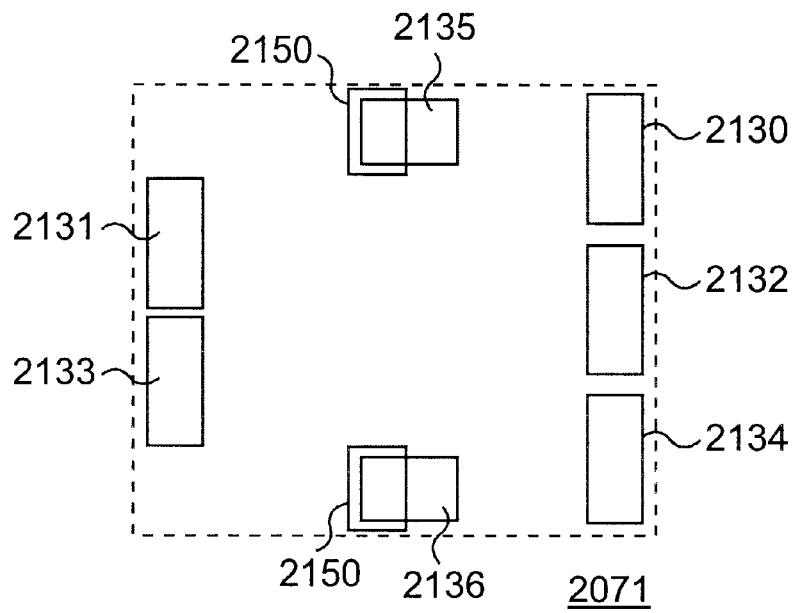
FIGS. 23A and 23B illustrate a manufacturing process of the radiation detection device shown in FIGS. 22A to 22D.
Figure 23B:
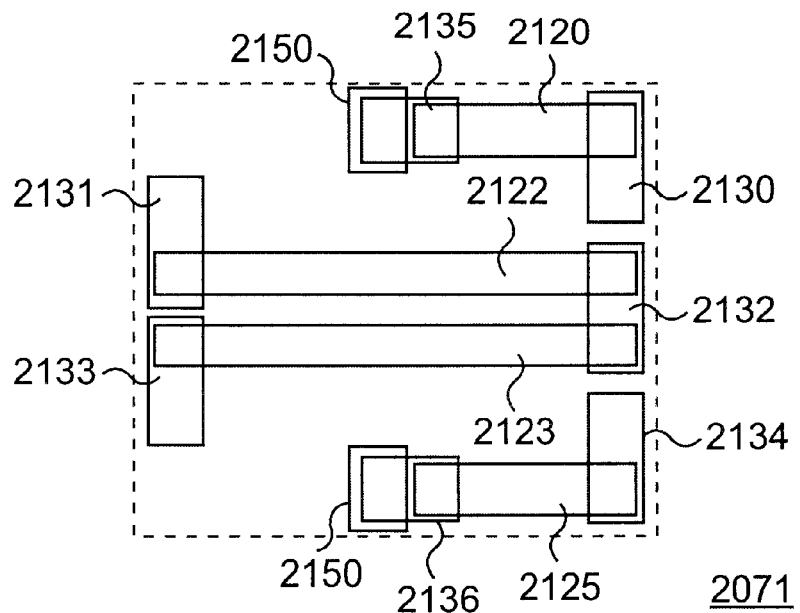

First, as shown in FIG. 23A, the entire surface of the Si substrate 2071 is coated with a resist (not shown) as a sacrificial layer, and photolithography is used to form apertures 2150 only in the areas where the leg parts 2084, 2085 contact the substrate 2071. Then, after using the P-CVD method to deposit low-stress SiON film of thickness 5000 Angstroms, to become the films 2130 to 2136 constituting the connecting parts 2079 to 2083 and leg parts 2084, 2085, patterning by photoetching is performed, to shape the films 2130 to 2136 (FIG. 23A). Next, the P-CVD method is used to deposit $SiO_2$ film of thickness 3000 Angstroms, to become the films 2120, 2122, 2123, 2125 on the lower side of the individual displacement parts 2073, 2075, 2076, 2078. Then patterning by photoetching is performed, to shape the films 2120, 2122, 2123, 2125 (FIG. 23B).

Figure 24A:
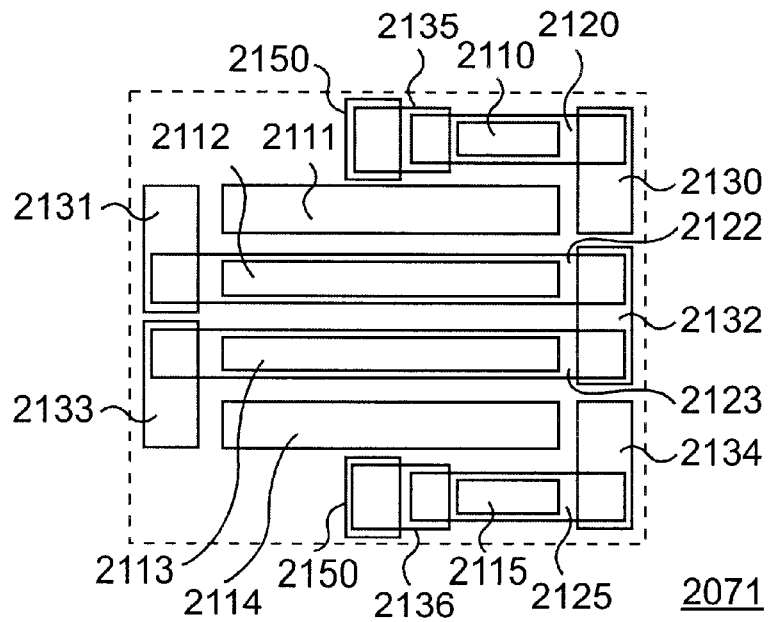
FIGS. 24A and 24B illustrate steps to be performed after the steps shown in FIGS. 23A and 23B.

Next, after using vacuum deposition to deposit Al film of thickness 3000 Angstroms, to become the upper films 2110, 2112, 2113, 2115 of the individual displacement parts 2073, 2075, 2076, 2078 and the lower films 2111, 2114 of the individual displacement parts 2074, 2077, photoetching was used to shape the films 2110 to 2115 (FIG. 24A). Thus, in this example, a single process is used to form the upper films 2110, 2112, 2113, 2115 of the individual displacement parts 2073, 2075, 2076, 2078 and the lower films 2111, 2114 of the individual displacement parts 2074, 2077, therefore simplifying the manufacturing process in a desirable way.

Figure 24B:
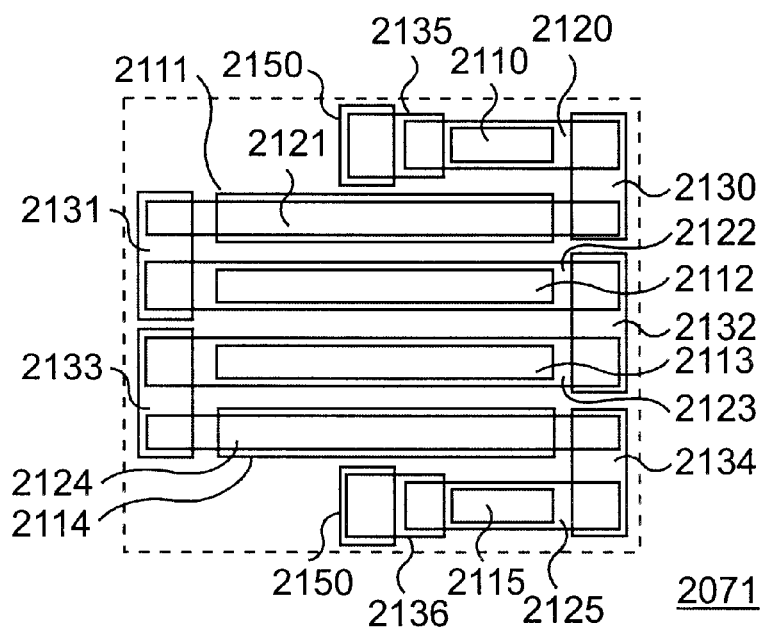

Then, $SiO_2$ film is deposited to a thickness of 3000 Angstroms to become the upper films 2121, 2124 of the individual displacement parts 2074, 2076, and photoetching was used in patterning to shape the films 2121, 2124 (FIG. 24B).

Finally, dicing or some other means is used to divide the substrate in the state shown in FIG. 24B into chips, and the aforementioned resist serving as a sacrificial layer is removed by ashing or some other method. As a result, the radiation detection device shown in FIGS. 22A–22D is completed.

Further, by a method similar to this manufacturing method, a radiation detection device of each of the preferred embodiments described below can be fabricated.

In a radiation detection device of this preferred embodiment also, through operation similar to that of the aforementioned ninth preferred embodiment, similar advantages can be obtained. In this preferred embodiment, the left ends of two individual displacement parts 2073, 2078 are fixed with respect to the substrate 2071 via the leg parts 2084, 2085 respectively, so that a structure with high mechanical strength is obtained. Further, in this preferred embodiment the position of the center of gravity of the displacement part (connected body) 2072 is close to the point P2 on the straight line m2 in FIG. 22A; and the central position of support by the substrate 2071 of the displacement part 2072 (in this preferred embodiment, the center of the line segment connecting the leg parts 2084, 2085) is also near the point P2. Hence in this preferred embodiment, balance is extremely good, and a structure with even greater mechanical strength is realized.

Eleventh Preferred Embodiment

Figure 25:
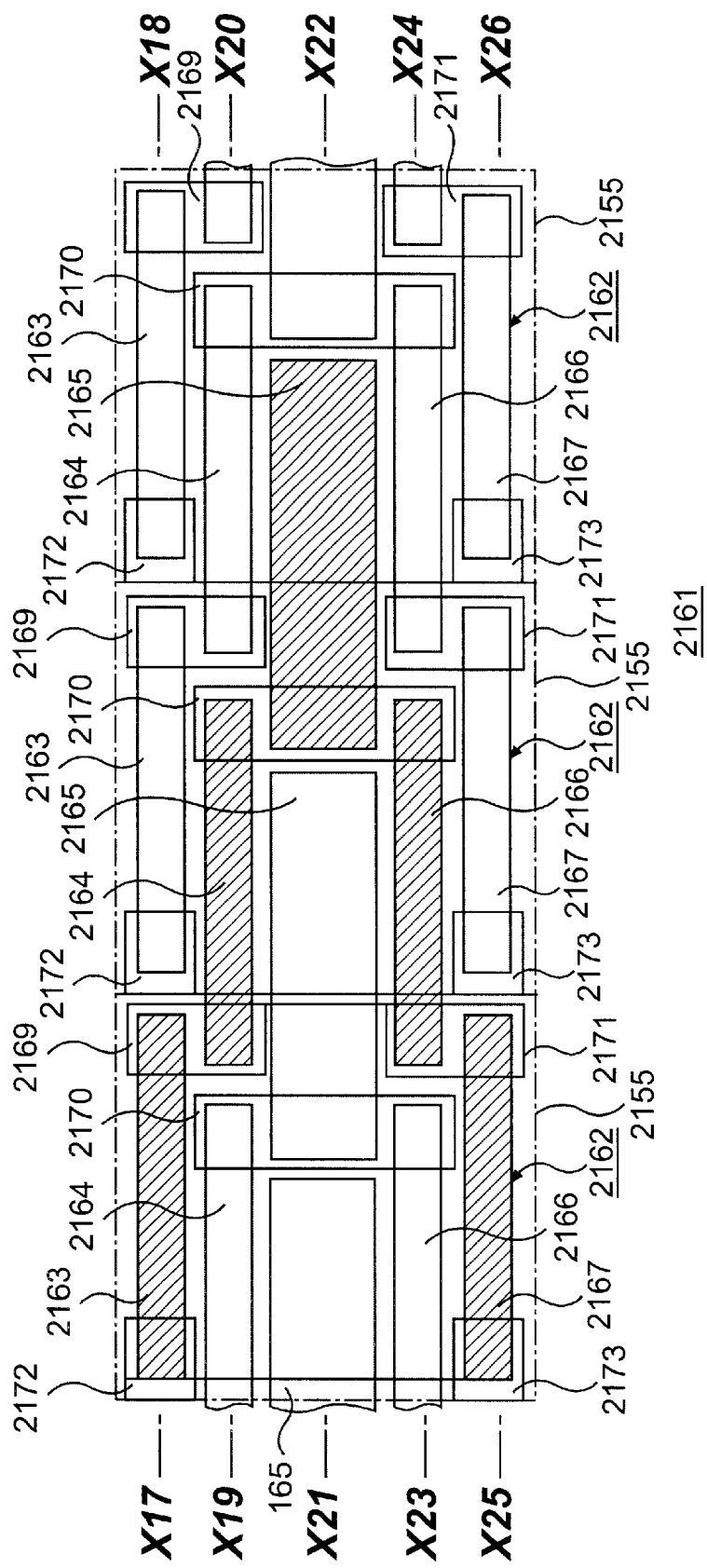
FIG. 25 is a plan view schematically showing a radiation detection device according to an eleventh preferred embodiment of the present invention.

FIG. 25 is a schematic plan view schematically showing an optical readout type radiation detection device according to an eleventh preferred embodiment of the present invention. In FIG. 25, three unit pixels (unit elements) are shown. Though not shown, the schematic cross-sectional view of the unit pixel along the line X17–X18 in FIG. 25, and the schematic cross-sectional view of the unit pixel along the line X25–X26 in FIG. 25, are similar to FIG. 22B; the schematic cross-sectional view of the unit pixel along the line X19–X20 in FIG. 25, and the schematic cross-sectional view of the unit pixel along the line X23–X24 in FIG. 25, are similar to FIG. 22D; and the schematic cross-sectional view of the unit pixel along the line X21–X22 in FIG. 25 is similar to a left-right reversal of FIG. 20C. In the following explanation, "right" and "left" refer to the right and left in FIG. 25.

In FIG. 25, 2155 represents the region of a unit pixel, and the shaded areas are unit pixels. A single unit pixel is provided spanning three unit pixel regions.

This radiation detection device is provided with an Si substrate 2161 as the base, and a displacement part 2162 supported by the substrate 2161 and which is displaced with respect to the substrate 2161 in response to heat. The displacement part 2162 has five individual displacement parts 2163 to 2167, and three connecting parts 2169 to 2171 which mechanically connect the prescribed ends of these. The displacement part 2162 is suspended over the substrate 2161 with an intervening space by fixing the left end of the individual displacement part 2163 via the leg part 2172, and the left end of the individual displacement part 2167 via the leg part 2173, to the substrate 2161. The right end of the individual displacement part 2163 and the left end of the individual displacement part 2164 are mechanically connected by the connecting part 2169; the right end of the individual displacement part 2164, the right end of the individual displacement part 2166, and the left end of the individual displacement part 2165 are mechanically connected by the connecting part 2170; and the left end of the individual displacement part 2166 and the right end of the individual displacement part 2167 are mechanically connected by the connecting part 2171.

Each of the individual displacement parts 2163 to 2167 extends linearly in the left-right direction, and are positioned in parallel. The constitution of each of the individual displacement parts 2163 to 2167 is similar to the individual displacement parts in the aforementioned first and tenth preferred embodiments; but all of the individual displacement parts 2163 to 2167 are constructed of an Al film and, below it, an $SiO_2$ film. That is, in each of the individual displacement parts 2163 to 2167, the relation of magnitude of the expansion coefficients of the two films is the same. The constitutions of the connecting parts 2169 to 2171 and leg parts 2172, 2173 are also similar to the connecting parts and leg parts respectively in the aforementioned first and tenth preferred embodiments.

As is clear from the above explanation, in this preferred embodiment each of the ends of the individual displacement parts 2163 to 2167 are either fixed with respect to the substrate 2161, or else mechanically connected to one end of another individual displacement part via a connecting part 2169 to 2171, such that the five individual displacement parts 2163 to 2167 overall form a single mechanically connected body. The left ends of the individual displacement parts 2163, 2167 are fixed with respect to the substrate 2161, and neither of the two ends of the individual displacement parts 2164 to 2166 is fixed with respect to the substrate 2161.

According to the definitions above, the individual displacement part 2163 is a first-stage, the individual displacement part 2164 is a second-stage, the individual displacement part 2165 is a third-stage, the individual displacement part 2166 is a second-stage, and the individual displacement part 2167 is a first-stage individual displacement part; the individual displacement part 2165 is a last-stage individual displacement part.

The individual displacement parts 2163 to 2167 also serve as infrared absorption parts, absorbing infrared rays. The Al film on top of the individual displacement part 2165 also serves as a reflecting plate to reflect the received readout light as the displacement readout member, used in order to obtain the prescribed change in response to the displacement occurring in the displacement part 2162. The readout light j is irradiated from above, but the readout light j is masked so as to irradiate only the Al film of the individual displacement part 2165 by means of a mask, not shown, provided above the displacement part 2162.

Also, as shown in FIG. 25, with the displacement part 2162 and leg parts 2172, 2173 as a unit element (pixel), these pixels are arranged in one dimension or in two dimensions on the substrate 2161.

As is clear from the above explanation, the substrate 2161, the displacement part 2162 and the leg parts 2172, 2173 comprise a thermal displacement element which produces displacement in response to heat.

In this preferred embodiment, the amount of angular change occurring in the individual displacement part 2165 is equal to the amount of angular change obtained when the displacement part 2162 has a single individual displacement part of length equal to the sum of the length of the individual displacement part 2163, the length of the individual displacement part 2164, and the length of the individual displacement part 2165 (when, in the aforementioned detection device of shown in FIGS. 31A–31C, the length L is made equal to the aforementioned sum of lengths).

Despite the fact that such a large displacement can be obtained, and in addition the detection sensitivity can be raised, each of the individual displacement parts 2163 to 2167 is positioned shifted in the top-to-bottom direction, so that the distribution density in the left-right direction of the individual displacement part 2165, which also functions as a reflecting plate to reflect readout light, can also be raised, the spatial resolution in the left-right direction can be improved, and there is no degradation of the quality of the image obtained.

Further, in this preferred embodiment, the left ends of two individual displacement parts 2163, 2167 are fixed with respect to the substrate 2161 via the leg parts 2172, 2173 respectively, and by this means the displacement part 2162 is supported at two support points, so that a structure with comparatively high mechanical strength is realized.

Twelfth Preferred Embodiment

Figure 26:
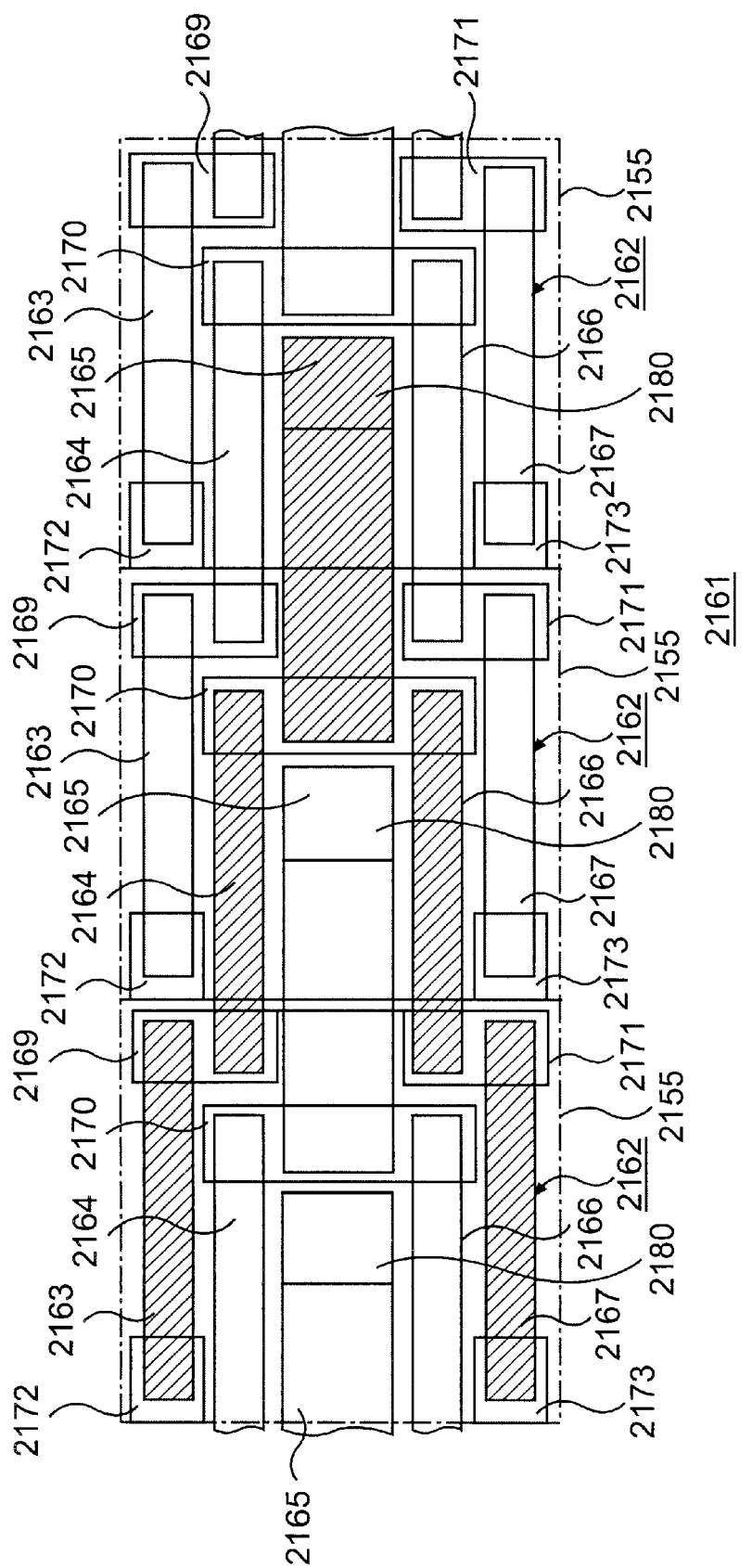
FIG. 26 is a plan view schematically showing a radiation detection device according to a twelfth preferred embodiment of the present invention.

FIG. 26 is a schematic plan view schematically showing an electrostatic capacitance type radiation detection device according to a twelfth preferred embodiment of the present invention. In FIG. 26, those components which are the same as in FIG. 25 or correspond to components in FIG. 25 have the same symbols. Redundant explanations are here omitted.

The differences of this preferred embodiment from the aforementioned radiation detection device shown in FIG. 25 are the provision of an electrode 2180 at the tip of the last-stage individual displacement part 2165 equivalent to the electrode 2004 in FIGS. 31A–31C, and the provision of components (not shown) equivalent to the wiring layer 2005, the electrode 2006 and the diffusion layers 2007, 2008 in FIGS. 31A–31C.

Through this preferred embodiment also, advantages similar to those of the aforementioned eleventh preferred embodiment are obtained.

Moreover, if a modification similar to the modification of the eleventh preferred embodiment to obtain the twelfth preferred embodiment is performed on the aforementioned first and tenth preferred embodiments, an electrostatic capacitance type radiation detection device corresponding to the first and tenth preferred embodiments, respectively, can be obtained.

Thirteenth Preferred Embodiment

Figure 27A:
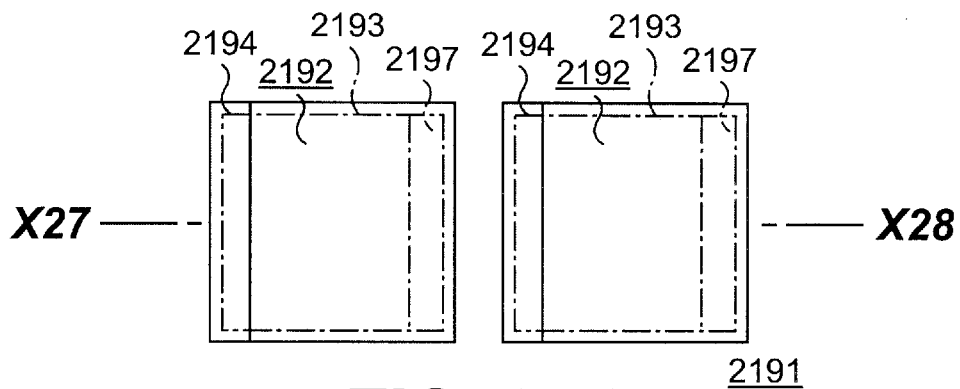
FIGS. 27A–27C schematically show a radiation detection device according to a thirteenth preferred embodiment of the present invention.
Figure 27B:
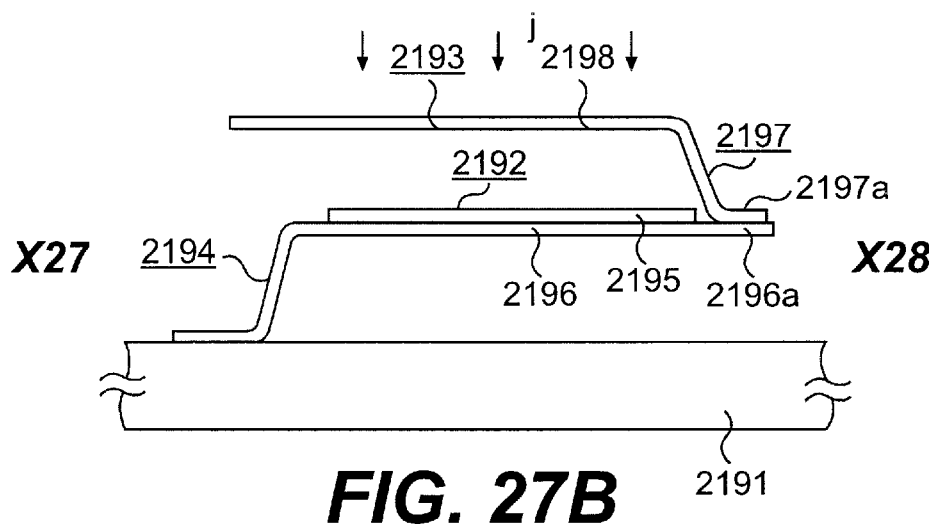
Figure 27C:
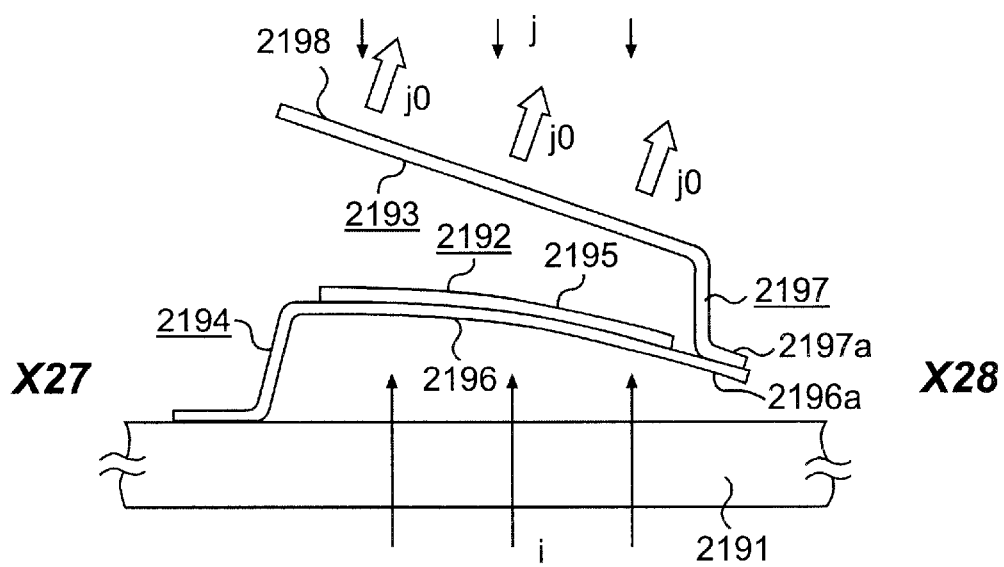

FIGS. 27A–27C show a radiation detection device according to a thirteenth preferred embodiment of the present invention; FIG. 27A is a schematic plan view, FIG. 27B is a schematic cross-sectional view along line X27–X28 in FIG. 27A in the state where there is no incident infrared ray i, and FIG. 27C is a schematic cross-sectional view along line X27–X28 in FIG. 27A in the state where there is an incident infrared ray i. In FIG. 27A, only two unit elements (unit pixels) are shown; in FIGS. 27B and 27C, only one unit element is shown.

This radiation detection device is provided with an Si substrate 2191 as the base; a displacement part 2192 supported by the substrate 2191 and which is displaced with respect to the substrate 2191 in response to heat; and a reflecting plate 2193 which, as a displacement readout member used to obtain a prescribed change corresponding to the displacement occurring in the displacement part 2192, reflects the received readout light j.

The displacement part 2192 is suspended over the substrate 2191 with an intervening space by fixing one end with respect to the substrate 2191 via a leg part 2194. The displacement part 2192 is constructed of an Al film 2195 and, below it, an $SiO_2$ film 2196; it also serves as an infrared ray absorption part to absorb infrared rays i. The coefficient of expansion of Al is larger than the coefficient of expansion of $SiO_2$. The leg part 2194 is configured by extending the $SiO_2$ film 2196 which comprises part of the displacement part 2192.

The reflecting plate 2193 is positioned above the displacement part 2192 with an intervening space by fixing one end with respect to the tip of the displacement part 2192 via the leg part 2197; it is positioned so as to essentially cover a unit pixel region. The $SiO_2$ film 2196 which comprises part of the displacement part 2192 extends somewhat in the right direction from the tip of the displacement part 2192 in FIGS. 27A–27C, and the bottom 2197a of the leg part 2197 is fixed to this extended portion 2196a. The reflecting plate 2193 is made of a low-stress Al film 2198, and is a nearly flat reflecting mirror. The leg part 2197 is constructed of an extension of the Al film 2198 constituting the reflecting plate 2193. The aforementioned leg part 2197 and aforementioned portion 2196a comprise the connecting part mechanically connecting the tip of the displacement part 2192 and the end of the reflecting plate 2193. The reflecting plate 2193 need not necessarily be fixed with respect to the tip of the displacement part 2192, but if fixed with respect to the tip, the amount of inclination of the reflecting plate 2193 accompanying displacement of the displacement part 2192 is increased, and so is desirable.

As shown in FIG. 27A, with the displacement part 2192, reflecting plate 2193 and leg parts 2194, 2197 as a unit element (pixel), these pixels are arranged in one dimension or in two dimensions on the substrate 2191.

In this preferred embodiment, when infrared rays i are incident from below, the displacement part 2192 absorbs the infrared rays i and produces heat. By means of this heat, the displacement part 2192 bends downward as shown in FIG.

27C, and the reflecting plate 2193 is inclined in accordance with the displacement of the tip of the displacement part 2192. Here the reflecting plate 2193 is placed above the displacement part 2192 with an intervening space, and so is flat without bending. Hence the readout light j, which is incident from above in nearly-parallel rays, is completely reflected in the direction of the arrow j0 in FIG. 27C. In this way, the amount of incident infrared rays is read as a change in the direction of reflection of the readout light.

In this preferred embodiment, the reflecting plate 2193 is positioned above the displacement part 2192, so that compared with the case in which the reflecting plate 2193 is positioned at the tip of the displacement part 2192 to be approximately in the same plane as the displacement part without providing a leg part 2197, as in the device shown in FIGS. 31A–31C, even when a plurality of pixels are positioned, the distribution density in the left-right direction of FIG. 27A of the plurality of pixels can be raised, as shown in FIG. 27A, the spatial resolution in the left-right direction can be improved, and there is no degradation of quality of the image obtained.

Further, in this preferred embodiment the detection sensitivity of the incident infrared rays i and the S/N ratio are improved. This point is here explained in comparison with a radiation detection device shown in FIGS. 28A–28C.

Figure 28A:
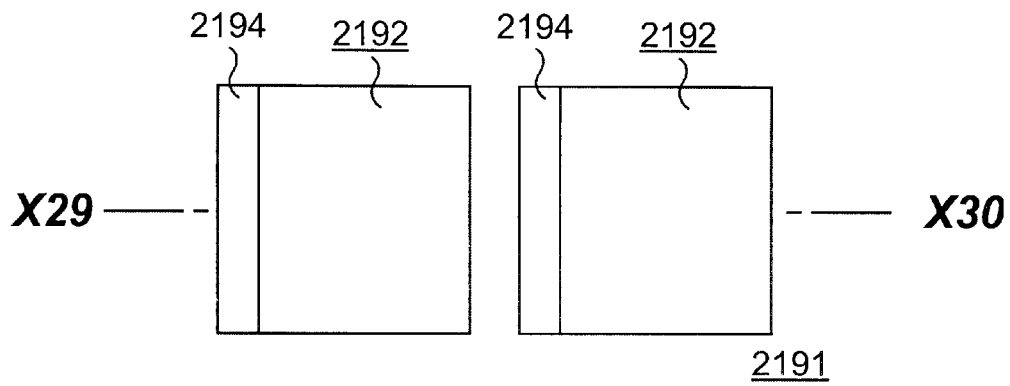
FIGS. 28A–28C schematically show an example of a radiation detection device.
Figure 28B:
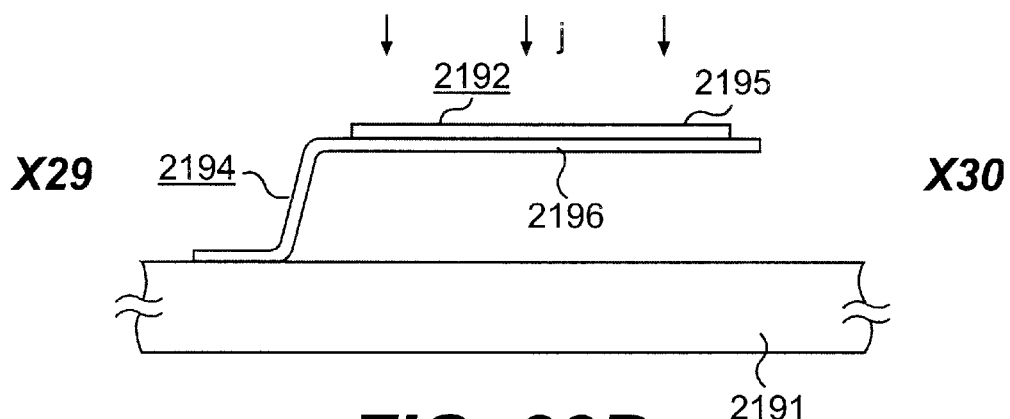
Figure 28C:
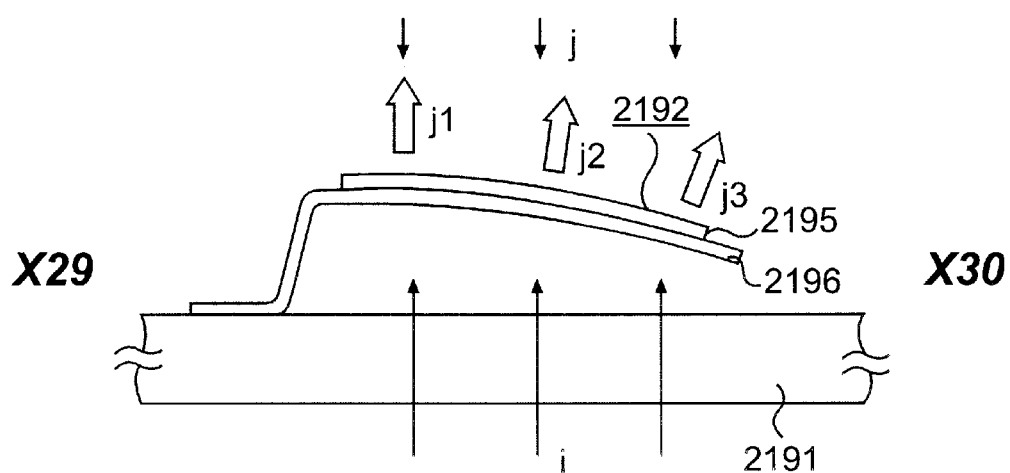

FIGS. 28A–28C correspond to FIGS. 27A–27C, respectively; in the radiation detection device shown in FIGS. 28A–28C, the reflecting plate 2198 of FIGS. 27A–27C is removed, and the Al film 2195 of the displacement part 2192 also serves as a reflecting plate. In the case of FIGS. 28A–28C, when an infrared ray i is incident, the displacement part 2192 bends into an arc shape as shown in FIG. 28C, so that the readout light j, which is incident in nearly parallel rays, is reflected in widening directions such as the directions of the arrows j1, j2, j3 by the Al film 2195. However, in the radiation detection device shown in FIGS. 28A–28C, the quantity of incident infrared rays i is read as a change in the direction of reflection of the readout light j, so that the larger the change in reflection direction, the higher is the detection sensitivity. In other words, the change in reflected direction of the reflected light j2 at the center of the displacement part 2192 is greater than the change in reflected light j1 near the base of the displacement part 2192, and the change in reflected direction of the reflected light j3 at the tip of the displacement part 2192 is greater still, for even higher sensitivity. Despite this, in the radiation detection device of FIGS. 28A–28C, reflected light broadening in all directions, j1, j2 and j3, is read by the optical system; that is, high-sensitivity reflected light (j3) as well as reflected light without high sensitivity (j1,j2) are all read together, so that sufficiently high sensitivity cannot be attained. On the other hand, in this preferred embodiment, all the approximately-parallel readout light j is reflected in the same direction (the reflection direction near the tip of the displacement part, equivalent to j3 in FIGS. 28A–28C), so that high sensitivity is achieved.

Further, in the case of FIGS. 28A–28C, the displacement part 2192 is irradiated by the readout light j, so that, although a slight amount, some of the readout light j is absorbed by the displacement part 2192, and to this extent the displacement part 2192 is displaced, and the S/N ratio falls. On the other hand, in this preferred embodiment the displacement part 2192 is blocked from the readout light j by the reflecting plate 2193, so that displacements depending only on the incident infrared rays i occur in the displacement part 2192, and the S/N ratio rises.

Fourteenth Preferred Embodiment

Figure 29:
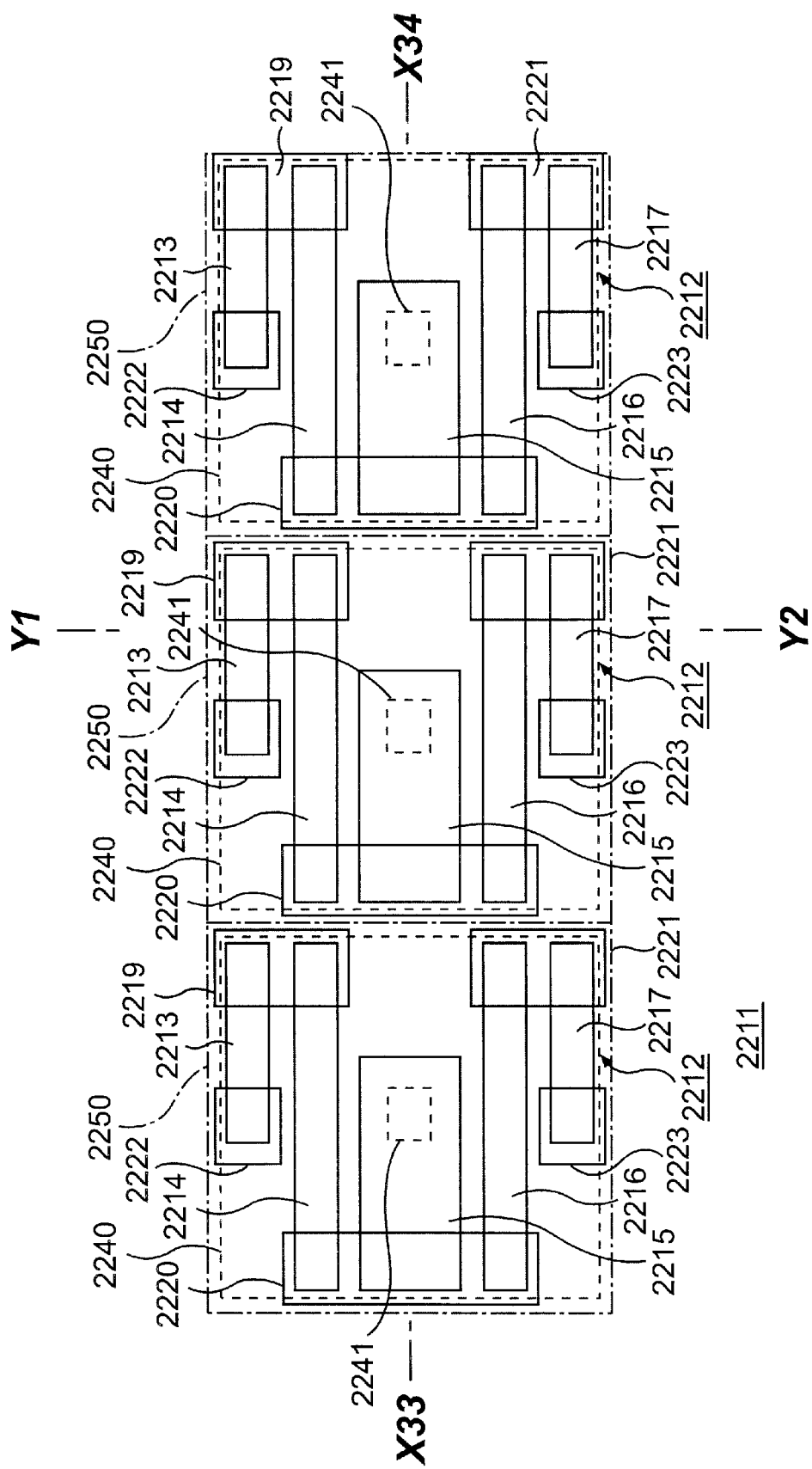
FIG. 29 is a plan view showing a radiation detection device according to a fourteenth preferred embodiment of the present invention.
Figure 30A:
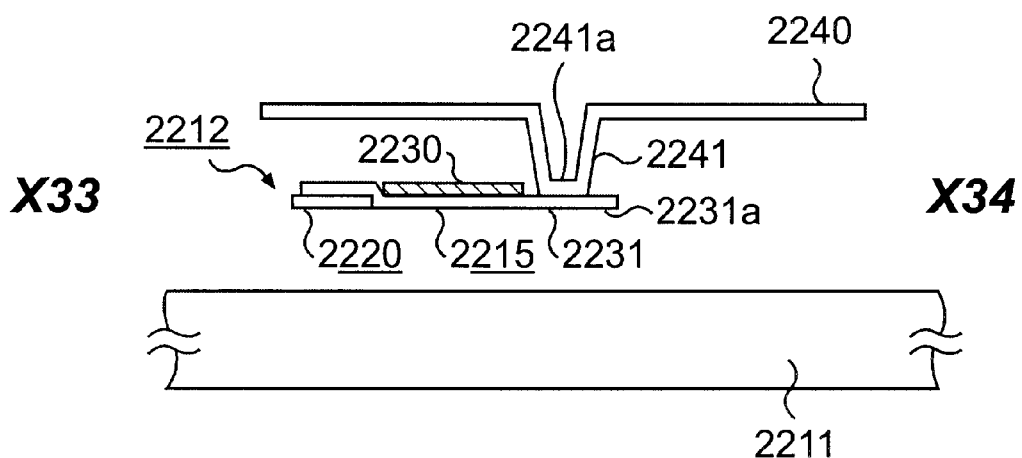
FIGS. 30A and 30B are cross-sectional views showing the radiation detection device shown in FIG. 29.
Figure 30B:
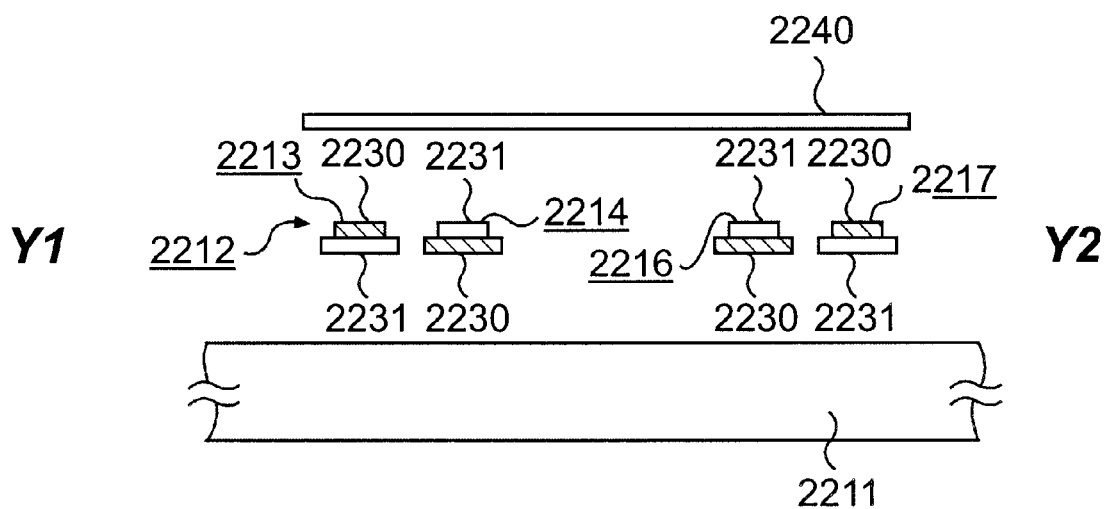

FIG. 29 is a schematic plan view schematically showing an optical readout type radiation detection device according to a fourteenth preferred embodiment of the present invention. In FIG. 29, three unit pixels (unit elements) are shown. FIG. 30A is a schematic cross-sectional view of a unit pixel along the line X33–X34 in FIG. 29, and FIG. 30B is a schematic cross-sectional view along line Y1–Y2 in FIG. 29. In the following explanation, "right" and "left" refer to the right and left in FIG. 29.

This preferred embodiment combines a folded-over structure of the displacement part like that in the aforementioned tenth preferred embodiment, and a two-story structure of the displacement readout member like that in the thirteenth preferred embodiment.

This radiation detection device is provided with an Si substrate 2211 as the base, a displacement part 2212 supported by the substrate 2211 and being displaced with respect to the substrate 2211 in response to heat, and a reflecting plate 2240 reflecting the received readout light, as a displacement readout member used to obtain a prescribed change in response to the displacement occurring in the displacement part 2212.

The displacement part 2212 has five individual displacement parts 2213 to 2217, and three connecting parts 2219 to 2221 mechanically connecting prescribed ends of these. The displacement part 2212 is suspended from the substrate 2211 with an intervening space by fixing, with respect to the substrate 2211, the left end of the individual displacement part 2213 via the leg part 2222, and the left end of the individual displacement part 2217 via the leg part 2223. The right end of the individual displacement part 2213 and the right end of the individual displacement part 2214 are mechanically connected by the connecting part 2219; the left end of the individual displacement part 2214, the left end of the individual displacement part 2215, and the left end of the individual displacement part 2216 are mechanically connected by the connecting part 2220; and the right end of the individual displacement part 2216 and the right end of the individual displacement part 2217 are mechanically connected by the connecting part 2221.

Each individual displacement part 2213 to 2217 extends linearly in the left-right direction, and are positioned in parallel. Each of individual displacement parts 2213, 2215, and 2217 is constructed of an Al film 2230, and below it an $SiO_2$ film 2231. On the other hand, each of the individual displacement parts 2214, 2216 is constructed of an $SiO_2$ film 2231, and below it an Al film 2230. The configuration of the connecting parts 2219 to 2221 and leg parts 2222, 2223 are similar to the connecting parts and leg parts respectively in the aforementioned first and tenth preferred embodiments. The individual displacement parts 2213 to 2217 also serve as infrared ray absorption parts, absorbing infrared rays.

According to the definitions above, the individual displacement part 2213 is a first-stage, the individual displacement part 2214 is a second-stage, the individual displacement part 2215 is a third-stage, the individual displacement part 2216 is a second-stage, and the individual displacement part 2217 is a first-stage individual displacement part; the individual displacement part 2215 is a last-stage individual displacement part. There are two first-stage individual displacement parts, 2213 and 2217, and there is one last-stage individual displacement part, 2215. The structure from one of the first-stage individual displacement parts, 2213, to the last-stage individual displacement part 2215, and the structure from the other of the first-stage individual displacement parts, 2217, to the last stage individual displacement part 2215, are symmetrical.

The center of the reflecting plate 2240 is fixed with respect to the tip of the last-stage individual displacement part 2215 of the displacement part 2212 via the leg part 2241, and is positioned above the displacement part 2212 with an intervening space, positioned so as to essentially cover a unit pixel region 2250. As shown in FIG. 30A, the SiO$_2$ film 2231 constituting part of the individual displacement part 2215 extends somewhat to the right from the tip of the individual displacement part 2215, and the bottom 2241a of the leg part 2241 is fixed to this extended part 2231a. The leg part 2241 is constructed of an extension of the Al film constituting the reflecting plate 2240. The leg part 2241 and aforementioned portion 2251a comprise the connecting part which mechanically connects the tip of the individual displacement part 2215 and the center of the reflecting plate 2240.

In this preferred embodiment, both the advantages of the aforementioned tenth preferred embodiment and the advantages of the aforementioned thirteenth preferred embodiment can be obtained. Moreover, in this preferred embodiment, the center of gravity of the reflecting plate 2240, the center of support of the reflecting plate which is the center of support by the displacement part 2212 (in this preferred embodiment, the position of the leg part 2241), the center of gravity of the displacement part 2212, and the central position of support of the displacement part 2212 by the substrate 2211 (in this preferred embodiment, the center of the line segment connecting the leg parts 2222, 2223), are all near the center of the unit pixel region. Hence balance is extremely good, and a structure with even greater mechanical strength can be obtained. Further, whereas in the aforementioned tenth preferred embodiment the readout light reflection region is limited to part of the unit pixel region (the regions of the individual displacement parts 2075, 2076), in this preferred embodiment the readout light reflection region is essentially the entire unit pixel region; in this respect also, the efficiency of use of the readout light is improved.

In this preferred embodiment, the points of support of the displacement part 2212 by the substrate 2211, and the points of support of the reflecting plate 2240 by the displacement part 2212, may be interchanged. In other words, leg parts equivalent to the leg part 2241 may be provided at the positions of the leg parts 2222, 2223 in FIG. 29, and leg parts equivalent to the leg parts 2222, 2223 may be provided at the position of the leg part 2241 in FIG. 29. In this case, the individual displacement part 2213 is a third-stage, the individual displacement part 2214 is a second-stage, the individual displacement part 2215 is a first-stage, the individual displacement part 2216 is a second-stage, and the individual displacement part 2217 is a third-stage individual displacement part; and the individual displacement parts 2213, 2217 are last-stage individual displacement parts. There is one first-stage individual displacement part, 2215, and there are two last-stage individual displacement parts, 2213 and 2217.

Each of the preferred embodiments of the invention has been explained above. However, the present invention is not limited to these preferred embodiments. For example, the film materials, dimensions and other parameters are not limited to those described above.

As explained above, in the present invention, even when a plurality of displacement parts is positioned on a base, a large amount of displacement can be obtained, and the positioning can be made more nearly ideal.

Further, even when a plurality of pairs of displacement parts and displacement readout members is positioned on the base, the positioning can be made more nearly ideal.

It will be apparent to those skilled in the art that various modifications and variations can be made in the radiation imaging device and radiation detector of the present invention without departing from the spirit or scope of the invention. Thus, it is intended that the present invention cover the modifications and variations of this invention provided they come within the scope of the appended claims and their equivalents.

What is claimed is:

1. An imaging device for converting invisible infrared radiation into a visible optical image, the imaging device comprising:
    an optical readout radiation displacement conversion unit including a substrate transmissive to infrared radiation and a plurality of conversion elements disposed over one surface of the substrate, each of the plurality of conversion elements comprising:
        a radiation absorption part that absorbs infrared radiation transmitted through the substrate to convert the infrared radiation into heat,
        a displacement part coupled to the radiation absorption part so as to convert the heat absorbed by the radiation absorption part to a displacement,
        a reflection part coupled to the displacement part, the inclination of the reflection part varying in accordance with the displacement of the displacement part, and
        a leg part attached to the substrate and supporting an arrangement of the radiation absorption part, the displacement part, and the reflection part relative to the substrate so as to situate said arrangement apart from the substrate; and
    an infrared lens system that directs infrared radiation to a surface of the substrate opposite to said one surface so that the infrared radiation is transmitted through the substrate and emerges from said one surface towards the radiation absorption parts;
    a readout optical system for directing readout light towards the reflection parts of the optical readout radiation/displacement conversion unit to optically read out the inclinations of the reflective parts, the readout optical system comprising:
        a readout light supply unit that supplies readout light;
        a first lens system that directs the readout light from the readout light supply unit to the reflection parts of the optical readout radiation/displacement conversion unit to effect reflection of the readout light by the reflection parts, the first lens system operating upon the readout light on one side of the optical axis of the first lens system;
        a ray flux limiting unit that selectively directs only desired fluxes of light rays among those fluxes of rays of the readout light reflected by the reflection parts, a portion that selectively directs only the desired fluxes of light rays being positioned in a region on the other side of the optical axis of the first lens system; and
        a second lens system optically coupled to the first lens system to define positions conjugate with the reflection parts, the second lens system guiding the fluxes of light rays that have been selectively by the ray flux limiting unit to the conjugate positions.

2. The imaging device according to claim 1, wherein that the readout light supply unit includes a readout light diaphragm positioned on said one side of the optical axis of the first lens system.

3. The imaging device according to claim 1, wherein the ray flux limiting unit is configured to transmit light incident on a predetermined region and not to transmit light incident on regions peripheral to the predetermined region, and wherein the second lens system guides the fluxes of rays that have been transmitted through the ray flux limiting unit to the conjugate positions.

4. The imaging device according to claim 1, wherein the ray flux limiting unit is configured to reflect light incident on a predetermined region and not to reflect light incident on regions peripheral to the predetermined region, and wherein the second lens system guides the fluxes of rays that have been reflected by the ray flux limiting unit to the conjugate positions.

5. The imaging device according to claim 1, wherein the ray flux limiting unit is configured not to transmit light incident on a predetermined region and to transmit light incident on regions peripheral to the predetermined region, and wherein the second lens system guides the fluxes of rays that have been transmitted through the ray flux limiting unit to the conjugate positions.

6. The imaging device according to claim 1, wherein the ray flux limiting unit is configured not to reflect light incident on a predetermined region and to reflect light incident on regions peripheral to the predetermined region, and wherein the second lens system guides the fluxes of rays that have been reflected by the ray flux limiting unit to the conjugate positions.

7. The imaging device according to claim 1, wherein the ray flux limiting unit includes a spatial light modulation unit configured to selectively direct the desired fluxes of light rays in accordance with an input signal.

8. The imaging device according to claim 1, wherein the ray flux limiting unit includes a spatial light modulation unit configured such that the portion that selectively directs only the desired fluxes of rays is changeable within the region on the other side of the optical axis of the first lens system in accordance with an input signal.

9. The imaging device according to claim 8, wherein the readout light supply unit includes a readout light diaphragm positioned on said one side of the optical axis of the first lens system, the readout light diaphragm serving as the spatial light modulation unit.

10. The imaging device according to claim 8, further comprising a setting unit that outputs a setting signal in accordance with user operation, a signal corresponding to the setting signal being used as the input signal for the spatial light modulation unit.

11. The imaging device according to claim 8, further comprising:

a temperature sensor that detects the temperature of a prescribed portion of the optical readout radiation/displacement conversion unit; and a correction unit configured to output the input signal to the spatial light modulation unit in accordance with detection signals from the temperature sensor so as to adjust the position of the portion that selectively directs only the desired fluxes of rays to offset effects due to temperature fluctuations of the optical readout radiation/displacement conversion unit.

12. The imaging device according to claim 1, further comprising a position adjustment mechanism that mechanically adjusts the position of the portion that selectively directs only the desired fluxes of rays.

13. The imaging device according to claim 12, further comprising a setting unit that activates the position adjustment mechanism in accordance with user operation.

14. The imaging device according to claim 12, further comprising:

a temperature sensor that detects the temperature of a prescribed portion of the optical readout radiation/displacement conversion unit; and a control unit that activates the position adjustment mechanism in accordance with detection signals from the temperature sensor so as to offset effects due to temperature fluctuations of the optical readout radiation/displacement conversion unit.

15. The imaging device according to claim 1, wherein second lens system turns the fluxes of light rays into a substantially parallel light flux.

16. The imaging device according to claim 15, further comprising an image sensor that receives said substantially parallel light flux from the second lens system to generate an image signal.

17. The imaging device according to claim 7, wherein said spatial light modulation unit includes a liquid crystal device that employs a liquid crystal to selectively form a pinhole that allows light passage and regions that prevent light passage, the liquid crystal device being configured such that the position and area of the pinhole being changeable.

18. The imaging device according to claim 17, further comprising:

a temperature sensor that detects the temperature of a prescribed portion of the optical readout radiation/displacement conversion unit; and a correction unit configured to output a signal to the liquid crystal device in accordance with detection signals from the temperature sensor so as to adjust the position of the portion that selectively directs only the desired fluxes of rays to offset effects due to temperature fluctuations of the optical readout radiation/displacement conversion unit.

* * * * *